United States Patent [19]
Asamura et al.

[11] Patent Number: 5,818,529
[45] Date of Patent: Oct. 6, 1998

[54] VARIABLE LENGTH CODING OF VIDEO WITH CONTROLLED DELETION OF CODEWORDS

[75] Inventors: Yoshinori Asamura; Takashi Itow; Tomohiro Ueda; Kenji Tsunashima; Satoshi Kurahashi, all of Nagaokakyo, Japan

[73] Assignee: Mitsubishi Denki Kabushiki Kaisha, Tokyo, Japan

[21] Appl. No.: 655,641

[22] Filed: May 30, 1996

Related U.S. Application Data

[62] Division of Ser. No. 385,987, Feb. 9, 1995, Pat. No. 5,583,573, which is a division of Ser. No. 48,732, Apr. 21, 1993, Pat. No. 5,440,344.

[30] Foreign Application Priority Data

| Apr. 28, 1992 | [JP] | Japan | 4-109405 |
| May 29, 1992 | [JP] | Japan | 4-138663 |
| Jun. 25, 1992 | [JP] | Japan | 4-167592 |
| Sep. 2, 1992 | [JP] | Japan | 4-234540 |

[51] Int. Cl.$^6$ .................................................. H04N 7/24
[52] U.S. Cl. ........................................ 348/396; 348/419
[58] Field of Search .................................. 348/419, 405, 348/403, 396, 391, 390, 384; 341/67, 65, 51, 63, 106; 382/245, 246; 358/261.1, 427; H04N 7/13

[56] References Cited

U.S. PATENT DOCUMENTS

| 4,734,770 | 3/1988 | Matsuba | 348/619 |
| 4,984,076 | 1/1991 | Watanabe et al. | 348/405 |
| 5,073,820 | 12/1991 | Nakagawa et al. | 348/405 |
| 5,089,888 | 2/1992 | Zdepski et al. | 348/405 |
| 5,136,371 | 8/1992 | Savatier et al. | 348/419 |
| 5,150,208 | 9/1992 | Otaka et al. | 348/421 |
| 5,245,677 | 9/1993 | Lepore et al. | 382/48 |
| 5,283,656 | 2/1994 | Sugahara | 348/420 |
| 5,294,974 | 3/1994 | Naimpally et al. | 348/395 |
| 5,323,187 | 6/1994 | Park | 348/405 |
| 5,614,952 | 3/1997 | Boyce et al. | 348/419 |

FOREIGN PATENT DOCUMENTS

| 250269 | 2/1990 | Japan . |
| 271096 | 3/1990 | Japan . |
| 2101740 | 4/1990 | Japan . |
| 1334411 | 8/1991 | Japan . |
| 2223981 | 4/1992 | Japan . |

OTHER PUBLICATIONS

"An Experimental Digital VCR with 40 mm Drum, Single Actuator, and DCT–Based Bit–Rate Reduction," Borgers et al., IEEE Transactions on Consumer Electronics, vol. 34, No. 3, Aug. 1988, pp. 597–605.

"Hurdles on the Way Toward Practical Compression of Digital Audio and Video", Yamada, Erekutoronikusu, Apr. 1991.

*Primary Examiner*—Bryan S. Tung

[57] ABSTRACT

When a digital video signal is compressed, the amount of resulting data is predicted and the quantization level is controlled so as to obtain a constant bit rate. The prediction is made by computing a linear combination of a standard deviation and a number of non-zero coefficients, or by computing a sum of absolute differences between adjacent pixel values, or by computing a dynamic range of pixel values. The bit rate can also be controlled by deleting high-frequency coefficients. To avoid image degradation, the quantization level can also be controlled according to the sensitivity of small image areas to quantization noise. Sensitivity is determined by dividing an area into subblocks, which may overlap, and calculating statistics in each subblock. To reduce the amount of computation required in motion estimation, chrominance motion vectors are derived from luminance motion vectors.

12 Claims, 47 Drawing Sheets

FIG.11

| 1 | 4 | 15 | 7 | 10 |
|---|---|----|---|----|
| 8 | 11 | 2 | 5 | 13 |
| 14 | 6 | 12 | 9 | 3 |

MACROBLOCK DIVIDED INTO SUBMACROBLOCKS

FIG.12

HORIZONTAL DIRECTION

| | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 1 | 2 | 3 | 4 | 5 | 6 | 7 | 8 | 9 | 10 | 11 | 12 | 13 | 14 | 15 |
| 2 | 16 | 17 | 18 | 19 | 20 | 21 | 22 | 23 | 24 | 25 | 26 | 27 | 28 | 29 | 30 |
| 3 | 31 | 32 | 33 | 34 | 35 | 36 | 37 | 38 | 39 | 40 | 41 | 42 | 43 | 44 | 45 |
| 4 | 46 | 47 | | | | | | | | | | | | | |
| 5 | 61 | 62 | | | | | | | | | | | | 59 | 60 |
| 6 | 76 | 77 | | | | | | | | | | | | 74 | 75 |
| 7 | 91 | 92 | | | | | | | | | | | | 89 | 90 |
| 8 | 106 | 107 | | | | | | | | | | | | 104 | 105 |
| 9 | 121 | 122 | | | | | | | | | | | | 119 | 120 |
| 10 | 136 | 137 | | | | | | | | | | | | 134 | 135 |
| 11 | 151 | 152 | | | | | | | | | | | | 149 | 150 |
| 12 | 166 | 167 | | | | | | | | | | | | 164 | 165 |
| 13 | 181 | 182 | 183 | 184 | 185 | 186 | 187 | 188 | 189 | 190 | 191 | 192 | 193 | 179 | 180 |
| 14 | 196 | 197 | 198 | 199 | 200 | 201 | 202 | 203 | 204 | 205 | 206 | 207 | 208 | 194 | 195 |
| 15 | 211 | 212 | 213 | 214 | 215 | 216 | 217 | 218 | 219 | 220 | 221 | 222 | 223 | 209 | 210 |

VERTICAL DIRECTION

IMAGE DIVIDED INTO MACROBLOCKS

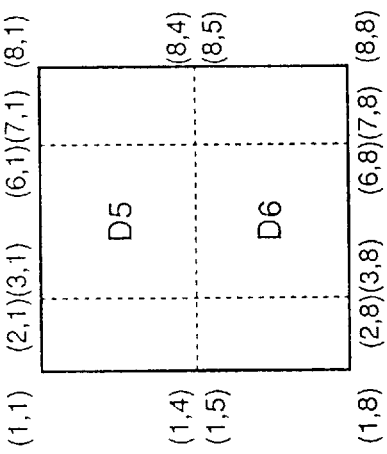
FIG. 45(a)
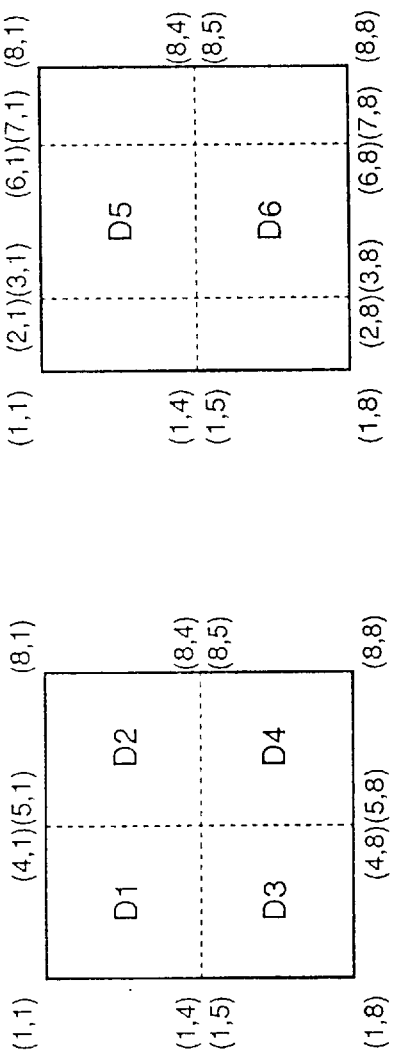
FIG. 45(b)
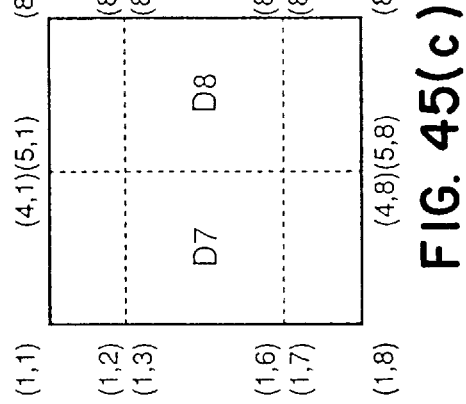
FIG. 45(c)
FIG. 45(d)

| ZERO RUN LENGTH | DATA | CODEWORD |
|---|---|---|
| 0 | 1 | 1 0 |
| 1 | 1 | 1 1 0 |
| 0 | 2 | 0 0 0 |
| 2 | 1 | 0 0 1 1 |
| 3 | 1 | 0 1 0 1 |
| 0 | 3 | 0 1 0 0 |
| EOB |  | 1 1 1 0 1 |
| 4 | 1 | 0 0 1 0 1 |
| 1 | 2 | 0 1 1 1 1 |
| 5 | 1 | 0 1 1 1 0 |
| 6 | 1 | 0 1 1 0 0 |
| ⋮ | ⋮ |  |

| DC | 10 | 3 | 1 | 0 | 0 | 0 | 0 |
|----|----|---|---|---|---|---|---|
| 15 | 0  | 0 | 0 | 0 | 0 | 0 | 0 |
| 4  | 1  | 0 | 1 | 0 | 0 | 0 | 0 |
| 1  | 0  | 0 | 1 | 0 | 0 | 0 | 0 |
| 0  | 0  | 0 | 0 | 1 | 0 | 0 | 0 |
| 1  | 0  | 0 | 0 | 0 | 0 | 0 | 0 |
| 0  | 0  | 1 | 0 | 0 | 0 | 0 | 0 |
| 0  | 0  | 0 | 0 | 0 | 0 | 0 | 0 |

| DC | 10 | 3 | 1 | 0 | 0 | 0 | 0 |
|---|---|---|---|---|---|---|---|
| 15 | 0 | 0 | 0 | 0 | 0 | 0 | 0 |
| 4 | 1 | 0 | 1 | 0 | 0 | 0 | 0 |
| 1 | 0 | 0 | 1 | 0 | 0 | 0 | 0 |
| 0 | 0 | 0 | 0 | 0 | 0 | 0 | 0 |
| 1 | 0 | 0 | 0 | 0 | 0 | 0 | 0 |
| 0 | 0 | 1 | 0 | 0 | 0 | 0 | 0 |
| 0 | 0 | 0 | 0 | 0 | 0 | 0 | 0 |

VARIABLE LENGTH CODING OF VIDEO WITH CONTROLLED DELETION OF CODEWORDS

This application is a divisional of application Ser. No. 08/385,987, filed on Feb. 9, 1995, now U.S. Pat. No. 5,583,573, which is a divisional application of Ser. No. 08/048,732, filed on Apr. 21, 1993, now U.S. Pat. No. 5,440,344, the entire contents of which are hereby incorporated by reference.

BACKGROUND OF THE INVENTION

The present invention relates to the compression of a digital video signal for such purposes as transmission over a communication channel or recording on magnetic media.

Digital video offers advantages such as versatile signal processing and error-free reproduction, but digitization of a video signal yields data in such large amounts as to quickly exhaust the capacity of communication channels or recording media. Before transmission or recording, the digitized video signal must therefore be compressed. Compression techniques based on orthogonal transforms, motion estimation, and variable-length encoding are well known.

A difficulty that confronts video compression schemes is that the degree of compression varies depending, for example, on the amount of redundancy in the signal. Since transmission or recording is carried out at a constant bit rate, it is necessary to generate encoded data at a constant bit rate over some suitable time scale. That is, it must be possible to divide the digital video signal into segments of equal length and encode each segment to a constant amount of compressed data.

One conventional method of obtaining a constant amount per segment is to provide a buffer memory in which the encoded data for each segment are stored prior to transmission or recording. As data are written in the buffer memory, the rate at which the buffer memory is filling up is monitored. If the buffer memory is filling too quickly, the quantization level of the data is reduced, thereby reducing the amount of encoded data generated. If the buffer memory is filling too slowly, the quantization level is raised.

One problem of this method is that it is prone to buffer overflow, as tends to occur in very active images, or when the scene changes. Another problem is that varying the quantization level in this way tends to cause serious image degradation, particularly in images comprising a few high-contrast elements such as lines or edges disposed on a generally flat background. Degradation occurs because the high-contrast lines or edges generate a comparatively large amount of encoded data, requiring a reduction of the quantization level, but this in turn causes quantization noise that is highly visible and annoying on the flat background.

An alternative scheme is to predict, prior to quantization, the amount of encoded data that will be produced and vary the quantization level accordingly. A variety of prediction schemes have been proposed, but they suffer from various problems. Prediction from the AC power level of the digital video signal, for example, leads to the same type of image degradation as described above.

The preceding problems of overflow and image degradation are two of the problems addressed by the present invention. Another problem concerns the motion estimation method of compressing a digital video signal comprising a luminance component (Y) and two chrominance components (color difference components: B−Y and R−Y). When the signal is digitized these components are generally sampled at different rates, the 4:2:2 component ratio being one widely-used standard. The resulting problem is that blocks of chrominance data cover a larger image area than blocks of luminance data, so their motion vectors are different. Providing independent motion estimation processors for the luminance and chrominance components is a computationally expensive solution to this problem, whereas using data blocks of different sizes for the luminance and chrominance components would lead to a discrepancy in encoding accuracy.

SUMMARY OF THE INVENTION

It is thus an object of the present invention to encode segments of a digital video signal to obtain a nominal amount of encoded data.

Another object of the invention is to avoid noticeable image degradation.

Yet another object of the invention is to reduce the amount of computation required for motion estimation.

According to a first aspect of the invention, a segment of the digital video signal is formatted into blocks, an orthogonal transform is executed on each block, then the amount of encoded data is predicted at a plurality of quantization levels by using a linear combination of the standard deviation of the coefficients of each block and the number of non-zero coefficients of the block at the particular quantization level. These predicted amounts are used to select a quantization level for each block so that the total amount of encoded data will be substantially equal to the nominal amount. Alternatively, two quantization levels are selected for the segment, one predicted to give the greatest amount of encoded data not greater than the nominal amount and the other predicted to give the least amount of encoded data not less than the nominal amount. Individual blocks in the segment are then assigned to one or the other of these two quantization levels in such a way that the total predicted amount of encoded data is substantially equal to the nominal amount.

According to a second aspect of the invention, the amount of encoded data at a standard quantization level is predicted by calculating a sum of absolutes values of differences between horizontally and vertically adjacent pixel values, and the predicted amount is used to select a quantization level that will yield the nominal amount of encoded data.

According to a third aspect of the invention, the amount of encoded data at a standard quantization level is predicted by calculating the dynamic range of pixel values in each block, and the predicted amount is used to select a quantization level that will yield the nominal amount of encoded data.

According to a fourth aspect of the invention, the quantization level is controlled on the basis of the sensitivity of individual blocks to quantization noise. This sensitivity is determined by dividing a block into subblocks, finding a maximum absolute pixel value in each subblock, and calculating a sum of absolute values of differences between adjacent pixel values in each subblock. The subblocks may be overlapping or non-overlapping.

According to a fifth aspect of the invention, the encoded data are stored in a first buffer memory, then transferred to a second buffer memory. Address and length information about at least one codeword per block is stored in an address memory. If the amount of encoded data in the first buffer memory overflows the nominal amount, codewords are deleted on the basis of information in the address memory until the overflow is corrected, the last codeword in each block being deleted first. The last codeword corresponds to the highest-frequency non-zero coefficient. The blocks can be re-ordered so that codewords are deleted from peripheral image areas before central areas, or from chrominance blocks before luminance blocks.

According to a sixth aspect of the invention, when the motion estimation method of data compression is employed, chrominance motion vectors are derived from luminance vectors.

BRIEF DESCRIPTION OF THE DRAWINGS

FIG. 11 illustrates a submacroblock decomposition used in a fifth embodiment of the invention.

FIG. 12 illustrates a macroblock decomposition used in the fifth embodiment.

FIGS. 45(a)–(d) illustrate an overlapping subblock decomposition used in a tenth embodiment of the invention.

DETAILED DESCRIPTION OF THE INVENTION

Several embodiments of the invention will now be described with reference to the attached drawings. The drawings illustrate the invention but do not restrict its scope, which should be determined solely from the appended claims. For example, eight-by-eight pixel blocks will be shown throughout the description, but the invention can be practiced with arbitrary M-by-N rectangular pixel blocks, where M and N are integers greater than one.

Since an object of the invention is to equalize the bit rate per segment of the digital video signal, it will be useful to begin by considering the appropriate length of a segment. When the signal is reproduced and displayed, the display will normally be refreshed at a constant number of frames per second, where one frame corresponds to one complete image. In some systems, it is therefore necessary to generate a nominal amount of encoded data per frame.

The amount of encoded data per frame need not be exactly constant, because if it is less than the nominal amount, dummy data such as all-zero data can be padded to make the amount come out exactly right: If the amount is much less than the nominal amount, however, needless image degradation will occur, while if the amount exceeds the nominal amount, it will be necessary to discard part of the encoded data, with severe consequences for the reproduced image. The object is accordingly for the amount of encoded data to be as close as possible to the nominal amount without exceeding the nominal amount. Expressions such as "obtain a nominal amount" or "substantially equal to the nominal amount" should be understood in this sense.

In systems that employ interlaced scanning, each image frame is divided into two fields comprising even and odd scanning lines, respectively. In many such systems it is convenient to obtain a nominal amount of encoded data per field.

In systems that employ motion estimation, the amount of encoded data differs greatly between intraframes (also called I-frames), which are encoded without reference to other frames, and interframes (also called P-frames or B-frames), which are encoded with reference to preceding frames, or to preceding and following frames. Interframes generate much less encoded data than intraframes. In a system in which each intraframe is followed by three interframes, for example, a natural object is to obtain a nominal amount of encoded data per four frames. If interlaced scanning is employed, then the object is to obtain a nominal amount of encoded data per four fields.

The segment length of interest may accordingly be equal to one frame or field, or to a plurality of frames or fields. The segment length may also be shorter than a frame or field, as discussed next.

Figure 1:
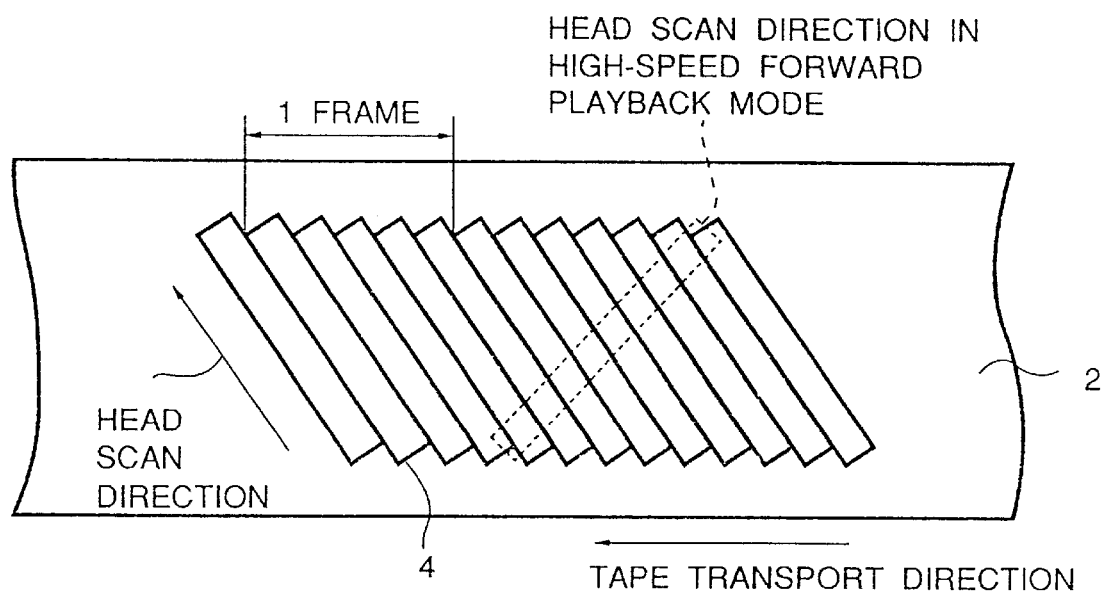
FIG. 1 illustrates the recording of video data on magnetic tape.

Referring to FIG. 1, when a video signal is recorded on magnetic tape 2, one frame is generally recorded in a plurality of helical tracks 4 (five tracks in the drawing). It may therefore be useful to produce a nominal amount of encoded data for a segment length corresponding to one helical track 4. This is particularly true in systems that have a high-speed playback mode, in which the magnetic head follows the path indicated by the dotted line, reading only part of the data from each helical track 4. This high-speed mode is greatly facilitated if each helical track 4 contains data for a fixed part of the image, which will be true only if a constant amount of encoded data is generated per helical track.

In FIG. 1, since the head crosses eight helical tracks per pass in high-speed mode, it would be even more useful if the portion of each helical track read corresponded to a fixed position in the reproduced image. That is, it is desirable to control the amount of encoded data in segments corresponding to one-eighth of a helical track.

In summary, depending on the system under consideration, the segment length of interest may be equal to, greater than, or less than one frame or field. The present invention is applicable in all these cases.

To avoid needless verbosity, the descriptions of the embodiments will assume interlaced scanning and the terms field, intrafield, and interfield will be used. An interfield is a field that is encoded with reference to another field, while an intrafield is encoded without such reference. The embodiments apply equally to non-interlaced scanning, however, in which case the terms frame, intraframe, and interframe should be substituted for field, intrafield, and interfield.

As described above, one strategy for compressing a segment to a nominal amount of encoded data is to predict the amount prior to quantization and control the quantization level accordingly. Novel methods of prediction and control will be described next.

1st Embodiment

Figure 2:
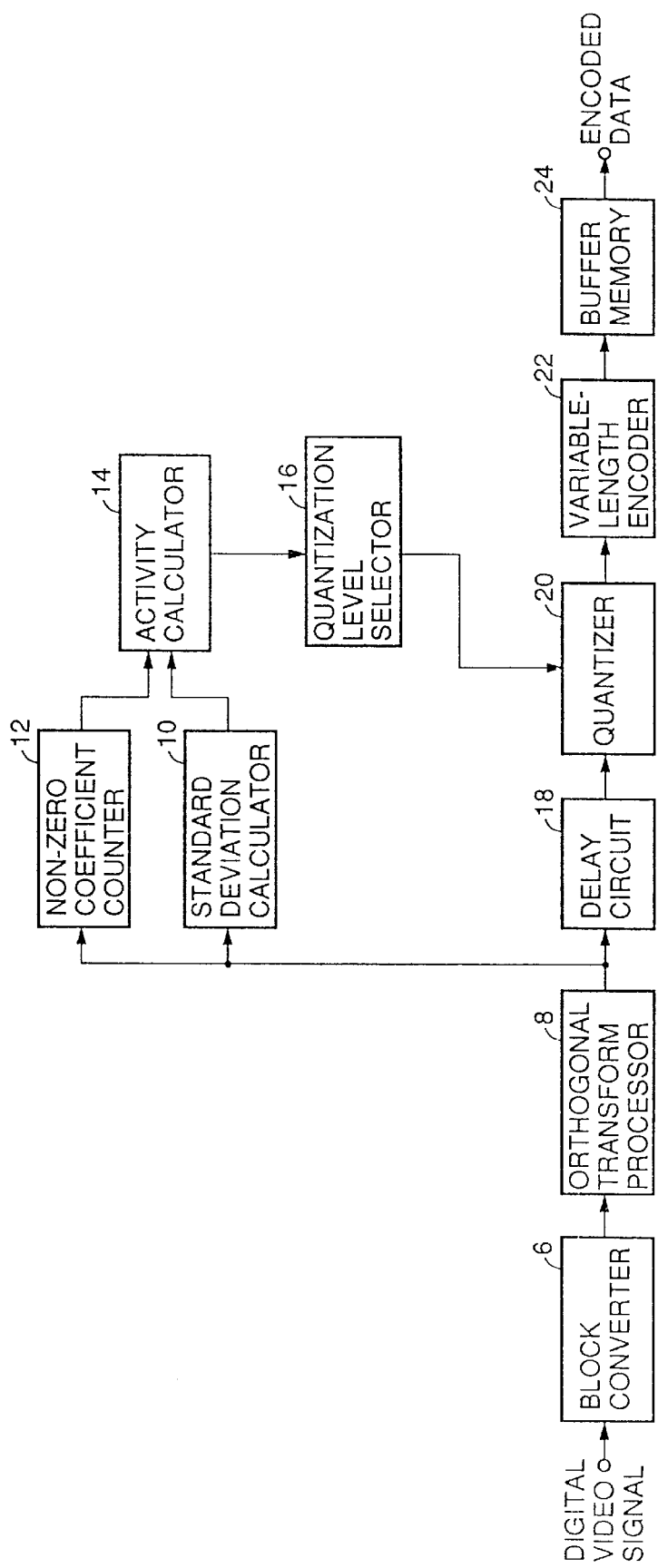
FIG. 2 is a block diagram illustrating a first embodiment of the invention.

Referring to FIG. 2, a digital video signal comprising pixel values is input to a block converter 6 that performs a line-to-block conversion, thereby formatting the signal into blocks of sixty-four pixel values each. A block corresponds to a rectangular image area with eight pixels in the horizontal direction and eight scanning lines in the vertical direction. An orthogonal transform processor 8 performs an orthogonal transform such as the well-known two-dimensional discrete cosine transform on each block, thereby transforming the signal from the space domain to the frequency domain and generating an eight-by-eight block of coefficients. These coefficients are supplied to a standard deviation calculator 10 that computes their standard deviation σ, and to a non-zero coefficient counter 12.

The non-zero coefficient counter 12 is a thresholding and counting device that counts the number of non-zero coefficients that would be produced if the coefficients were to be quantized at various quantization levels. A quantization level refers to the step size between different quantized values. Finer quantization levels have a narrower step size and require more bits of data to represent each quantized value. Coarser quantization levels have a wider step size and require fewer bits. The non-zero coefficient counter 12 considers a certain set of quantization levels {i} ranging from coarse to fine and counts the number $c_i$ of non-zero coefficients that will occur at each quantization level i.

The standard deviation σ and the count values $c_i$ are supplied to an activity calculator 14 that computes a linear combination of the standard deviation σ with each of the $c_i$ to obtain an activity value $act_i$ $$act_i=(a \times c_i)+(b \times \sigma)$$

where a and b are suitable constants. It has been verified through simulation that the activity value $act_i$ is a good predictor of the amount of encoded data. The activity values $act_i$ are provided to a quantization level selector 16. On the basis of these values the quantization level selector 16 predicts the amount of encoded data that would be produced at each quantization level.

The above process is carried out for each block in the segment, so that the quantization level selector 16 has at its disposal a set of activity values $act_i$ for each block. The quantization level selector 16 then selects a quantization level for each block so that the total amount of predicted encoded data in the segment will be substantially equal to the nominal amount.

In the meantime, as each block is transformed by the orthogonal transform processor 8, the resulting coefficients are also fed into a delay circuit 18 such as a first-in-first-out buffer. By the time the delay circuit 18 is ready to output the coefficients of the first block in the segment, the quantization level selector 16 has completed its selection of quantization levels for all blocks in the segment. The coefficients are now input to a quantizer 20. The quantizer 20 has quantization tables corresponding to all the quantization levels considered by the quantization level selector 16, and quantizes each block of coefficients at the level selected by the quantization level selector 16.

The quantized coefficients output by the quantizer 20 are supplied to a variable-length encoder 22 which encodes them by a variable-length encoding method, thereby compressing the amount of data. Well-known variable-length encoding techniques such as run-length encoding and entropy encoding can be employed. Finally, the encoded data for the segment are stored in a buffer memory 24, for subsequent output to a recording or transmitting device. The recording or transmitting device may perform further encoding, including the generation of error-correcting codes, before recording or transmitting the data.

The apparatus depicted in FIG. 2 can be built using standard semiconductor devices such as memory and logic circuits and digital signal processors. The computational steps can also be executed by programs running on a general-purpose central processing unit such as a microprocessor. Alternatively, and most preferably, the computational steps can be carried out by one or more integrated circuits specially designed for the purpose. To avoid obscuring the invention with needless detail, specific hardware and software implementations will not be described, but those skilled in the art will be able to supply the particulars for themselves.

Needless to say, the relation between activity values and amounts of encoded data depends on the variable-length encoding method employed. This embodiment is not restricted to any particular variable-length encoding method. For a specific variable-length encoding method, the relationship between activity values and amount of encoded data can be determined by testing a plurality sample images, and the relationship thus determined can be stored in the form of a look-up table in the quantization level selector 16.

Suitable values of the constants (a and b) in the linear combination for calculating activity also depend on the encoding method. Positive values can be conveniently employed, so that higher activity values correspond to more encoded data, but the value of the first constant (a) may be less than, equal to, or greater than the value of the second constant (b).

Although this first embodiment is applicable to segments of any length, since it controls the quantization level on a block-by-block basis, it permits effective control of the amount of encoded data in segments shorter than one frame or field. For example, the amount of encoded data can be controlled accurately over segments of about one hundred blocks, comprising perhaps one per cent of the entire image area. This method is accordingly particularly suited for use in a digital video tape recorder with a high-speed playback mode, as discussed in relation to FIG. 1.

2nd Embodiment

To ensure that the actual amount of encoded data is within the nominal amount, the preceding embodiment can be modified by providing an additional quantizer, variable-length encoder, and buffer memory. The modification is shown in FIG. 3.

Figure 3:
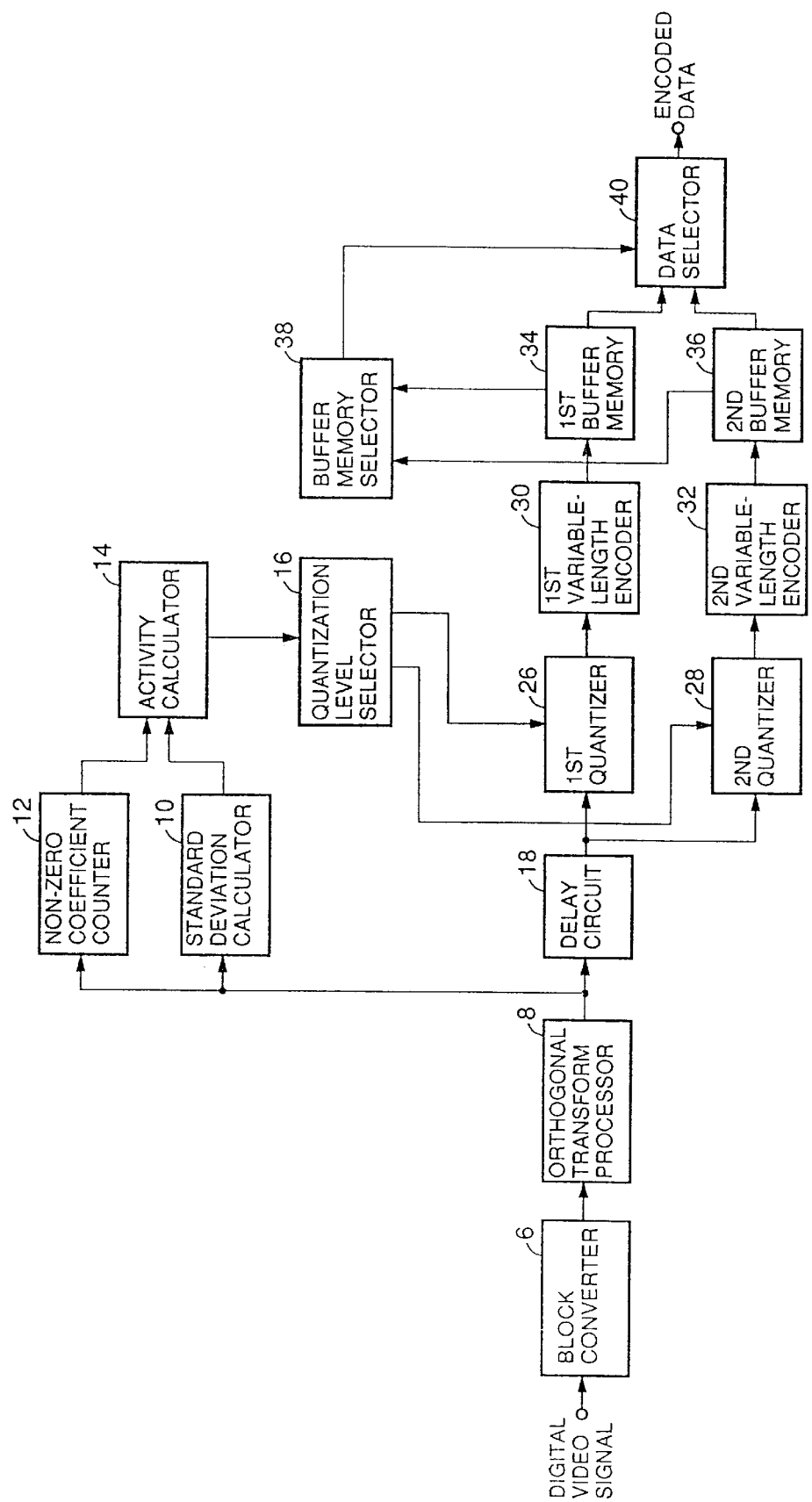
FIG. 3 is a block diagram illustrating a second embodiment of the invention.

The block converter 6, orthogonal transform processor 8, standard deviation calculator 10, non-zero coefficient counter 12, activity calculator 14, and delay circuit 18 in FIG. 3 are the same as in FIG. 2. The quantization level selector 16 is generally the same as in FIG. 2, but its method of selecting quantization levels is slightly different. The first quantizer 26 and second quantizer 28 are both equivalent to the quantizer 20 in FIG. 2, the first variable-length encoder 30 and second variable-length encoder 32 are both equivalent to the variable-length encoder 22 in FIG. 2, and the first buffer memory 34 and second buffer memory 36 are both similar to the buffer memory 24 in FIG. 2.

The buffer memory selector 38 and data selector 40 are new elements. For each block, the buffer memory selector 38 selects either the first buffer memory 34 or the second buffer memory 36, and the data selector 40 outputs the encoded data for that block from the selected buffer memory to a recording or transmitting device.

Next the operation of the quantization level selector 16 will be described. From the activity levels reported by the activity calculator 14, the quantization level selector 16 predicts, for each quantization level, the total amount of encoded data that would be produced if all blocks in one segment were to be quantized at that quantization level. Some of these total amounts will exceed the nominal amount, while others will fall short. From among the quantization levels predicted to equal or exceed the nominal amount, the quantization level selector 16 selects a first quantization level predicted to yield the least amount of encoded data; i.e. the coarsest quantization level is selected. From among the quantization levels predicted to fall short of the nominal amount, the quantization level selector 16 selects a second quantization level predicted to yield the greatest amount of encoded data; i.e. the finest quantization level is selected.

The quantization level selector 16 reports the first quantization level to the first quantizer 26, which quantizes the coefficients in each block according to the first quantization level, thereby producing first quantized coefficients, and reports the second quantization level to the second quantizer 28, which quantizes the coefficients in each block according to the second quantization level, thereby producing second quantized coefficients. The first variable-length encoder 30 encodes the first quantized coefficients, generating first encoded data; the second variable-length encoder 32 encodes the second quantized coefficients, generating second encoded data. The first encoded data are stored in the first buffer memory 34, and the second encoded data in the second buffer memory 36. The first buffer memory 34 and second buffer memory 36 should have sufficient capacity store the first and second encoded data for all blocks in a segment; in particular, the first buffer memory 34 needs to be able to store more than the nominal amount of encoded data for one segment.

The buffer memory selector 38 calculates, for each block, the amounts of first encoded data and second encoded data stored in the first buffer memory 34 and second buffer memory 36. These amounts can be calculated, for example, from the addresses of the blocks in the buffers. The buffer memory selector 38 then divides the blocks in the segment into a first set and a second set so that the amounts of first encoded data of blocks in the first set and the amounts of second encoded data of blocks in the second set add up to an amount substantially equal to the nominal amount.

For blocks in the first set, the data selector 40 outputs first encoded data from the first buffer memory 34. For blocks in the second set, the data selector 40 outputs second encoded data from the second buffer. This assures that the amount of data output for the entire segment is substantially equal to the nominal amount.

There are various possible methods of dividing the blocks in a segment into a first set and second set. A natural approach is to put blocks with lower activity values into the first set, and blocks with higher activity values into the second set, so that coarser quantization is used for more active blocks. This approach is suitable because deterioration caused by coarse quantization is less noticeable in more active parts of an image.

A specific procedure begins by sorting the blocks in ascending order of their activity levels at the first quantization level. Next, all blocks are assigned to the first set, and the amounts of first encoded data are summed. If the total, i.e. the total amount of encoded data stored in the first buffer memory 34, does not exceed the nominal amount per segment, the procedure ends, and the data selector 40 outputs encoded data for all blocks from the first buffer memory 34.

If the total exceeds the nominal amount (which will almost always be the case), the buffer memory selector 38 transfers a block having a maximal activity value from the first set to the second set. Then the buffer memory selector 38 subtracts the amount of first encoded data for that block from the previous total and adds the amount of second encoded data for that block, thereby obtaining a new total for the current assignment of blocks to the first and second sets. If this new total does not exceed the nominal amount, the procedure ends.

If the new total exceeds the nominal amount, the buffer memory selector 38 continues in the same way, selecting from among the blocks remaining in the first set a block with a maximal activity value, moving that block from the first set to the second set, calculating the new total amount of first encoded data of the blocks now assigned to the first set and second encoded data of the blocks now assigned to the second set, and comparing this value with the nominal amount. Repetition of this process continues until the calculated total amount does not exceed the nominal amount per segment.

This method of using activity values to select two quantization levels, storing the encoded data in two buffer memories, then selecting encoded data from the two buffers enables the final amount of encoded data recorded or transmitted per segment to be controlled extremely accurately, even when the segment length is shorter than one frame or field. Like the first embodiment, the second embodiment is suited for use in a digital video tape recorder with a high-speed playback mode.

The first and second embodiments can be applied to a variety of input signals. If the input signal is divided into one luminance component and two chrominance components, the methods described above can be applied to each component separately, or the components can be combined by time-division multiplexing and the above methods can be applied to all three components together.

3rd Embodiment

Next a different method of predicting the amount of encoded data will be described. This method is suitable, for example, in systems employing the motion estimation method of data compression, in which the segment of interest comprises a plurality of fields.

Figure 4:
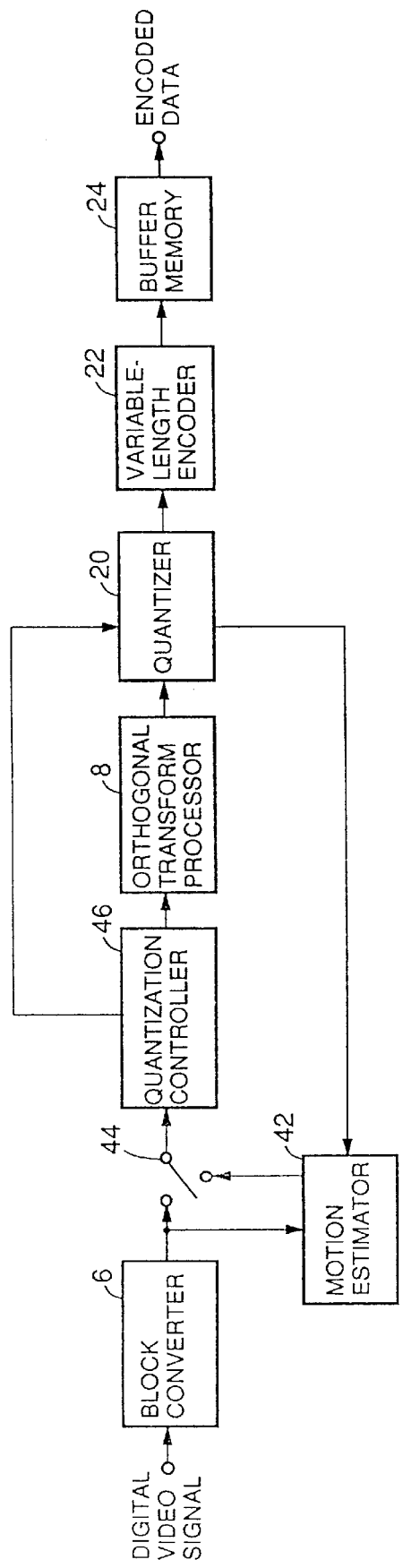
FIG. 4 is a block diagram illustrating a third embodiment of the invention.

To simplify the explanation, the case in which one segment consists of one field will be described first. The relevant apparatus is shown in FIG. 4. The block converter 6, orthogonal transform processor 8, quantizer 20, variable-length encoder 22, and buffer memory 24 are similar to those shown in FIG. 2. The new elements are a motion estimator 42, a switch 44, and a quantization controller 46.

The motion estimator 42 receives quantized coefficients from the quantizer 20, which it uses to construct reference images, and receives the blocks of pixel values output from the block converter 6. Each block received from the block converter 6 is compared with a reference image to determine a motion vector. For each block, the motion estimator 42 outputs to the switch 44 a motion vector and a set of error values indicating the difference between the received block and a block at a possibly different location in the reference image. Further details of the internal structure and operation of the motion estimator 42 will be given in the description of the fourteenth embodiment.

The switch 44 selects the pixel values output from the block converter 6 for an intrafield, or the error values and motion vector output from the motion estimator 42 for an interfield, and furnishes the selected data to the quantization controller 46.

For each field, the quantization controller 46 predicts the amount of encoded data that will be produced, selects an appropriate quantization level for that field, and notifies the quantizer 20 of this quantization level. The quantization controller 46 also passes each block of data as received from the switch 44 on to the orthogonal transform processor 8, which executes an orthogonal transform to generate coefficients. The quantizer 20 quantizes the coefficients output by the orthogonal transform processor 8 at the quantization level designated by the quantization controller 46. The variable-length encoder 22 encodes the quantized coefficients output from the quantizer 20 and stores them in the buffer memory 24, from which they are provided to recording or transmitting apparatus.

Next the structure and operation of the quantization controller 46 will be described in more detail.

Figure 5:
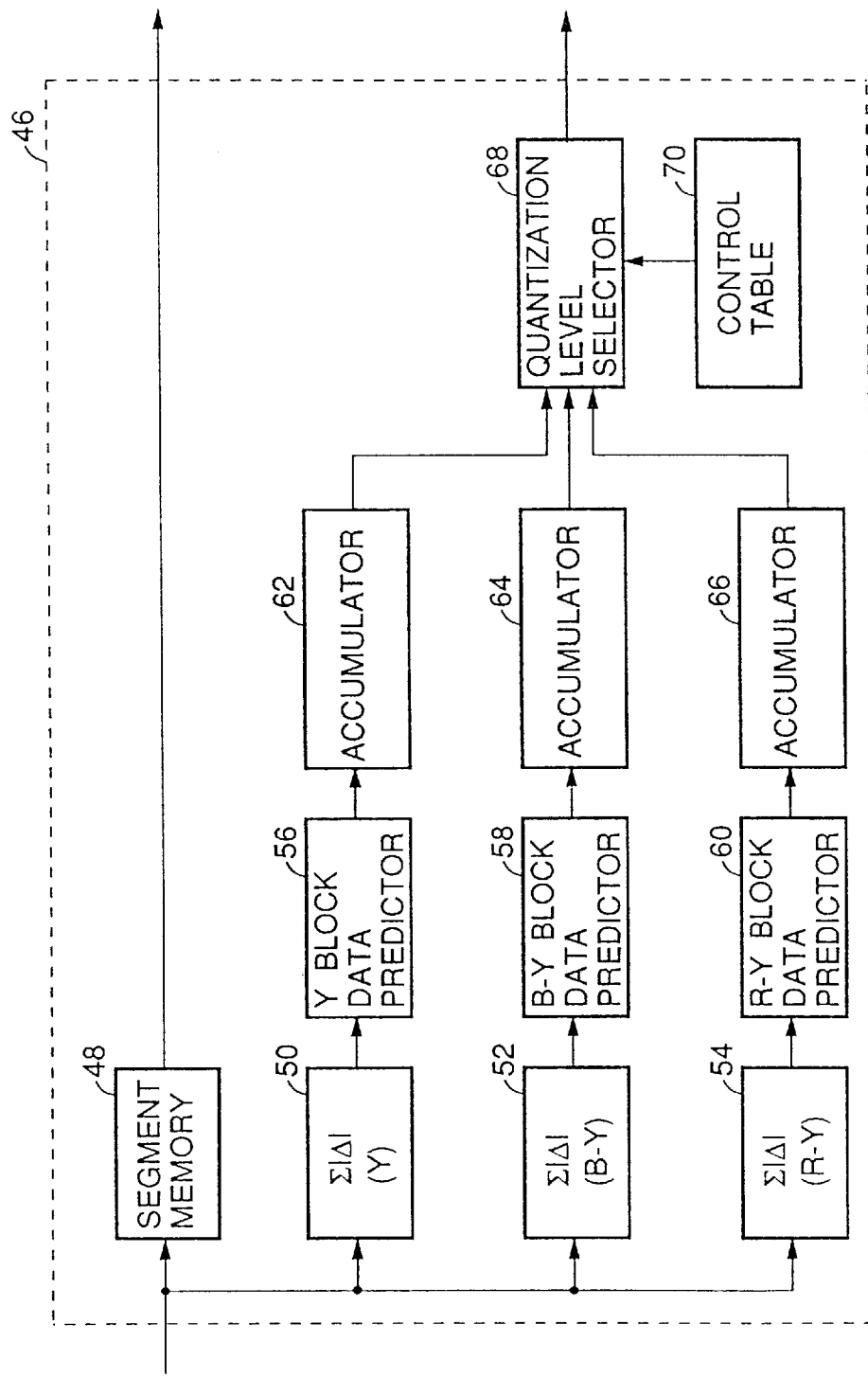
FIG. 5 is a block diagram of the quantization controller in FIG. 4.

Referring to FIG. 5, the quantization controller 46 comprises a segment memory 48, a luminance signal processor 50, a first chrominance signal processor 52, a second chrominance signal processor 54, a luminance block data predictor 56, a first chrominance block data predictor 58, a second chrorninance block data predictor 60, three accumulators 62, 64, and 66, a quantization level selector 68, and a control table 70. The luminance and chrominance signal processors calculate sums of absolute values of differences, so they are labeled in the drawings with the Greek letters Σ and Δ.

The digital video signal is a so-called 4:2:2 signal comprising a luminance component (Y) and two chrominance components (B–Y and R–Y). Each of the two chrominance components is sampled at half the rate of the luminance component, producing only half as many pixel values in the horizontal direction on the image. The three components are formatted separately by the block converter 6. The segment memory 48 receives and stores data for all three components for subsequent output to the orthogonal transform processor 8. In addition, the Y component is supplied to the luminance signal processor 50, the B–Y component to the first chrominance signal processor 52, and the R–Y component to the second chrominance signal processor 54.

For each eight-by-eight block of luminance data, the luminance signal processor 50 calculates the sum of the absolute values of the differences between the luminance values of all pairs of horizontally and vertically adjacent pixels. If $L(i, j)$ is the luminance value of the pixel at horizontal coordinate i and vertical coordinate j in the block, then the luminance signal processor 50 calculates the following sum SY:

$$SY = \sum_{i=1}^{7}\sum_{j=1}^{8} |L(i,j) - L(i+1,j)| + \sum_{i=1}^{8}\sum_{j=1}^{7} |L(i,j) - L(i,j+1)|$$

In an interfield, the $L(i, j)$ are error values with respect to a reference image, but the calculation is the same. The value SY is supplied to the luminance block data predictor 56, which uses it to predict the amount of encoded data that would be produced for the block at a standard quantization level.

Figure 6:
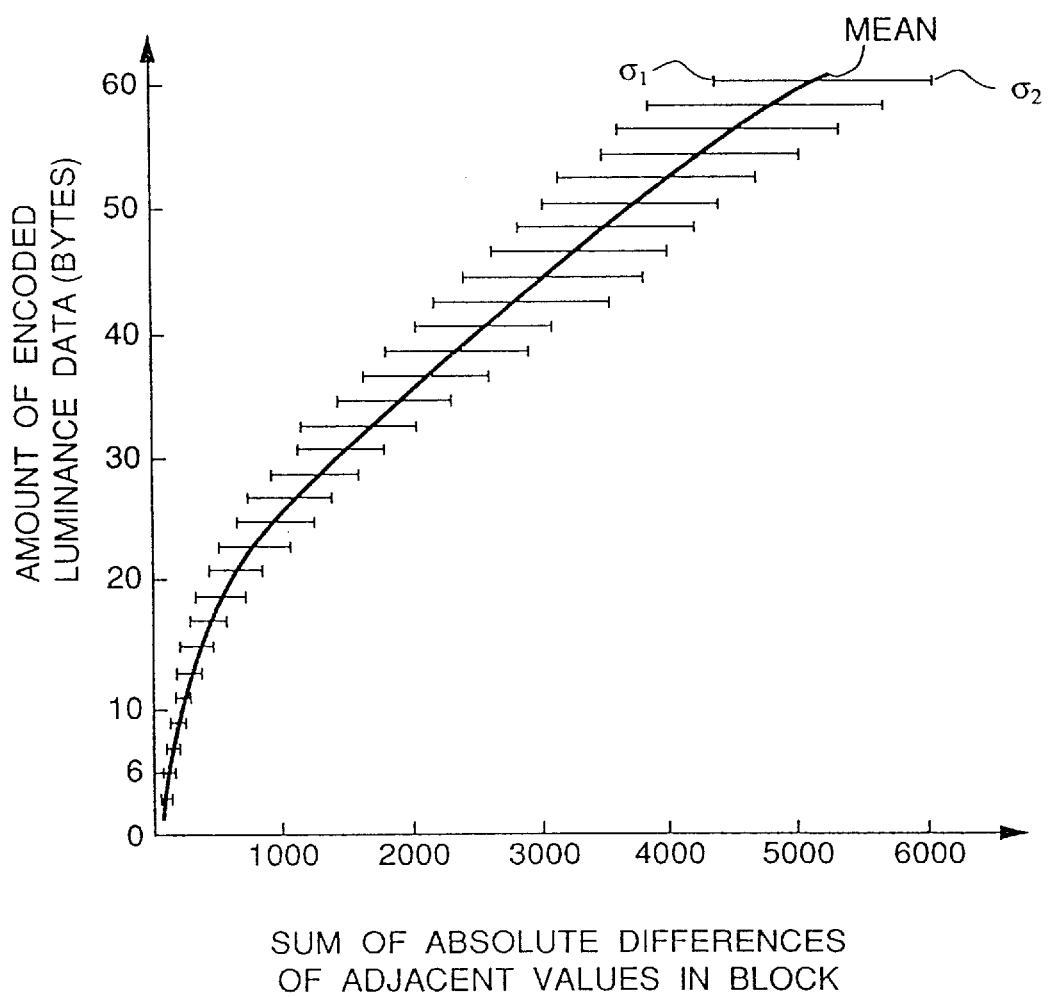
FIG. 6 is a graph illustrating a curve used to predict the amount of encoded luminance data.

FIG. 6 is graph illustrating the mean and standard deviation of SY for blocks in a sample image. The amount of encoded data produced at the standard quantization level is shown in bytes on the vertical axis. The value of SY is shown on the horizontal axis. For a given amount of encoded data, the standard deviation of SY is such that essentially all the SY values lie within the range indicated by the Greek letter σ with subscripts of one and two, centered on the mean value curve indicated by a solid line.

The luminance block data predictor 56 contains the mean value curve of FIG. 6 stored, for example, as a look-up table in a read-only memory. For each input value of SY, the luminance block data predictor 56 looks up the corresponding amount of encoded data and furnishes it as a predicted value to the accumulator 62 in FIG. 5. The accumulator 62 adds these predicted values for all the blocks in one field.

Figure 7:
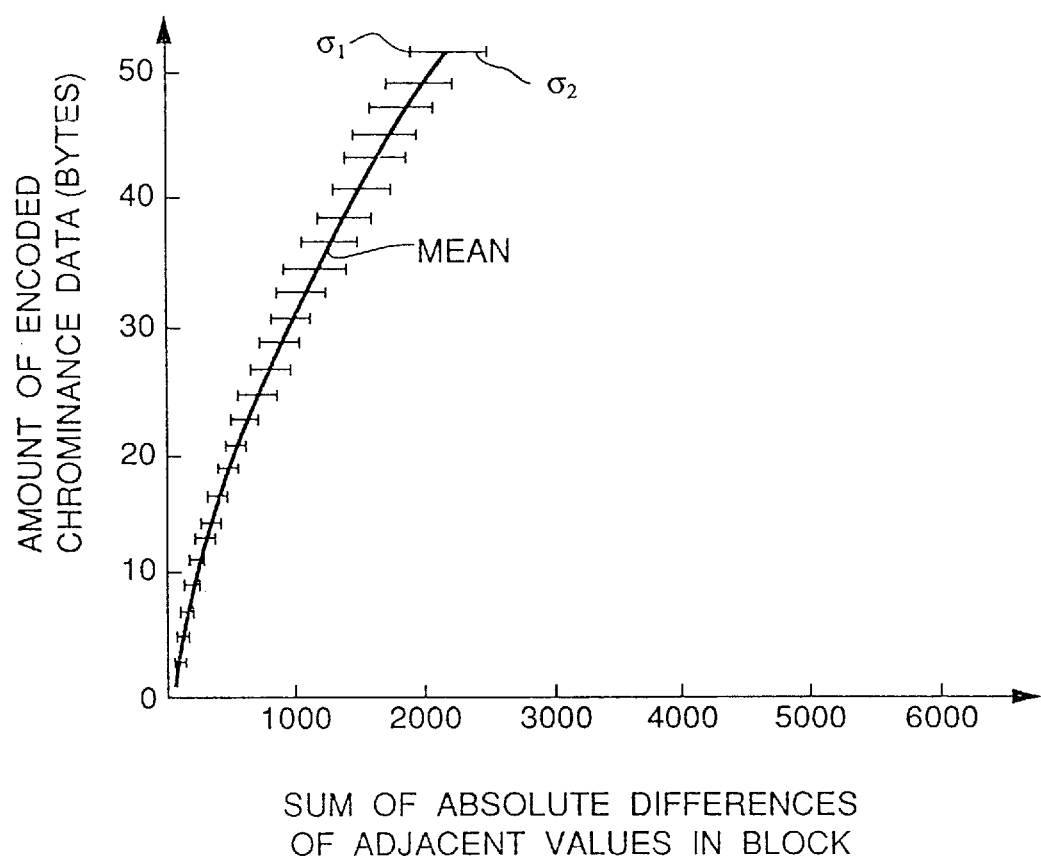
FIG. 7 is a graph illustrating a curve used to predict the amount of encoded chrominance data.

The same process that the luminance signal processor 50, luminance block data predictor 56, and accumulator 62 perform on the luminance data is also performed, using a different prediction curve, by the first chrominance signal processor 52, first chrominance block data predictor 58, and accumulator 64 on the B–Y chrominance data, and by the second chrominance signal processor 54, second chrominance block data predictor 60, and accumulator 66 on the R–Y chrominance data. The chrominance data prediction curve is illustrated in FIG. 7. The horizontal and vertical axes and standard-deviation symbols have the same meaning as in FIG. 6. The difference between the curves in FIG. 6 and FIG. 7 arises from the different sampling frequencies of the luminance and chrominance components.

The outputs of the accumulators 62, 64, and 66 are predictions of the total amount of encoded luminance and chrominance data that would be produced at a standard quantization level. The quantization level selector 68 adds these three amounts to obtain the total predicted amount Ap for one field, and divides this total by the nominal amount Ar for one field to obtain a parameter E:

$$E=Ap/Ar$$

By referring to the control table 70, the quantization level selector 68 then selects an appropriate quantization level for the field. If there are five available quantization levels, the control table 70 contains information corresponding, for example, to the following Table 1, in which E is as defined above and Q is an integer from one to five denoting the quantization level. In Table 1 smaller values of Q correspond to finer quantization levels.

TABLE 1

| E | <0.8 | 0.8 to 1.0 | 1.0 to 1.2 | 1.2 to 1.4 | >1.4 |
|---|------|------------|------------|------------|------|
| Q | 1    | 2          | 3          | 4          | 5    |

Obviously the invention can be practiced with more or fewer than five quantization levels. Also, while bit-rate control per field is not suitable when motion estimation is employed, if the motion estimator 42 is removed from FIG. 4, the third embodiment becomes highly applicable to segments consisting of just one field, or of less than one field, as well as segments comprising a plurality of fields.

4th Embodiment

Figure 8:
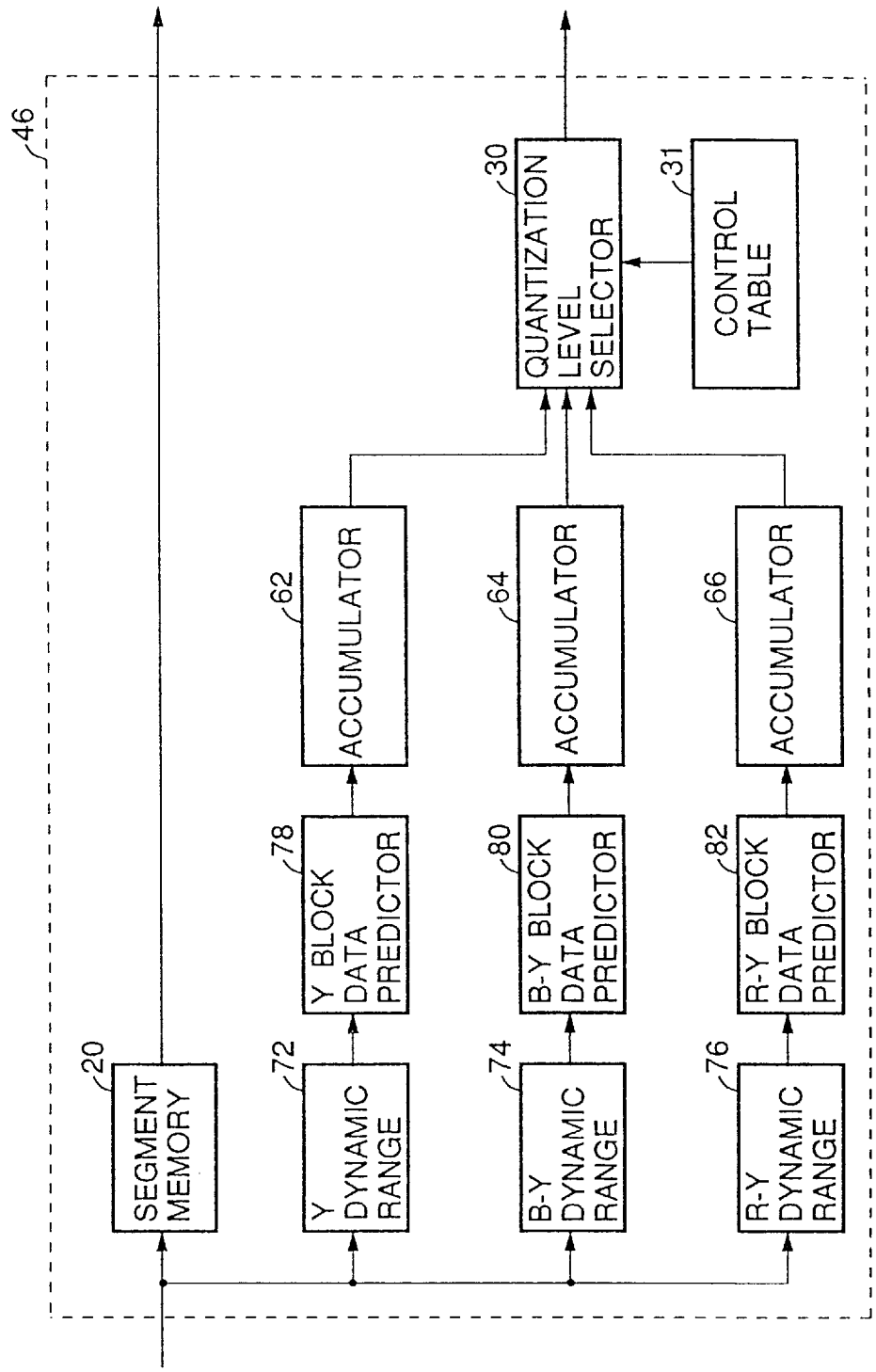
FIG. 8 is a block diagram of the quantization controller in a fourth embodiment of the invention.

Instead of using sums of absolute values of differences between adjacent pixel values, it is also possible to predict the amount of encoded data from the dynamic range of a block; that is, from the difference between the maximum and minimum values in the block. FIG. 8 illustrates the relevant modified quantization controller 46, which now comprises a segment memory 48, a luminance dynamic range calculator 72, a first chrominance dynamic range calculator 74, a second chrominance dynamic range calculator 76, a luminance block data predictor 78, a first chrominance block data predictor 80, a second chrominance block data predictor 82, accumulators 62, 64, and 66, a quantization level selector 68, and a control table 70. The segment memory 48, accumulators 62, 64, and 66, quantization level selector 68, and control table 70 are the same as in FIG. 5.

For each block of luminance data, the luminance dynamic range calculator 72 determines the dynamic range of the block as defined above. That is it finds the maximum value SYmax and minimum value SYmin in the block and calculates the dynamic range SYd as:

$$SYd=SYmax-SYmin$$

Figure 9:
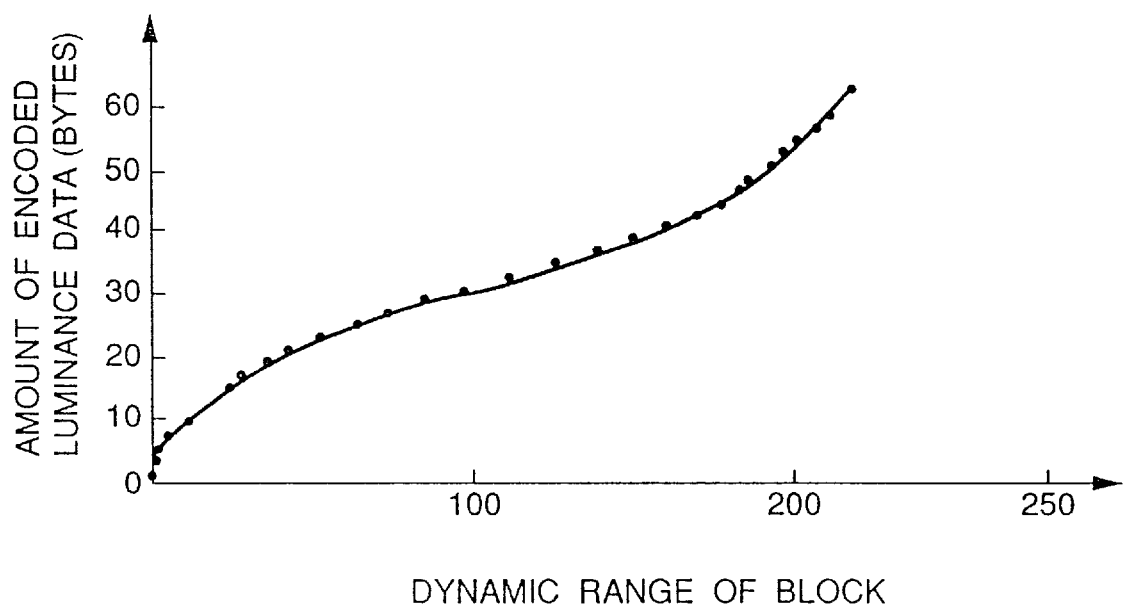
FIG. 9 is a graph illustrating a curve used to predict the amount of encoded luminance data.

FIG. 9 is a graph in which amount of encoded luminance data is plotted against dynamic range for a sample image encoded with a standard quantization level. For simplicity, only the mean dynamic range is indicated. Dynamic range is also a good predictor of the amount of encoded data. The curve in FIG. 9 is stored in table form in the luminance block data predictor 78 and is used to predict the amount of encoded luminance data for each block. The accumulator 62 adds the predicted values for all blocks in one field to obtain a prediction of the total amount of encoded luminance data that would be produced by the field at the standard quantization level.

Figure 10:
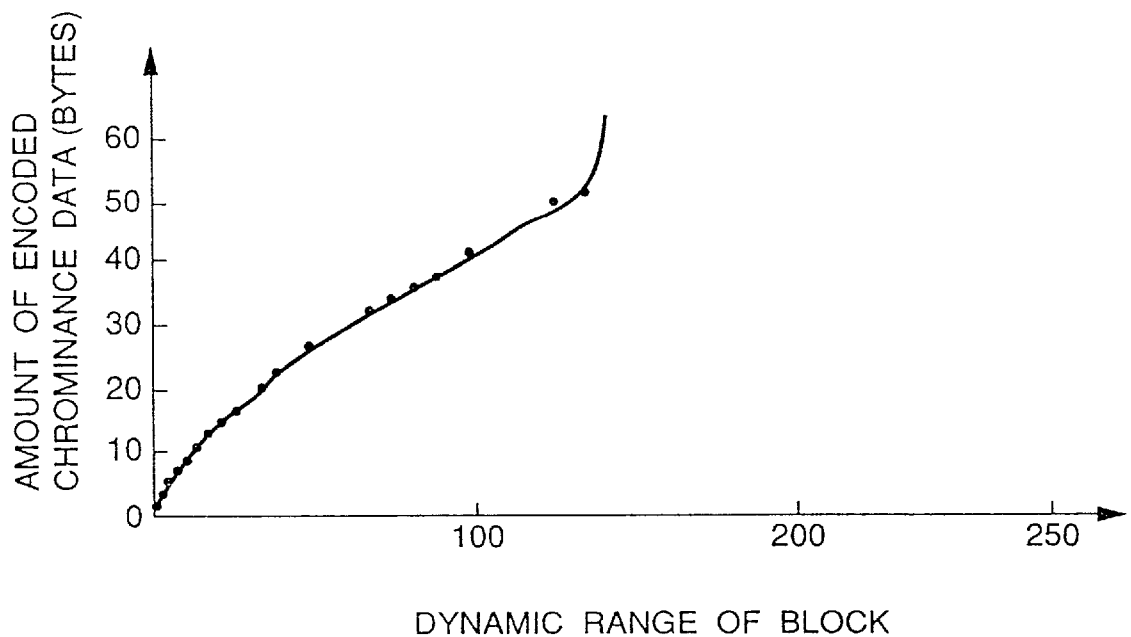
FIG. 10 is a graph illustrating a curve used to predict the amount of encoded chrominance data.

FIG. 10 shows a similar graph for chrominance data. This curve is stored in table form in the first chrominance block data predictor 80 and second chrominance block data predictor 82, which use it to predict the amount of encoded B–Y and R–Y data, respectively. The accumulators 64 and 66 add these values for all blocks in a field, to obtain predictions of the total amount of encoded B–Y and R–Y data that would be produced for the field at the standard quantization level.

The quantization level selector 68 adds the three predicted values supplied by the accumulators 62, 64, and 66 to obtain the total predicted amount of encoded data, and uses the control table 70 to determine the appropriate quantization level, as already explained.

5th Embodiment

Instead of predicting the amount of encoded data for all blocks as described above, it is possible to perform this prediction for only a subset of the blocks, provided the subset is distributed uniformly over the entire image area. Accordingly the third and fourth embodiments can be modified as described next.

In a 4:2:2 digital video signal, two horizontally adjacent eight-by-eight luminance blocks cover the same image area as one eight-by-eight B–Y block and one eight-by-eight R–Y block. These four blocks can be grouped into what will be termed a submacroblock. The submacroblocks can be further grouped into macroblocks comprising, for example, fifteen submacroblocks each, as shown in FIG. 11. Each macroblock is five submacroblocks wide and three submacroblocks high. The submacroblocks in each macroblock are numbered in the order indicated in the drawing.

An entire field is divided into a plurality of non-overlapping macroblocks of the form shown in FIG. 11. FIG. 12 shows an example in which a field is divided into two hundred twenty-five macroblocks disposed in a rectilinear array measuring fifteen macroblocks both horizontally and vertically. The macroblocks are numbered in the order indicated in this drawing.

When the block converter 6 outputs blocks of data, it shuffles the blocks as follows. First it outputs the first submacroblock of the first macroblock, then the first submacroblock of the second macroblock, and so on through the first submacroblock of the two-hundred-twenty-fifth macroblock. Next it outputs the second submacroblock of the first macroblock, then the second submacroblock of the second macroblock, and so on. This process continues until all submacroblocks in all macroblocks have been output.

At the point at which all first submacroblocks have been output, the quantization controller 46 has data for two-hundred twenty-five submacroblocks (one-fifteenth of the total number) distributed uniformly over the entire field. These data can be used to predict the total amount of encoded data that would be produced for all submacroblocks, by multiplying the totals obtained by the accumulators 62, 64, and 66 in FIG. 5 or FIG. 8 by fifteen. If this scheme is employed, then it takes the quantization controller 46 only about one-fifteenth as long to predict the amount of encoded data and select a suitable quantization level.

The block shuffling scheme described above can be modified in various obvious ways. In general it is possible to predict the amount of encoded data from 1/N of the blocks, by dividing a macroblock into N submacroblocks, where N is an integer greater than one but not necessarily equal to fifteen. Similarly, a submacroblock may comprise 2M luminance blocks and M blocks of each of the two chrominance components, where M is any positive integer. Moreover, the submacroblocks and macroblocks need not be arranged as indicated in FIGS. 11 and 12, other arrangements being possible.

6th Embodiment

For the sake of simplicity, the third, fourth, and fifth embodiments have been described for the case in which one segment equals one field, but when motion estimation is employed, a segment preferably comprises a plurality of fields. In a system in which each intrafield is followed by three interfields, for example, it is desirable to control the bit rate of a segment comprising four fields. The quantization controller 46 in the third embodiment can be modified for this purpose as described next. Similar modifications can be made to the fourth and fifth embodiments.

Figure 13:
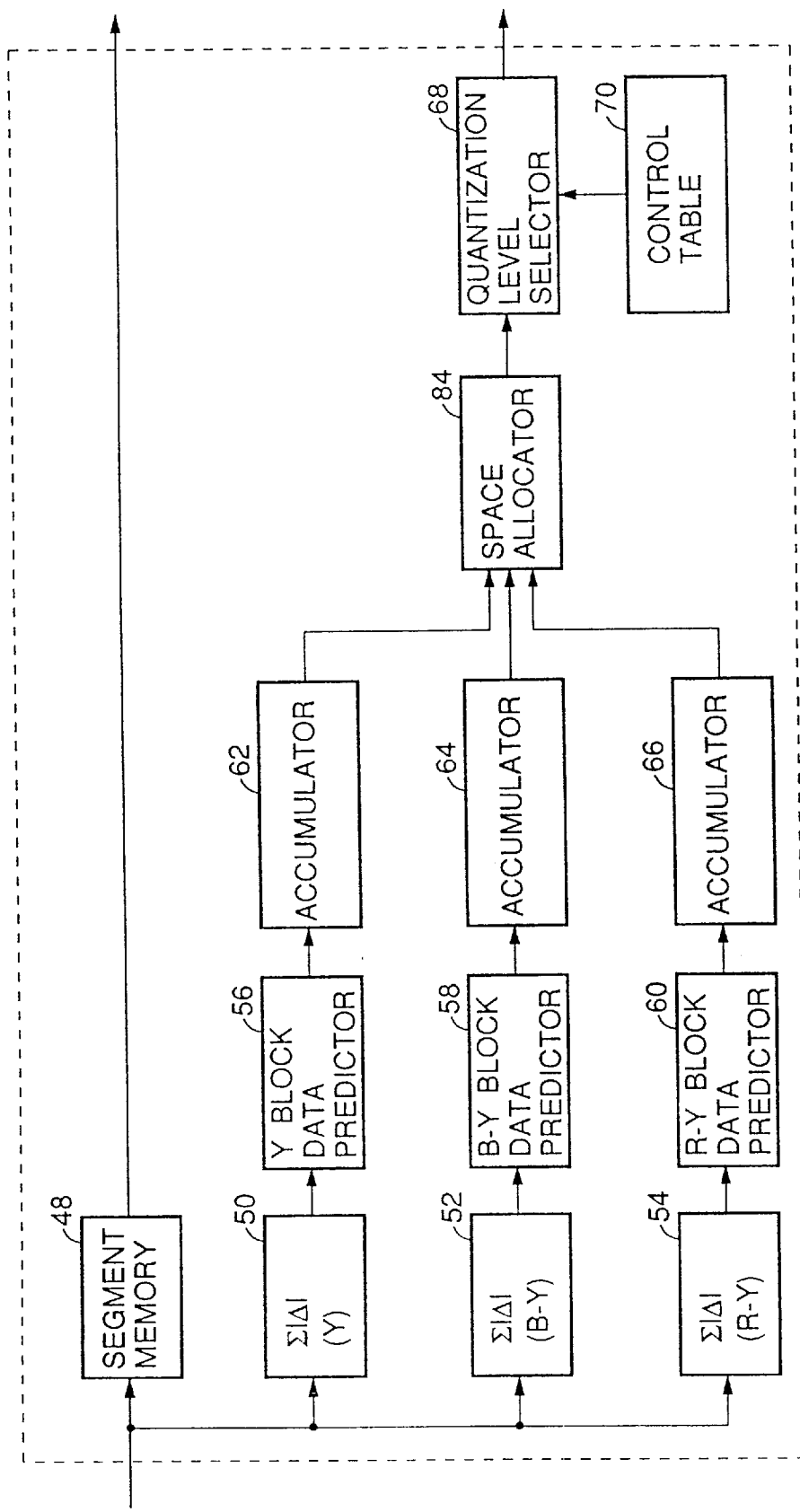
FIG. 13 is a block diagram illustrating a sixth embodiment of the invention.

Referring to FIG. 13, the modified quantization controller comprises the same luminance signal processor 50, first chrominance signal processor 52, second chrominance signal processor 54, luminance block data predictor 56, first chrominance block data predictor 58, second chrominance block data predictor 60, and accumulators 62, 64, and 66 as in FIG. 5. The segment memory 48 must now have enough capacity to store data for four fields. The predicted amounts of encoded data output by the accumulators 62, 64, and 66 for these four fields are processed by a space allocator 84, quantization level selector 68, and control table 70 as follows.

First, for each field, the space allocator 84 adds the predicted amounts output by the accumulators 62, 64, and 66 to determine the total predicted amount of encoded data for the field at the standard quantization level. Next, the space allocator 84 determines the ratios of the total predicted amounts for the four fields. Then the space allocator 84 divides the nominal amount of encoded data per segment in the same ratio to obtain a nominal amount for each field, thus allocating the nominal segment amount among the four fields.

Next, the quantization level selector 68 divides the total predicted amount of encoded data for each field, which it receives from the space allocator 84, by the nominal amount allocated to that field, which it also receives from the space allocator 84. Finally, the quantization level selector 68 selects a suitable quantization level for each field using, for example, the values shown earlier in Table 1, which are stored in the control table 70.

For example, if the nominal amount of encoded data per four fields is one megabit and the predicted amounts of encoded data for the four fields are in the ratio 6:2:2.5:1.5, the space allocator 84 allocates 0.5 megabits to the first field (the intrafield), 0.166 megabits to the second field (the first interfield), 0.208 megabits to the third field (the second interfield), and 0.125 megabits to the fourth field (the third interfield). The quantization level selector 68 determines quantization levels accordingly. This method tends to assign the same quantization level to each of the four fields, and allows more encoded data to be devoted to an intrafield than to an interfield.

This method of controlling the amount of encoded data in segments of four fields can obviously be extended to segments comprising any number of fields greater than one. It can also be combined with the dynamic-range scheme of the fourth embodiment, or the macroblock scheme of the fifth embodiment.

7th Embodiment

The third, fourth, fifth, and sixth embodiments assign the same quantization level to all blocks in a field, or to all blocks in a segment. These embodiments can be refined by adaptive quantization; that is, by varying the quantization level from block to block depending on the sensitivity of each block to image degradation caused by quantizing noise. An apparatus and method for this purpose are described next.

Figure 14:
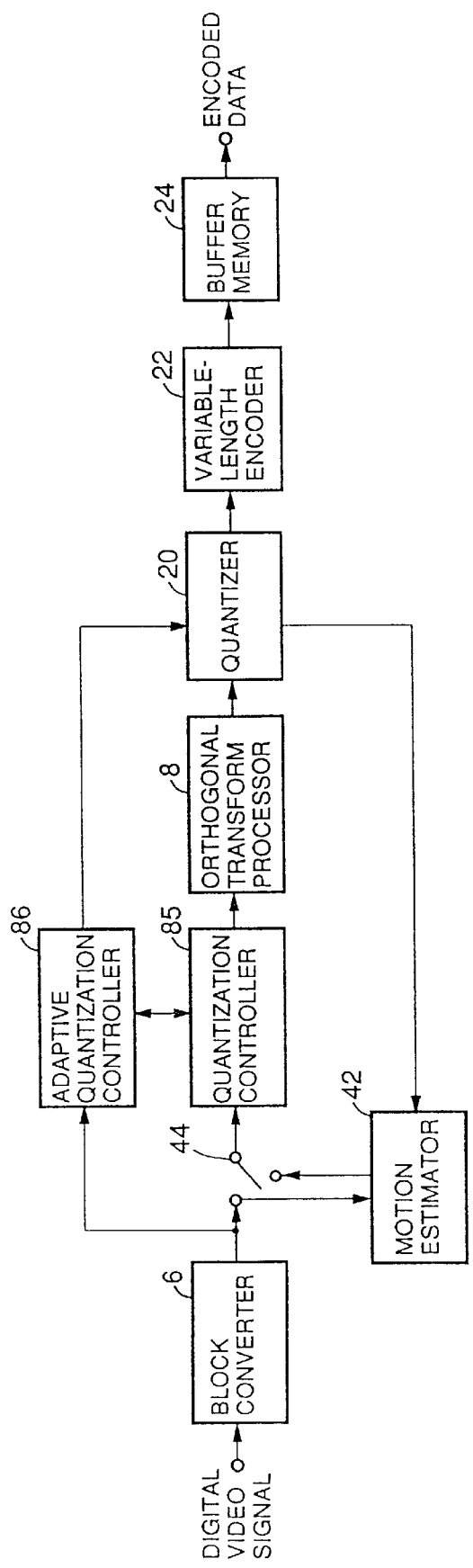
FIG. 14 is a block diagram illustrating a seventh embodiment of the invention.

Referring to FIG. 14, the apparatus comprises a block converter 6, a motion estimator 42, a switch 44, a quantization controller 85, an orthogonal transform processor 8, a quantizer 20, a variable-length encoder 22, and a buffer memory 24 as in FIG. 4, but an adaptive quantization controller 86 is now coupled between the quantization controller 85 and the quantizer 20. The adaptive quantization controller 86 also receives the output of the block converter 6.

The function of the adaptive quantization controller 86 is to determine, for each block, the degree of sensitivity to image degradation of that block, assign finer adaptive quantization levels to blocks which are more sensitive to degradation, and assign coarser adaptive quantization levels to blocks which are less sensitive to degradation. As explained earlier, degradation tends to be most noticeable in blocks comprising a high-contrast feature disposed on a flat background, and least noticeable in blocks with a high overall level of activity and no flat portions.

Figure 15:
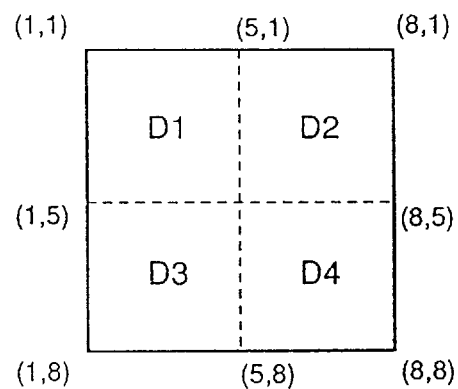
FIG. 15 illustrates a subblock decomposition used in the seventh embodiment.

The adaptive quantization controller 86 accordingly operates as follows. Referring to FIG. 15, each eight-by-eight block output by the block converter 6 is divided into four four-by-four subblocks D1, D2, D3, and D4. For each of these subblocks, the adaptive quantization controller 86 calculates the sum of the absolute values of differences between horizontally and vertically adjacent pairs of pixels, thereby obtaining four sums V1, V2, V3, and V4. Taking a luminance block as an example and letting L(i, j) denote the values in the block as before, the adaptive quantization controller 86 calculates as follows:

$$V1 = \sum_{i=1}^{3} \sum_{j=1}^{4} |L(i,j) - L(i+1,j)| + \sum_{i=1}^{4} \sum_{j=1}^{3} |L(i,j) - L(i,j+1)|$$

$$V2 = \sum_{i=5}^{7} \sum_{j=1}^{4} |L(i,j) - L(i+1,j)| + \sum_{i=5}^{8} \sum_{j=1}^{3} |L(i,j) - L(i,j+1)|$$

$$V3 = \sum_{i=1}^{3} \sum_{j=5}^{8} |L(i,j) - L(i+1,j)| + \sum_{i=1}^{4} \sum_{j=5}^{7} |L(i,j) - L(i,j+1)|$$

$$V4 = \sum_{i=5}^{7} \sum_{j=5}^{8} |L(i,j) - L(i+1,j)| + \sum_{i=5}^{8} \sum_{j=5}^{7} |L(i,j) - L(i,j+1)|$$

Next the adaptive quantization controller 86 finds the minimum A and maximum B among these four sums, and the difference C between the maximum and minimum, as follows:

A=minimum{V1, V2, V3, V4}

B=maximum{V1, V2, V3, V4}

C=B−A

A small value of A identifies blocks having substantial flat portions. A large value of C identifies blocks having high-contrast line or edge elements. The adaptive quantization controller 86 therefore selects adaptive quantization levels according to A and C by using the selection rule illustrated in FIG. 16, where level one denotes the finest quantization level and level three the coarsest quantization level.

Figure 17:
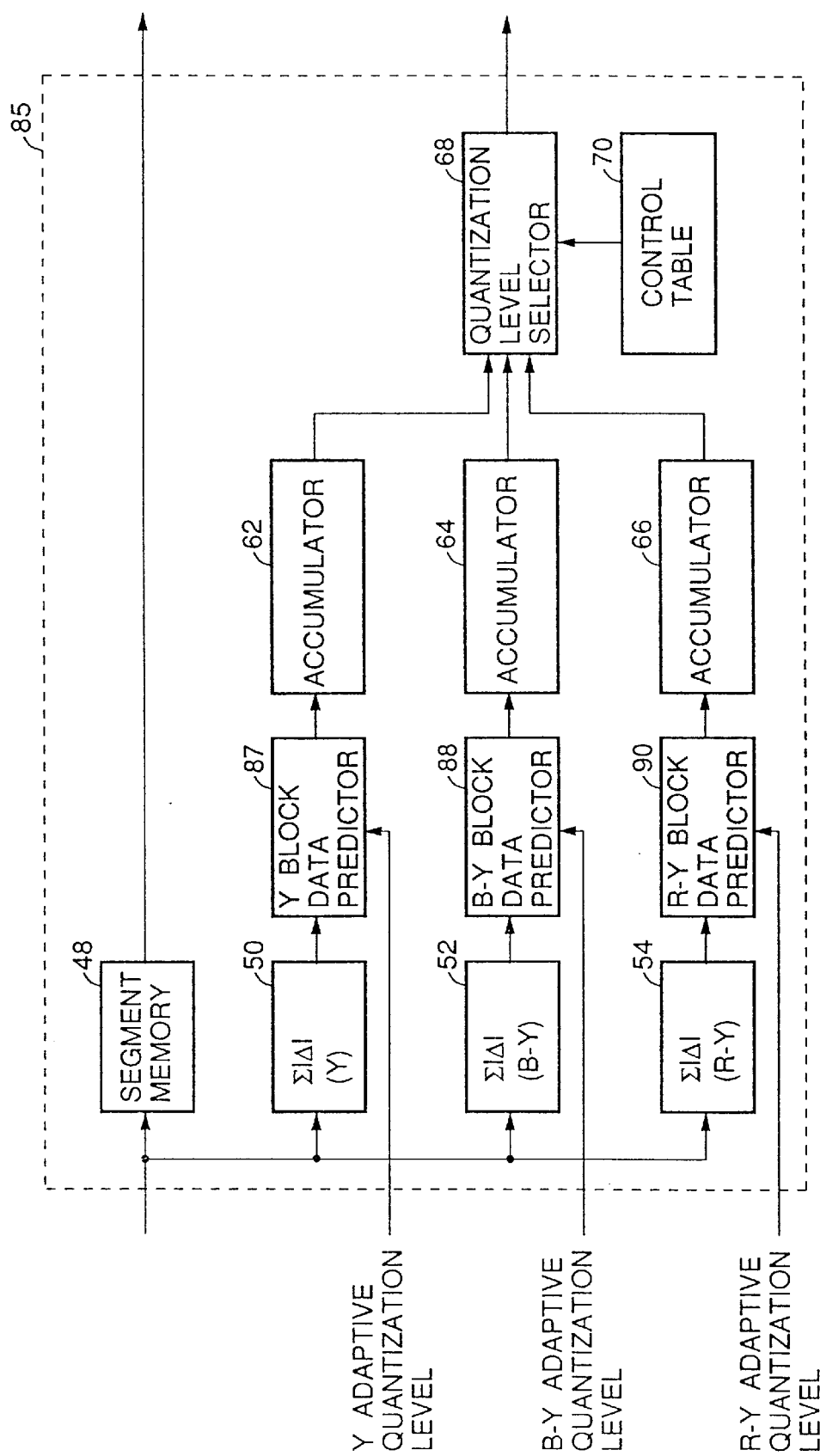
FIG. 17 is a block diagram of the quantization controller in FIG. 14.

Next the structure and operation of the quantization controller 85 will be described. Referring to FIG. 17, the quantization controller 85 is similar to the quantization controller 46 in FIG. 5 except that the luminance block data predictor 56, first chrominance block data predictor 58, and second chrominance block data predictor 60 of the quantization controller 46 are replaced by a luminance block data predictor 87, a first chrominance block data predictor 88, and a second chrominance block data predictor 90. For each luminance block, the luminance block data predictor 87 is notified by the adaptive quantization controller 86 of the adaptive quantization level selected by the adaptive quantization controller 86 for that block as described above. The luminance block data predictor 87 then calculates the predicted amount of encoded data that would be produced at that quantization level. The first chrominance block data predictor 88 and second chrominance block data predictor 90 operate similarly for chrominance blocks.

Figure 18:
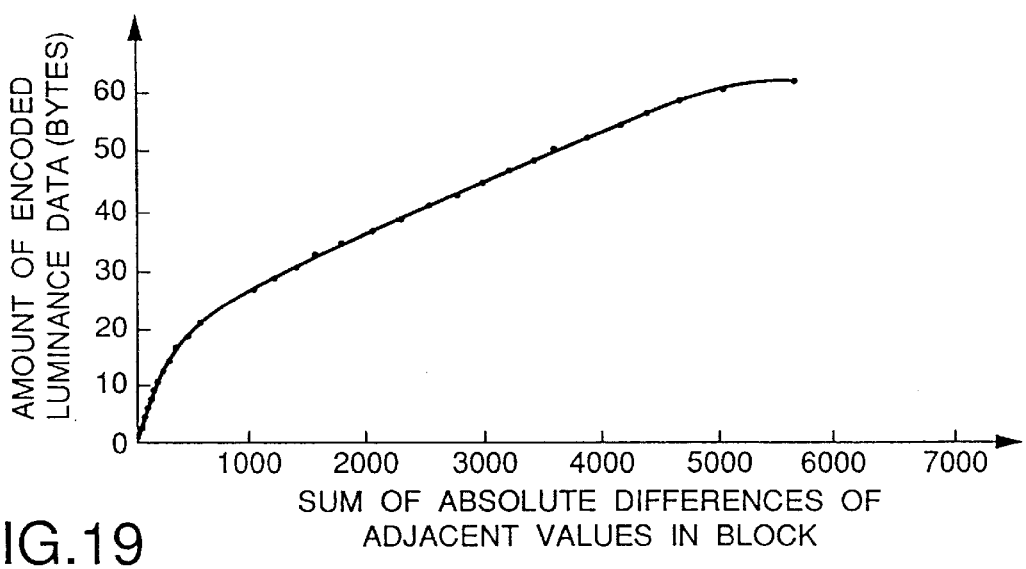
FIG. 18 is a graph illustrating a curve used to predict the amount of encoded luminance data at a first adaptive quantization level.
Figure 19:
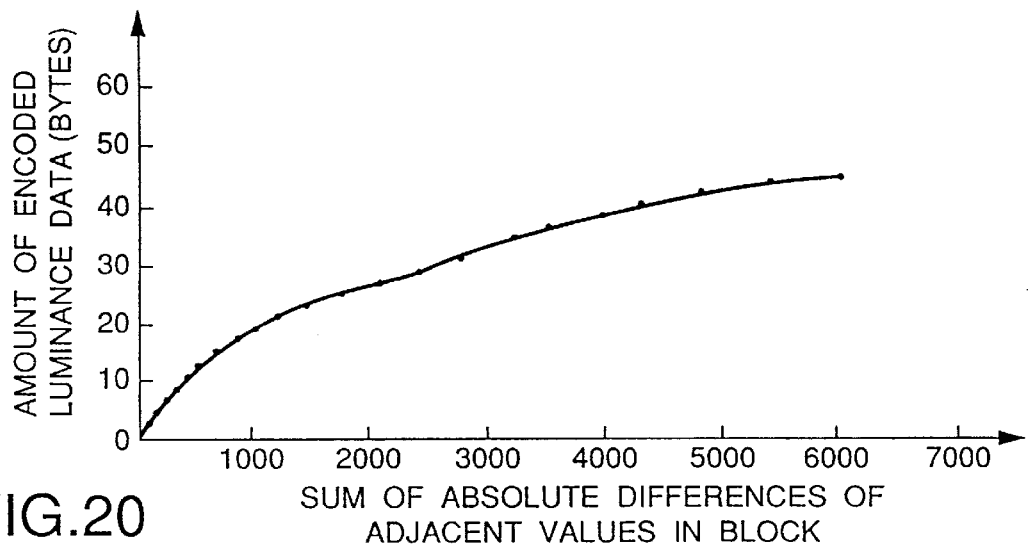
FIG. 19 is a graph illustrating a curve used to predict the amount of encoded luminance data at a second adaptive quantization level.
Figure 20:
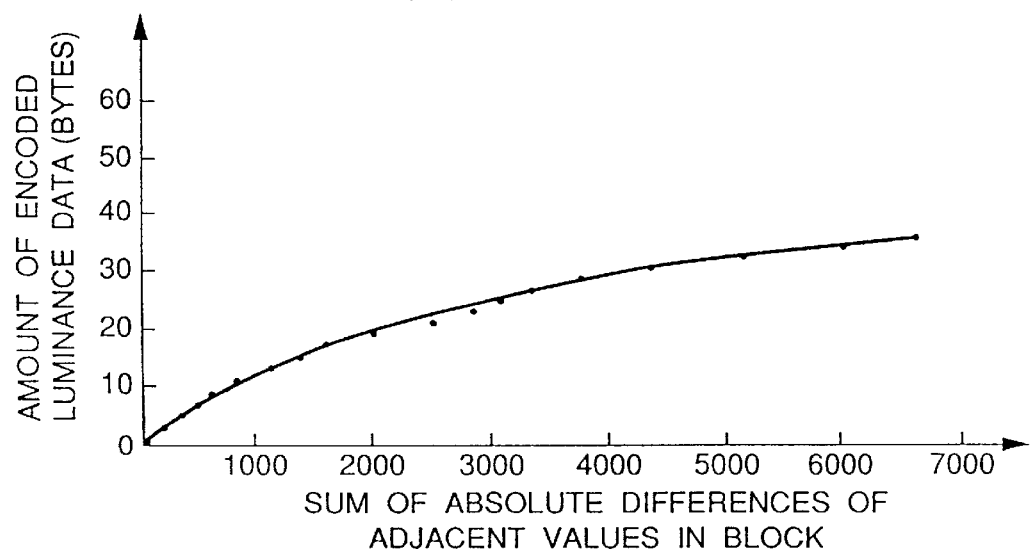
FIG. 20 is a graph illustrating a curve used to predict the amount of encoded luminance data at a third adaptive quantization level.
Figure 21:
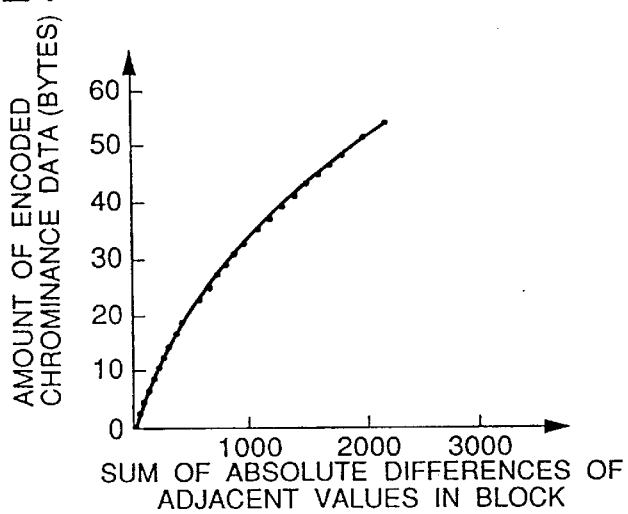
FIG. 21 is a graph illustrating a curve used to predict the amount of encoded chrominance data at the first adaptive quantization level.
Figure 22:
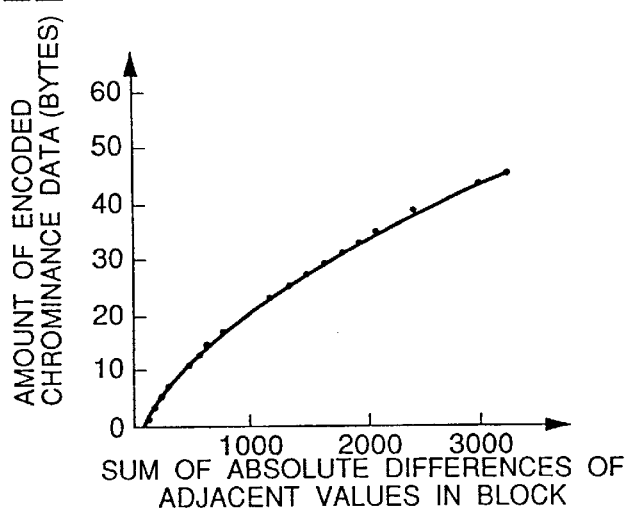
FIG. 22 is a graph illustrating a curve used to predict the amount of encoded chrominance data at the second adaptive quantization level.
Figure 23:
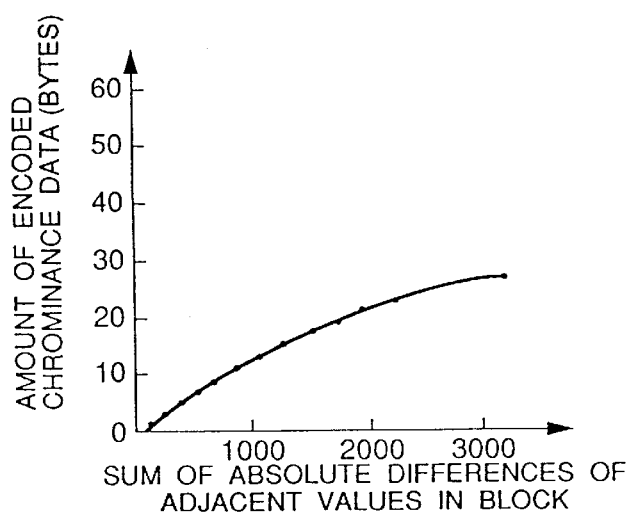
FIG. 23 is a graph illustrating a curve used to predict the amount of encoded chrominance data at the third adaptive quantization level.

Whereas the luminance block data predictor 56 in FIG. 5 stored only the curve shown in FIG. 6 in look-up table form, the luminance block data predictor 87 must store three curves, corresponding to the three adaptive quantization levels that can be selected by the adaptive quantization controller 86. These three curves are shown in FIGS. 18, 19, and 20. The curve in FIG. 18 corresponds to the finest quantization level (level one) in FIG. 16, and the curve in FIG. 20 to the coarsest level (level three). FIGS. 21, 22, and 23 show similar curves for the chrominance data, with FIG. 21 corresponding to the finest quantization level and FIG. 23 to the coarsest. In all six of these graphs the sum of the absolute values of the differences between adjacent pixel values is indicated on the horizontal axis, and the predicted amount of encoded data is indicated on the vertical axis.

The predicted amounts output by the luminance block data predictor 87, the first chrominance block data predictor 88, and the second chrominance block data predictor 90 are summed by the accumulators 62, 64, and 66, and the sums are provided to the quantization level selector 68, which selects a quantization level for the entire field as described above. For example, the quantization level selector 68 selects a quantization level according to Table 2 below, in which E and Q have the same meaning as in Table 1.

TABLE 2

| E | <0.9 | 0.9 to 1.0 | 1.0 to 1.2 | 1.2 to 1.4 | >1.4 |
|---|------|------------|------------|------------|------|
| Q | 1    | 2          | 3          | 4          | 5    |

This quantization level is furnished to the adaptive quantization controller 86. The adaptive quantization controller 86 now determines a final quantization level for each block by adjusting the quantization level selected by the quantization level selector 68 according to the adaptive quantization level that the adaptive quantization controller 86 had earlier selected on the basis of FIG. 16. One possible scheme is shown in Table 3, in which "Field Level" indicates the quantization level selected by the quantization level selector 68 for the entire field, and "Adaptive Level" indicates the adaptive quantization level selected by the adaptive quantization controller 86 for each block on the basis of the parameters A and C in FIG. 16. The numbers in the body of the table indicate the final quantization level selected for each block. This final quantization level is output from the adaptive quantization controller 86 to the quantizer 20 in FIG. 14, which quantizes each block at one of seven quantization levels.

Figure 16:
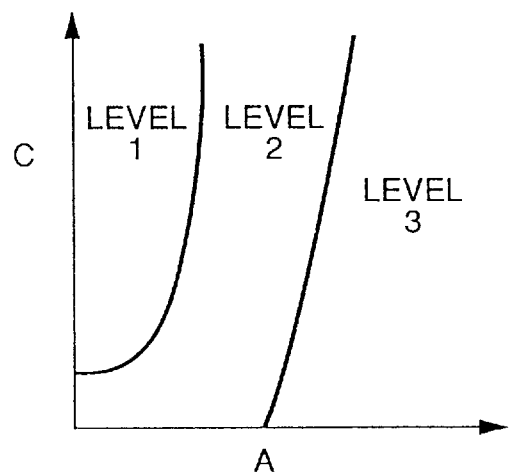
FIG. 16 illustrates an adaptive quantization level selection rule.

For example, if the quantization level selector 68 selects a field quantization level of three, then blocks for which the adaptive quantization controller 86 selected level one in FIG. 16 will be quantized at level three, blocks for which the adaptive quantization controller 86 selected level two in FIG. 16 will be quantized at level four, and blocks for which the adaptive quantization controller 86 selected level three in FIG. 16 will be quantized at level five.

In Table 3, smaller numbers represent finer quantization levels. The adaptive quantization levels supplied by the adaptive quantization controller 86 to the quantization controller 85 for predicting the amount of encoded data are equal to the three final quantization levels corresponding to field level two.

TABLE 3

|  |  | Field Level | | | | |
| --- | --- | --- | --- | --- | --- | --- |
|  |  | 1 | 2 | 3 | 4 | 5 |
| Adaptive | 1 | 1 | 2 | 3 | 4 | 5 |
| Level | 2 | 2 | 3 | 4 | 5 | 6 |
|  | 3 | 3 | 4 | 5 | 6 | 7 |

The sixth embodiment shows adaptive quantization combined with the third embodiment, but adaptive quantization can be combined in the same way with the dynamic-range scheme of the fourth embodiment or the macroblock scheme of the fifth embodiment. The number of adaptive quantization levels is not limited to three as shown in FIG. 16; similar selection rules can be devised with two or four levels, or even more levels. The number of field quantization levels available for selection by the quantization level selector 68 need not be five; any number of levels may be employed as long as there at least two. The possible number of final quantization levels may therefore be any number equal to or greater than three.

8th Embodiment

In the third, fourth, fifth, sixth, and seventh embodiments, the amount of encoded data is predicted from block-formatted data, but it is also possible predict the amount directly from the input digital video signal, prior to block conversion, as described next.

Figure 24:
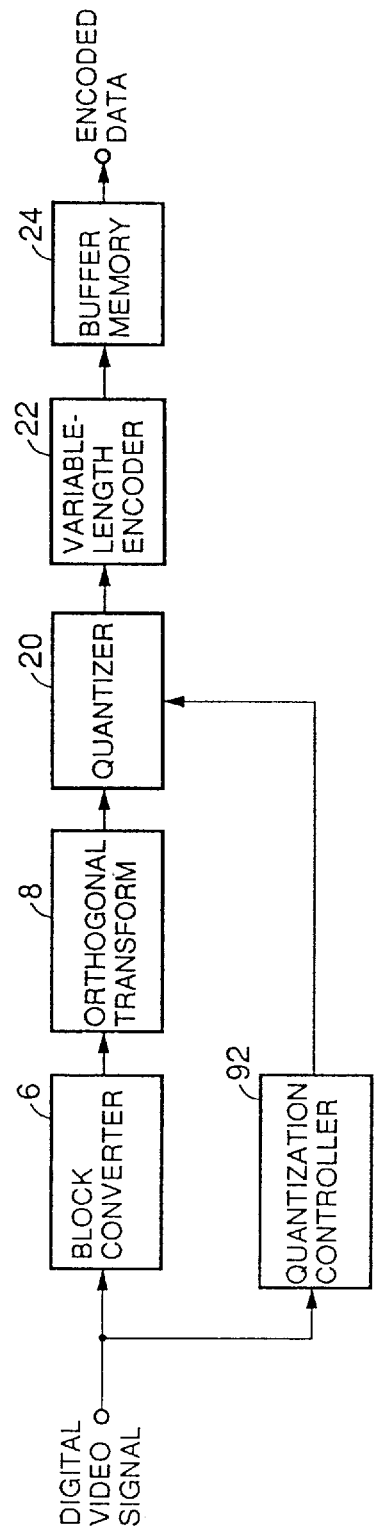
FIG. 24 is a block diagram illustrating an eighth embodiment of the invention.

Referring to FIG. 24, the digital video signal is provided both to the block converter 6 and to a quantization controller 92 which selects a quantization level for each segment (or field) and directs the quantizer 20 to carry out quantization at the selected level. The block converter 6, orthogonal transform processor 8, quantizer 20, variable-length encoder 22, and buffer memory 24 are similar to the elements with the same reference numerals in FIG. 4. The motion estimator and switch are not present in this embodiment.

Figure 25:
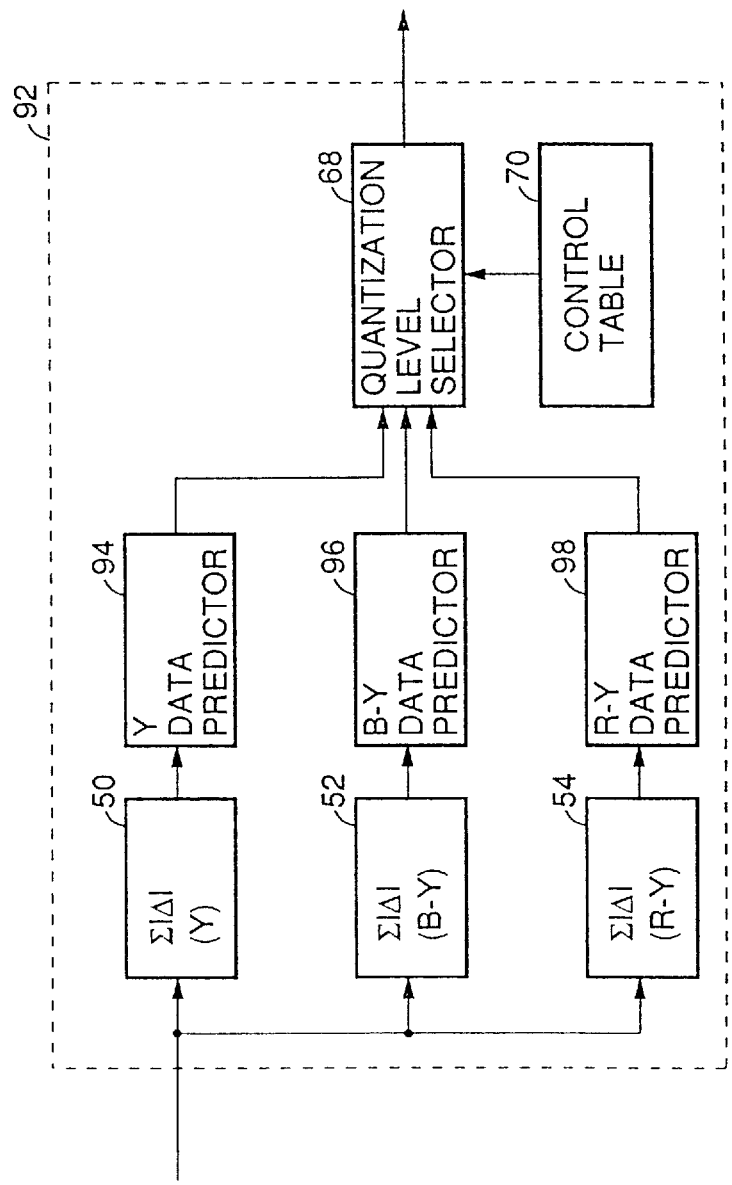
FIG. 25 is a block diagram of the quantization controller in FIG. 24.

Referring to FIG. 25, the quantization controller 92 comprises a luminance signal processor 50, a first chrominance signal processor 52, a second chrominance signal processor 54, a luminance data predictor 94, a first chrominance data predictor 96, a second chrominance data predictor 98, a quantization level selector 68, and a control table 70.

The luminance signal processor 50, first chrominance signal processor 52, and second chrominance signal processor 54, are identical to the elements with the same reference numerals in FIG. 5 except that they operate on an entire field instead of a single block. If the field comprises, for example, 720 pixels in the horizontal direction and 240 scanning lines in the vertical direction, then the luminance signal processor 50 performs the following calculation, where L(i, j) indicate luminance values as before.

$$SY = \sum_{i=1}^{719}\sum_{j=1}^{240} |L(i,j) - L(i+1,j)| + \sum_{i=1}^{720}\sum_{j=1}^{239} |L(i,j) - L(i,j+1)|$$

The first and second chrominance signal processors 52 and 54 perform similar calculations on the B–Y and R–Y components of the digital video signal, respectively. Since the chrominance components are sampled only half as often as the luminance component, there are only 360 pixel values in the horizontal direction, so the formula is as shown below.

C(i, j) represents a B–Y value for the first chrominance signal processor 52, or an R–Y value for the second chrominance signal processor 54.

$$SC = \sum_{i=1}^{359}\sum_{j=1}^{240} |C(i,j) - C(i+1,j)| + \sum_{i=1}^{360}\sum_{j=1}^{239} |C(i,j) - C(i,j+1)|$$

Figure 26:
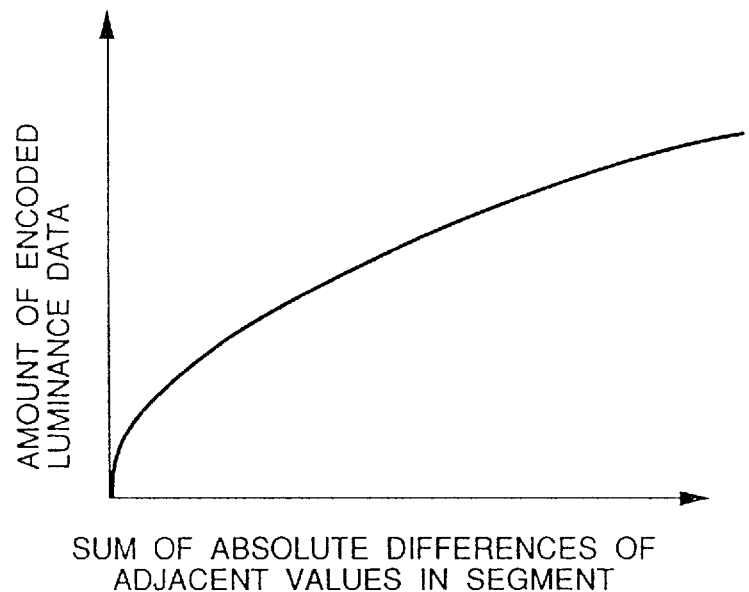
FIG. 26 is a graph illustrating a curve used to predict the amount of encoded luminance data.

From the sum SY output by the luminance signal processor 50, the luminance data predictor 94 predicts the amount of encoded luminance data, using the curve shown in FIG. 26. From the sums SC output by the first and second chrominance signal processors 52 and 54, the first and second chrominance data predictors 96 and 98 predict the amount of encoded chrominance data, using the curve shown in FIG. 27. In both FIGS. 26 and 27, the vertical axis represents the amount of encoded data and the horizontal axis represents the sum of the absolute values of the differences between adjacent pixel values. The quantization level selector 68 adds the three predicted amounts output by the data predictors 94, 96, and 98 to determine the total predicted amount of encoded data for one field, and selects a quantization level for the field with reference to the control table 70.

Figure 27:
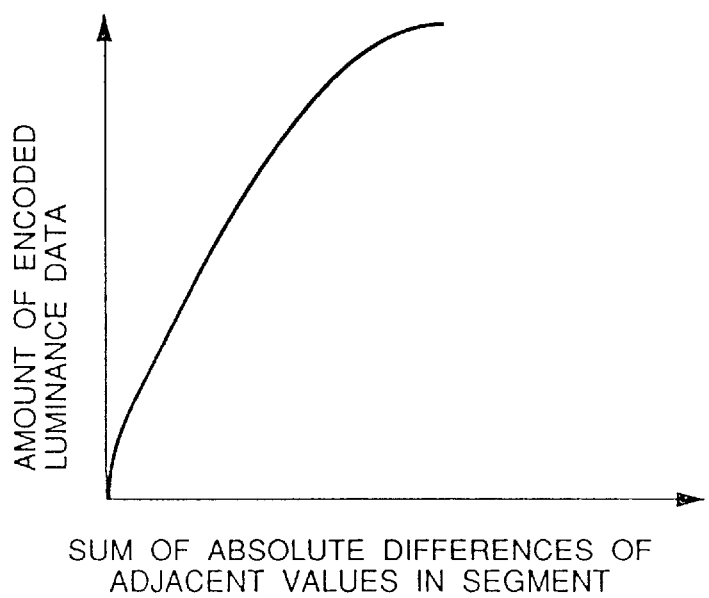
FIG. 27 is a graph illustrating a curve used to predict the amount of encoded chrominance data.

Like the preceding embodiments, the eighth embodiment can also be applied to segments shorter than a field, with suitable modification of the curves shown in FIGS. 26 and 27.

9th Embodiment

In adaptive quantization, further accuracy can be gained by dividing the digital video signal into subbands. A method and apparatus in which this approach is combined with bit-rate control by buffer monitoring will be described next.

Figure 28:
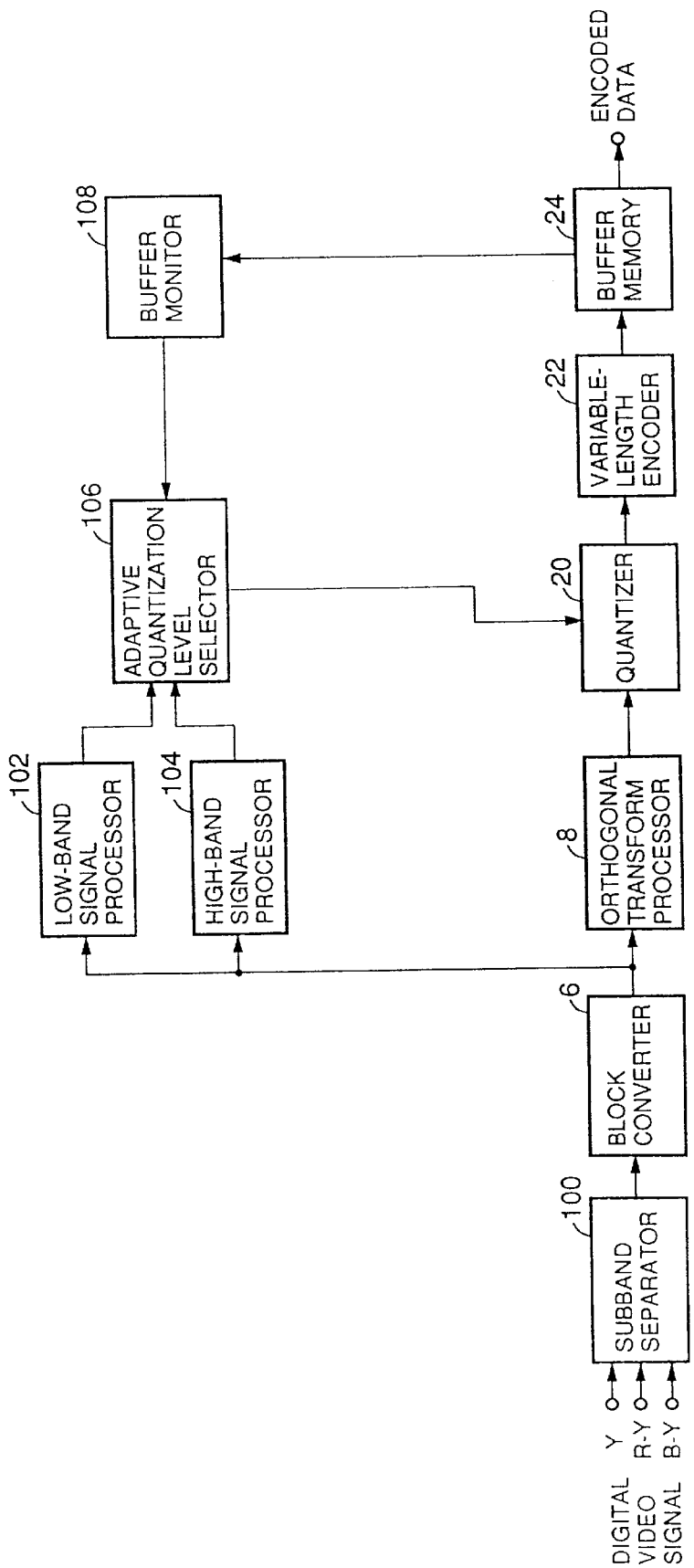
FIG. 28 is a block diagram of a ninth embodiment of the invention.

Referring to FIG. 28, the apparatus comprises a block converter 6, an orthogonal transform processor 8, a quantizer 20, a variable-length encoder 22, and a buffer memory 24, which operate as already described. The apparatus also comprises a subband separator 100, a low-band signal processor 102, a high-band signal processor 104, an adaptive quantization level selector 106, and a buffer monitor 108.

Figure 29:
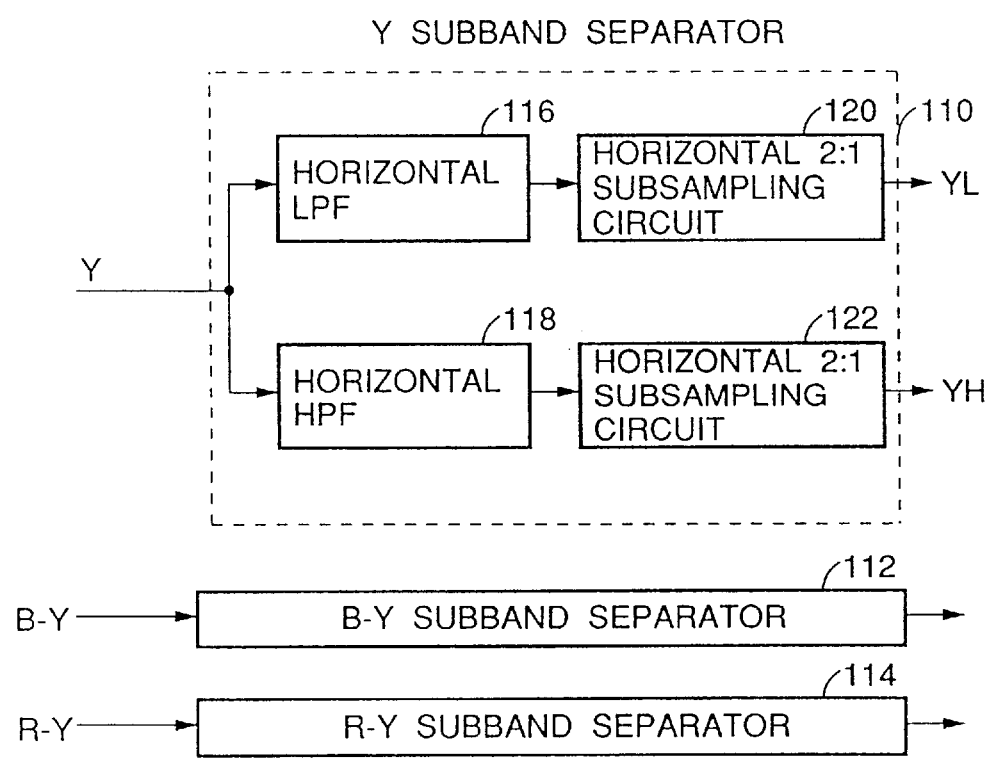
FIG. 29 is a block diagram of the subband separator in FIG. 28.

The subband separator 100 receives the three components (Y, B–Y, and R–Y) of the input digital video signal and divides each component into a low-frequency subband and a high-frequency subband. Referring to FIG. 29, the subband separator 100 comprises three separators: a luminance subband separator 110, a first chrominance subband separator 112, and a second chrominance subband separator 114. These three subband separators are structurally alike, so only the internal structure of the luminance subband separator 110 is shown.

The luminance subband separator 110 comprises a horizontal low-pass filter 116, a horizontal high-pass filter 118, and a pair of horizontal 2:1 subsampling circuits 120 and 122. The horizontal 2:1 subsampling circuit 120 deletes every second pixel value output from the horizontal low-pass filter 116, reducing the number of pixels by a factor of two in the horizontal direction. The horizontal 2:1 subsampling circuit 122 operates likewise on the output of the horizontal high-pass filter 118.

Figure 30:
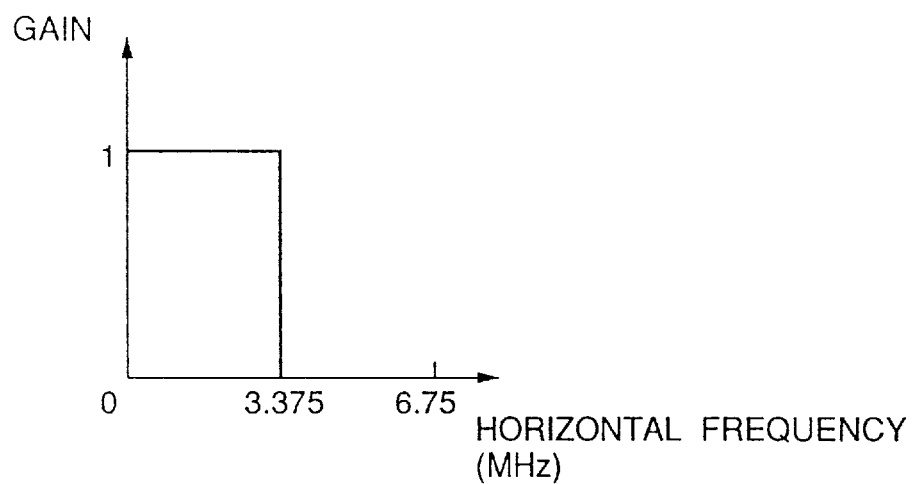
FIG. 30 illustrates the frequency response of the low-pass filter in FIG. 29.
Figure 31:
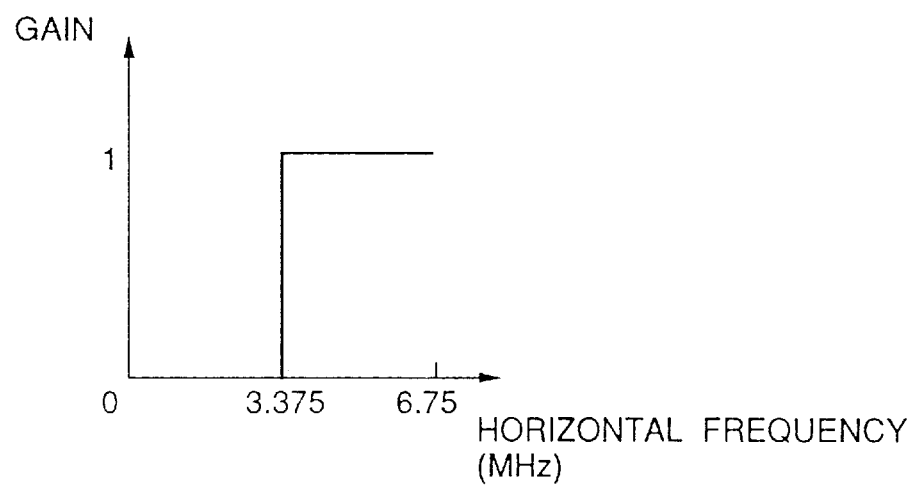
FIG. 31 illustrates the frequency response of the high-pass filter in FIG. 29.

FIG. 30 shows the frequency response of the horizontal low-pass filter 116, which has a cutoff frequency of 3.375 MHz. FIG. 31 shows the frequency response of the horizontal high-pass filter 118, which also has a cutoff frequency of 3.375 MHz. These frequencies are actually spatial frequencies, but they are given in megahertz in relation to the dot clock rate of the digital video signal.

Figure 32:
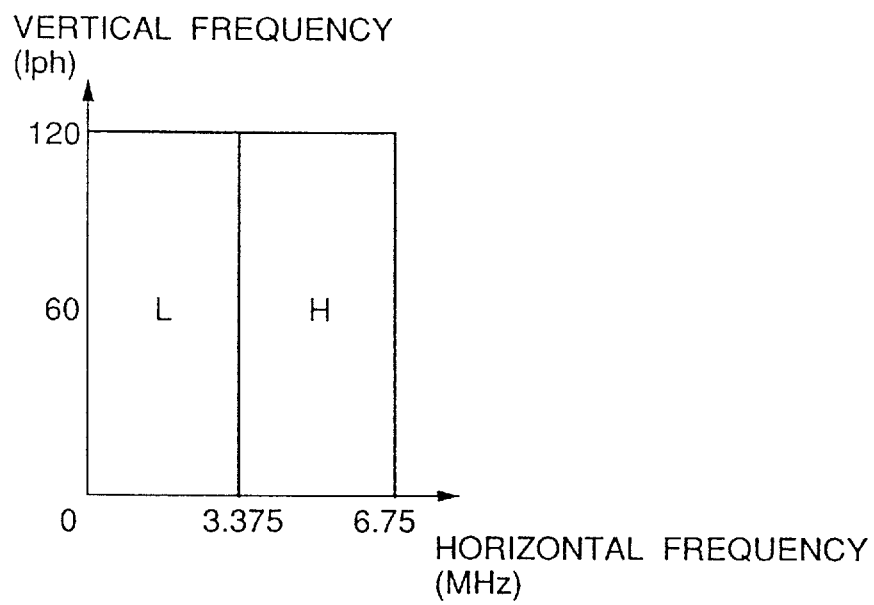
FIG. 32 illustrates the subband decomposition of the luminance component.

Referring to FIG. 32, the luminance subband separator 110 divides the luminance component of the digital video signal into a low-frequency subband L and a high-frequency subband H with respect to frequency in the horizontal direction, (the scanning direction). This does not change the total amount of luminance data, because the horizontal 2:1 subsampling circuits 120 and 122 eliminate half of the data in each subband.

Figure 33:
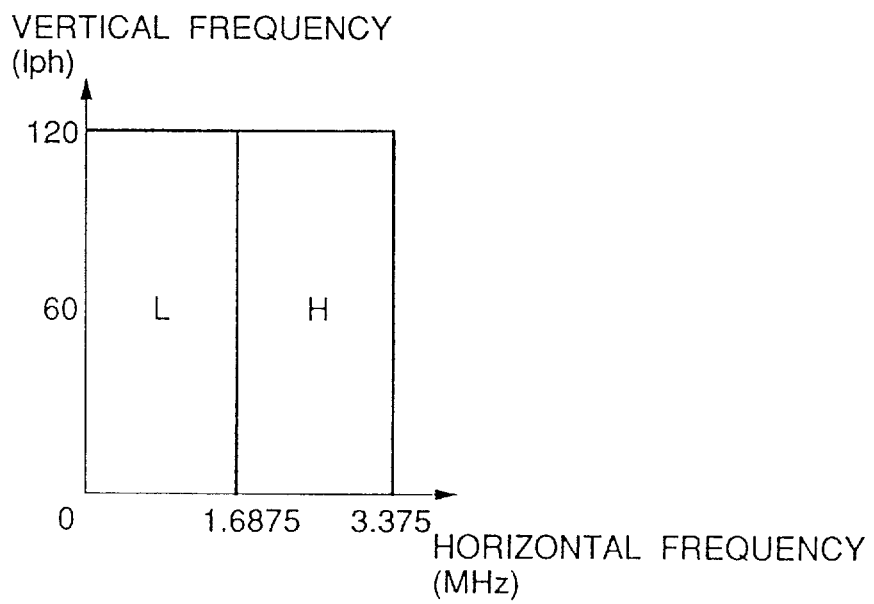
FIG. 33 illustrates the subband decomposition of the chrominance component.

Referring to FIG. 33, the first chrominance subband separator 112 and second chrominance subband separator 114 operate in the same way on the B–Y and R–Y components, except that the cutoff frequency is set at 1.6875 MHz.

Figure 34:
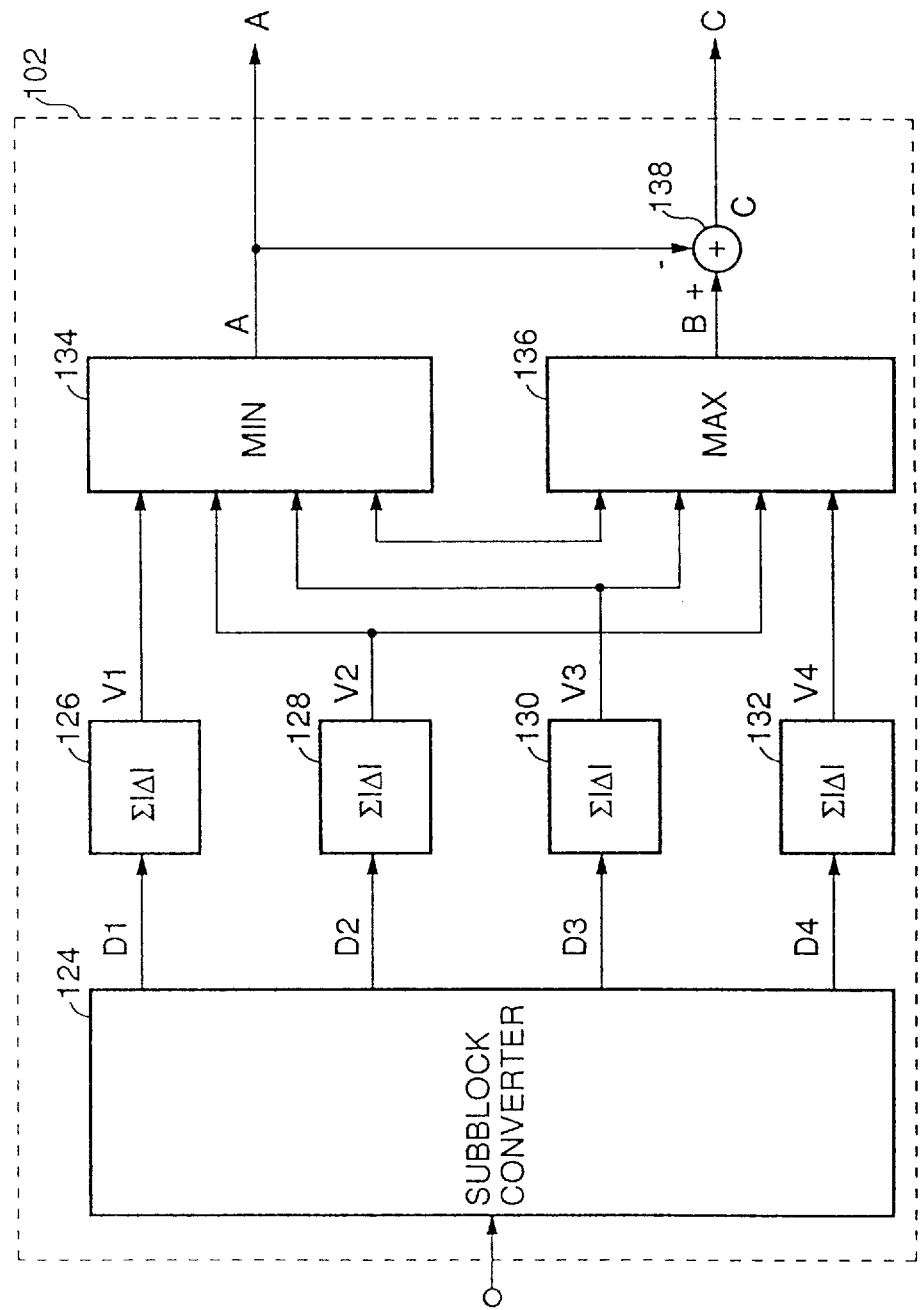
FIG. 34 is a block diagram illustrating the low-band signal processor in FIG. 28.

Next the structure and operation of the low-band signal processor 102 will be described. Referring to FIG. 34, the low-band signal processor 102 comprises a subblock converter 124, four subblock processors 126, 128, 130, and 132, a minimum selector 134, a maximum selector 136, and a subtractor 138. The subblock converter 124 receives an eight-by-eight block of values in the low-frequency subband of one component of the digital video signal, and divides this block into four subblocks, one disposed in each quadrant, as was shown in FIG. 15. The subblock processor 126 computes the sum V1 of the absolute values of the differences between adjacent pixel values in the vertical direction in the first subblock D1. Note that this is different from the computation performed in the eighth embodiment, which also included the differences between horizontally adjacent pixels in the value of V1. The subblock processors 128, 130, and 132 perform similar computations on the second, third, and fourth subblocks D2, D3, and D4 to obtains sums V2, V3, and V4. Letting L(i, j) now stand for low-frequency component values, V1, V2, V3, and V4 are defined as follows.

$$V1 = \sum_{i=1}^{4} \sum_{j=1}^{3} |L(i,j) - L(i,j+1)|$$

$$V2 = \sum_{i=5}^{8} \sum_{j=1}^{3} |L(i,j) - L(i,j+1)|$$

$$V3 = \sum_{i=1}^{4} \sum_{j=5}^{7} |L(i,j) - L(i,j+1)|$$

$$V4 = \sum_{i=5}^{8} \sum_{j=5}^{7} |L(i,j) - L(i,j+1)|$$

The minimum selector 134 finds the minimum A of these four values, the maximum selector 136 finds their maximum B, and the subtractor 138 finds the difference C between A and B:

A=minimum{V1, V2, V3, V4}

B=maximum{V1, V2, V3, V4}

C=B–A

The values A and C form the output of the low-band signal processor 102.

Figure 35:
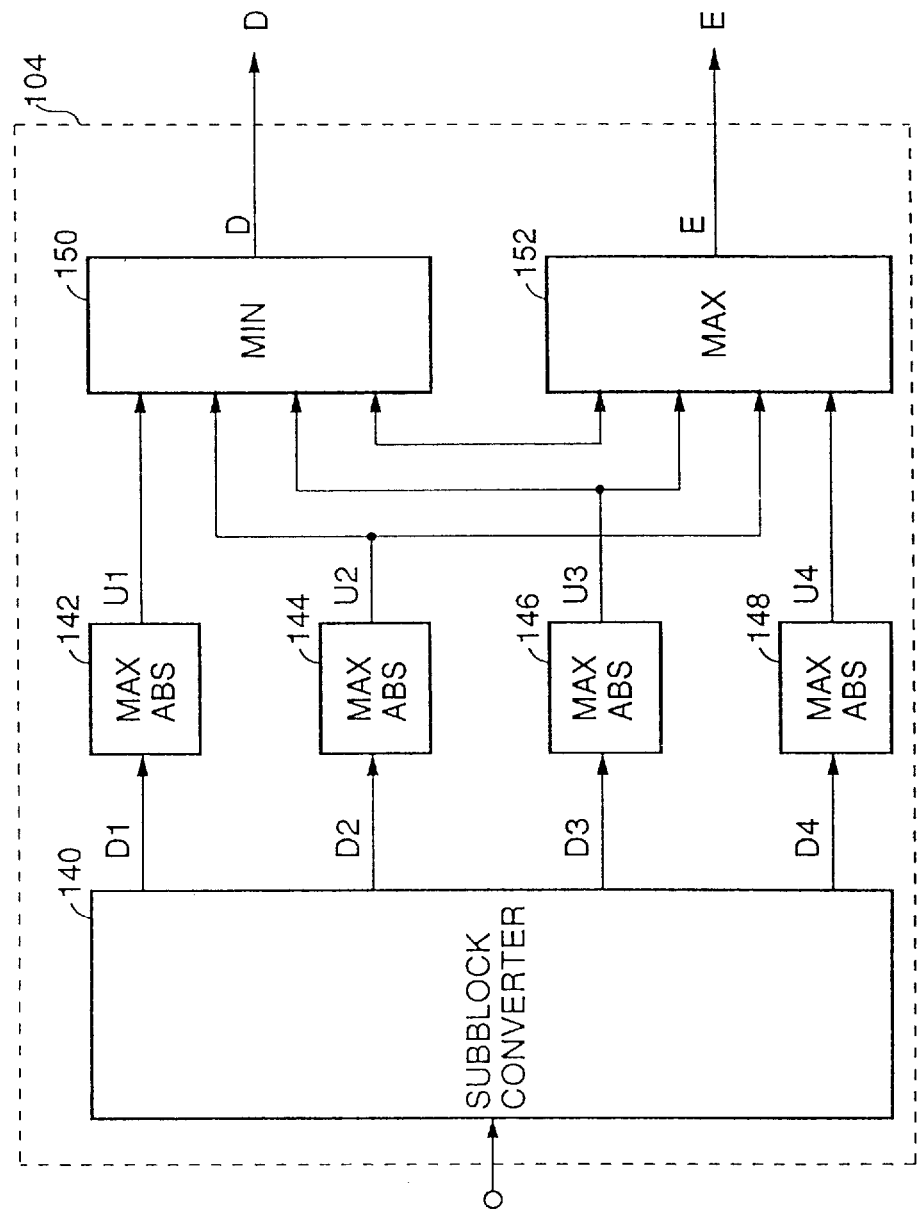
FIG. 35 is a block diagram illustrating the high-band signal processor in FIG. 28.

Next the structure and operation of the high-band 104 will be described. Referring to FIG. 35, the high-signal processor 104 comprises a subblock converter 140, four maximum-absolute-value processors 142, 144, 146, and 148, a minimum selector 150, and a maximum selector 152. The subblock converter 140 receives an eight-by-eight block of values in the high-frequency subband of one component of the digital video signal, and divides this block into four subblocks as shown in FIG. 15. The maximum-absolute-value processor 142 determines the maximum absolute value U1 of the sixteen values in the first subblock D1. The maximum-absolute-value processors 144, 146, and 148 determine similar maximum absolute values U2, U3, and U4 for subblocks D2, D3, and D4. Letting H(i, j) represent the values in a high-frequency block in one of the components, U1, U2, U3, and U4 are defined as follows:

U1=maximum{|H(i, j)|: i=1, 2, 3, 4; j=1, 2, 3, 4}

U2=maximum{|H(i, j)|: i=5, 6, 7, 8; j=1, 2, 3, 4}

U3=maximum{|H(i, j)|: i=1, 2, 3, 4; j=5, 6, 7, 8}

U4=maximum{|H(i, j)|: i=5, 6, 7, 8; j=5, 6, 7, 8}

The minimum selector 150 determines the minimum D of these four values. The maximum selector 152 determines the maximum E of these four values (the maximum absolute value in the block).

D=minimum{U1, U2, U3, U4}

E=maximum{U1, U2, U3, U4}

The values of D and E form the output of the high-band signal processor 104.

Next the operation of the adaptive quantization level selector 106 will be described with reference to FIGS. 36 and 37.

On the basis of the values of A and C output from the low-band signal processor 102, the adaptive quantization level selector 106 selects one of three vertical quantization levels for each low-frequency block. The selection rule is illustrated in FIG. 36. This is essentially the same selection rule as was illustrated in FIG. 16, with the coarsest quantization level (level three) being selected for blocks with a high A value, and the finest quantization level (level one) for blocks with a low A value and high C value.

On the basis of the values of D and E output by the high-band signal processor 104, the adaptive quantization level selector 106 similarly selects a horizontal quantization level for each high-frequency block. The selection rule is illustrated in FIG. 37. The coarsest quantization level (level three) is selected for blocks with a high D value, and the finest quantization level (level one) is selected for blocks with a low D value and high E value.

Figure 36:
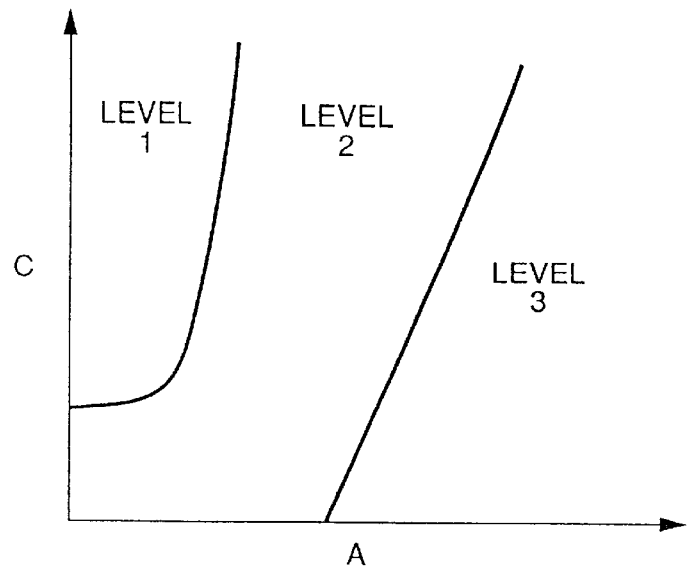
FIG. 36 illustrates a vertical quantization level selection rule.
Figure 37:
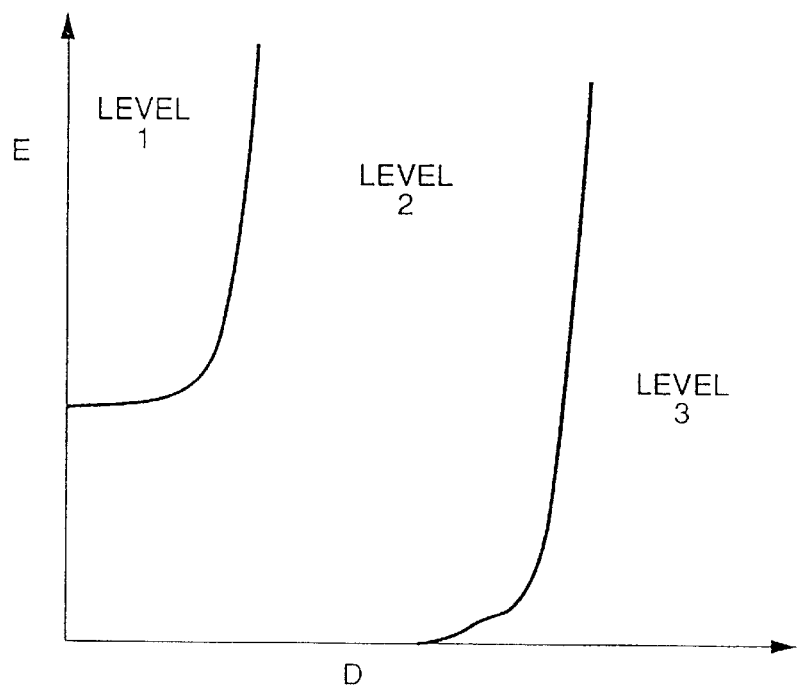
FIG. 37 illustrates a horizontal quantization level selection rule.
Figure 38:
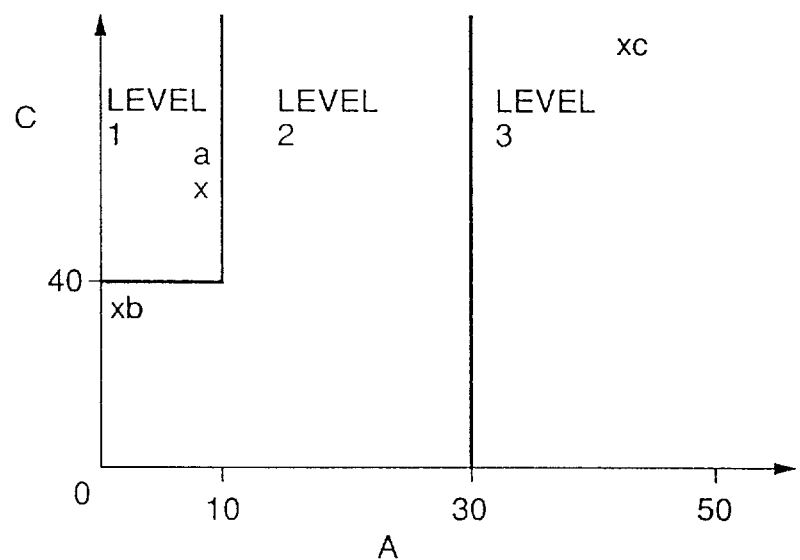
FIG. 38 illustrates a modified vertical quantization level selection rule.
Figure 39:
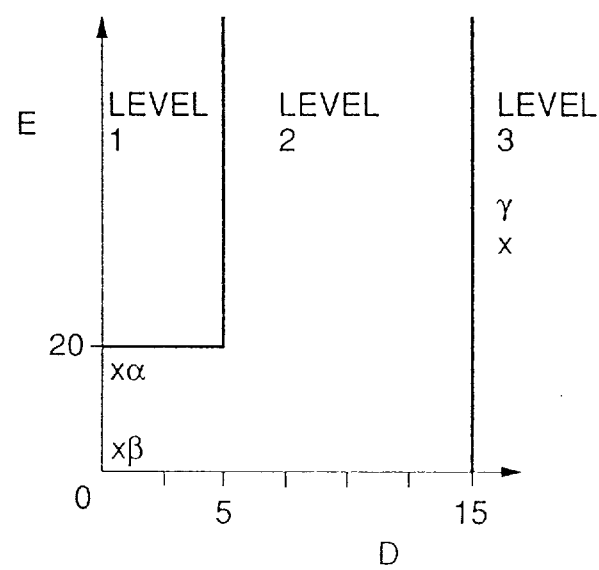
FIG. 39 illustrates a modified horizontal quantization level selection rule.

Although the three regions marked in FIGS. 36 and 37 are bounded by curves, for computational simplicity it is possible to use regions bounded by vertical and horizontal lines as in FIG. 38, which illustrates the vertical quantization level selection rule, and FIG. 39, which illustrates the horizontal quantization level selection rule. Use of the selection rules in these two drawings will be assumed in examples to follow.

Having selected a vertical quantization level and a horizontal quantization level as described above, the adaptive quantization level selector 106 then selects the finer of these two quantization levels as the adaptive quantization level for both high-frequency and low-frequency blocks of the same signal component and image area. For example, if level one is selected as the vertical quantization level and level two is selected as the horizontal quantization level, then level one is selected as the adaptive quantization level.

Figure 40:
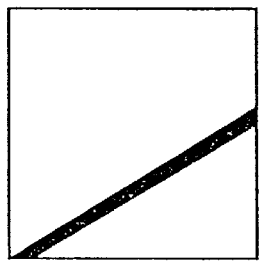
FIG. 40 illustrates an image comprising a line on a flat background.

FIG. 40 shows an example of an image area comprising a single line on a flat background. The computations performed by the low-band signal processor 102 and the high-band signal processor 104 gave the following results:

| V1 = 9 | V2 = 11 | V3 = 15 | V4 = 76 |
| U1 = 6 | U2 = 2  | U3 = 10 | U4 = 13 |

Accordingly,

A=minimum{V1, V2, V3, V4}=9

B=maximum{V1, V2, V3, V4}=76

C=B−A=67

D=minimum{U1, U2, U3, U4}=2

E=maximum{U1, U2, U3, U4}=13

The large value of C and small value of A lead to selection of level one (the finest level) as the vertical quantization level. Specifically, the values of A and C are indicated by the X-mark labeled with the small letter "a" in FIG. 38, which is located in the region of level one. For the horizontal quantization level, since both D and E are small, level two is selected. Specifically, the values of D and E are indicated by the X-mark labeled with the Greek letter α in FIG. 39. The adaptive quantization level selector 106 selects the finest of these two levels, namely level one, as the quantization level for FIG. 40. This is the correct choice, because image degradation due to quantizing noise would be highly noticeable on the flat background in FIG. 40.

Figure 41:
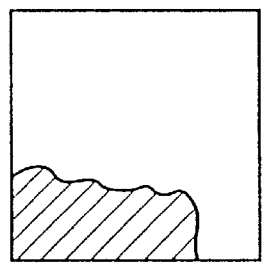
FIG. 41 illustrates an image comprising two flat areas separated by a low-contrast edge.

FIG. 41 shows an example in which two flat background areas are separated by a comparatively low-contrast edge. Computations by the low-band signal processor 102 and the high-band signal processor 104 gave the following results:

| V1 = 29 | V2 = 27 | V3 = 2 | V4 = 2 |
| U1 = 3  | U2 = 2  | U3 = 2 | U4 = 2 |

Accordingly,

A=minimum{V1, V2, V3, V4}=2

B=maximum{V1, V2, V3, V4}=29

C=B−A=27

D=minimum{U1, U2, U3, U4}=2

E=maximum{U1, U2, U3, U4}=3

The corresponding points are indicated by X-marks labeled with the small letter "b" and Greek letter β in FIGS. 38 and 39. In this case the intermediate quantization level (level two) is selected as both the vertical and horizontal quantization levels, hence as the adaptive quantization level of this block. Again this is the correct choice, because although quantizing noise would be noticeable on the flat portions in FIG. 41, there are no extremely high spatial frequencies to generate excessive noise.

Figure 42:
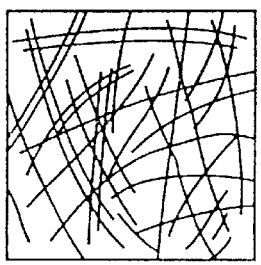
FIG. 42 illustrates an image having no flat areas.

FIG. 42 shows an example in which an entire block has a high degree of activity, with no flat areas. Computations by the low-band signal processor 102 and the high-band signal processor 104 gave the following results:

| V1 = 50 | V2 = 52 | V3 = 80 | V4 = 116 |
| U1 = 17 | U2 = 19 | U3 = 59 | U4 = 65  |

Accordingly,

A=minimum{V1, V2, V3, V4}=50

B=maximum{V1, V2, V3, V4}=116

C=B−A=66

D=minimum{U1, U2, U3, U4}=17

E=maximum{U1, U2, U3, U4}=65

The corresponding points are indicated by X-marks labeled with the small letter "c" and Greek letter τ in FIGS. 38 and 39. In this case the coarsest quantization level (level three) is selected as both the vertical and horizontal quantization level, hence as the adaptive quantization level. Once again this is the correct choice, because the high activity level of the whole block disguises the effects of quantizing noise.

Figure 43:
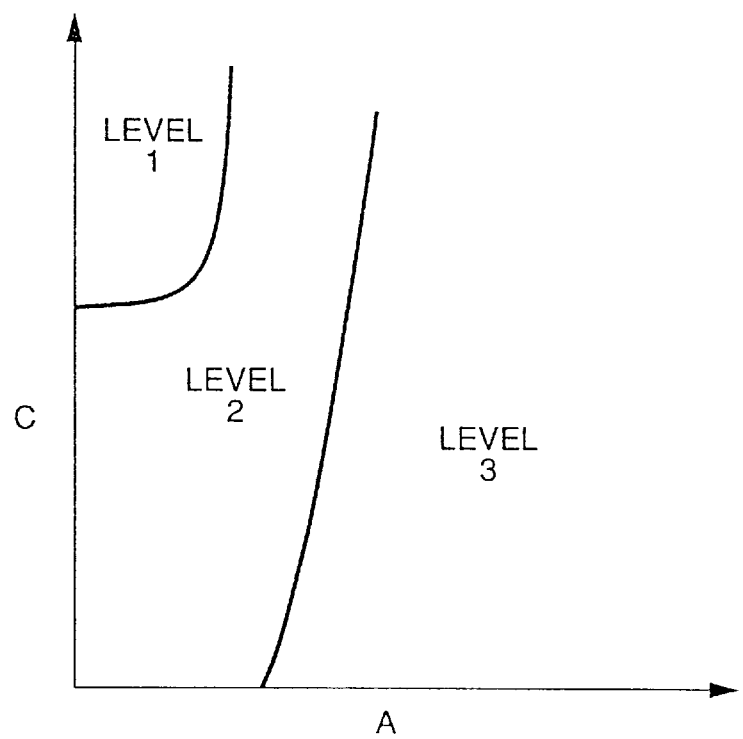
FIG. 43 illustrates an adjusted vertical quantization level selection rule.
Figure 44:
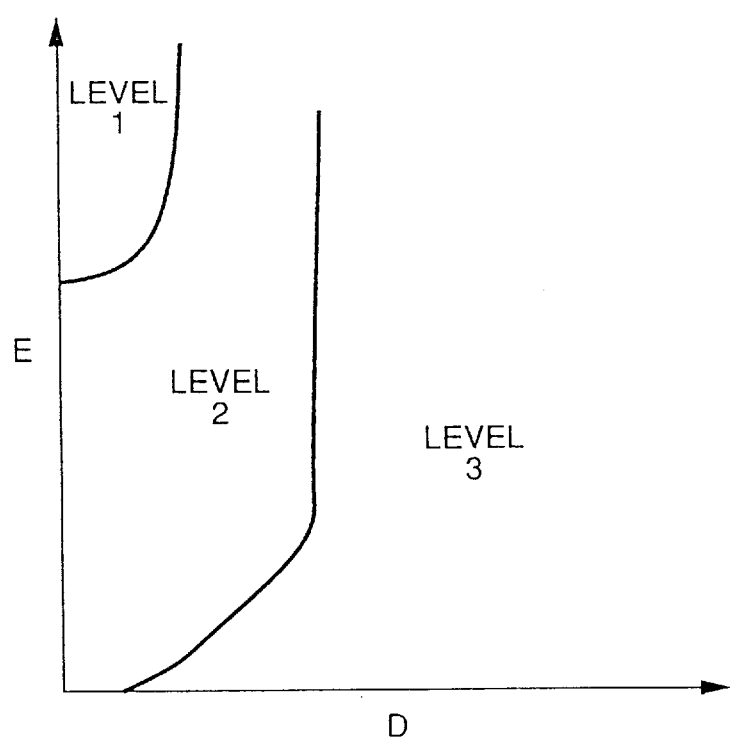
FIG. 44 illustrates an adjusted horizontal quantization level selection rule.

The selection rules employed by the adaptive quantization level selector 106, illustrated in FIGS. 36 and 37 or FIGS. 38 and 39, are varied according to a control parameter received from the buffer monitor 108 in FIG. 28, which monitors the amount of space remaining in the buffer memory 24. As an example, if there is ample space in the buffer memory 24, the buffer monitor 108 instructs the adaptive quantization level selector 106 to use the selection rules in FIGS. 36 and 37. If the buffer memory 24 is filling too rapidly, the buffer monitor 108 instructs the adaptive quantization level selector 106 to use selection rules illustrated in FIG. 43 for the vertical quantization level and FIG. 44 for the horizontal quantization level. The rules in FIGS. 43 and 44 enlarge the area allocated to quantization level three and reduce the area allocated to quantization level one, so that overall, a coarser quantization level tends to be applied, resulting in less encoded data.

Finally, the operation of the ninth embodiment will be summarized with reference again to FIG. 28. Each field of the digital video signal is first input to the subband separator 100, which separates each of the three components into two subbands as described above. The block converter 6 then rearranges each subband of each component into eight-by-eight blocks of data values, and outputs each block to the orthogonal transform processor 8, the low-band signal processor 102, and the high-band signal processor 104. The orthogonal transform processor 8 executes, for example, a discrete cosine transform on each block to generate coefficient values. These are quantized by the quantizer 20 at a quantization level designated by the adaptive quantization level selector 106, then encoded by the variable-length encoder 22 and stored in the buffer memory 24. The buffer monitor 108 monitors the rate at which the buffer memory 24 is filling up and controls the selection rules used in the adaptive quantization level selector 106 so as to prevent buffer overflow. As a result, an amount of encoded data substantially equal to the nominal amount is generated for each field, and the quantization level is controlled so as to avoid serious image degradation.

The selection rules given above can be used with both interlaced and non-interlaced scanning. In an interlaced signal, correlation between successive scanning lines tends to be comparatively weak, so the vertical quantization level can be determined by the parameters C and D instead of C and A, with C serving as before to detect edges, and D (the minimum of the maximum subblock values in the high-frequency subband) to detect flat areas.

FIGS. 32 and 33 show the digital video signal divided into two subbands with respect to frequency in the horizontal spatial direction, but it is possible to divide the signal into more than two subbands, or into subbands with respect to the vertical spatial direction, or into subbands with respect to the time axis, suitable modifications being made in the subsequent computations. It is also possible to divide a block into subblocks in ways other than illustrated in FIG. 15. The subblock division scheme can be selected according to the size of the block, using more than four subblocks if the block size is larger than eight-by-eight, for example.

Another possible modification of the subblock division scheme makes use of overlapping subblocks. This avoids the problem of non-detection of edges disposed exactly on the boundary between two subblocks. One possible overlapping subblock decomposition will be described next.

10th Embodiment

Referring to FIG. 45, each eight-by-eight block is divided into nine overlapping four-by-four subblocks designated D1, ..., D9. Of these, D1, D2, D3, and D4 are identical to the subblocks shown in FIG. 15. D5 and D6 are vertically adjacent, and are disposed midway between the right and left edges of the eight-by-eight block. D7 and D8 are horizontally adjacent, and are disposed midway between the upper and lower edges of the eight-by-eight block. D9 is disposed in the center of the eight-by-eight block.

Figure 46:
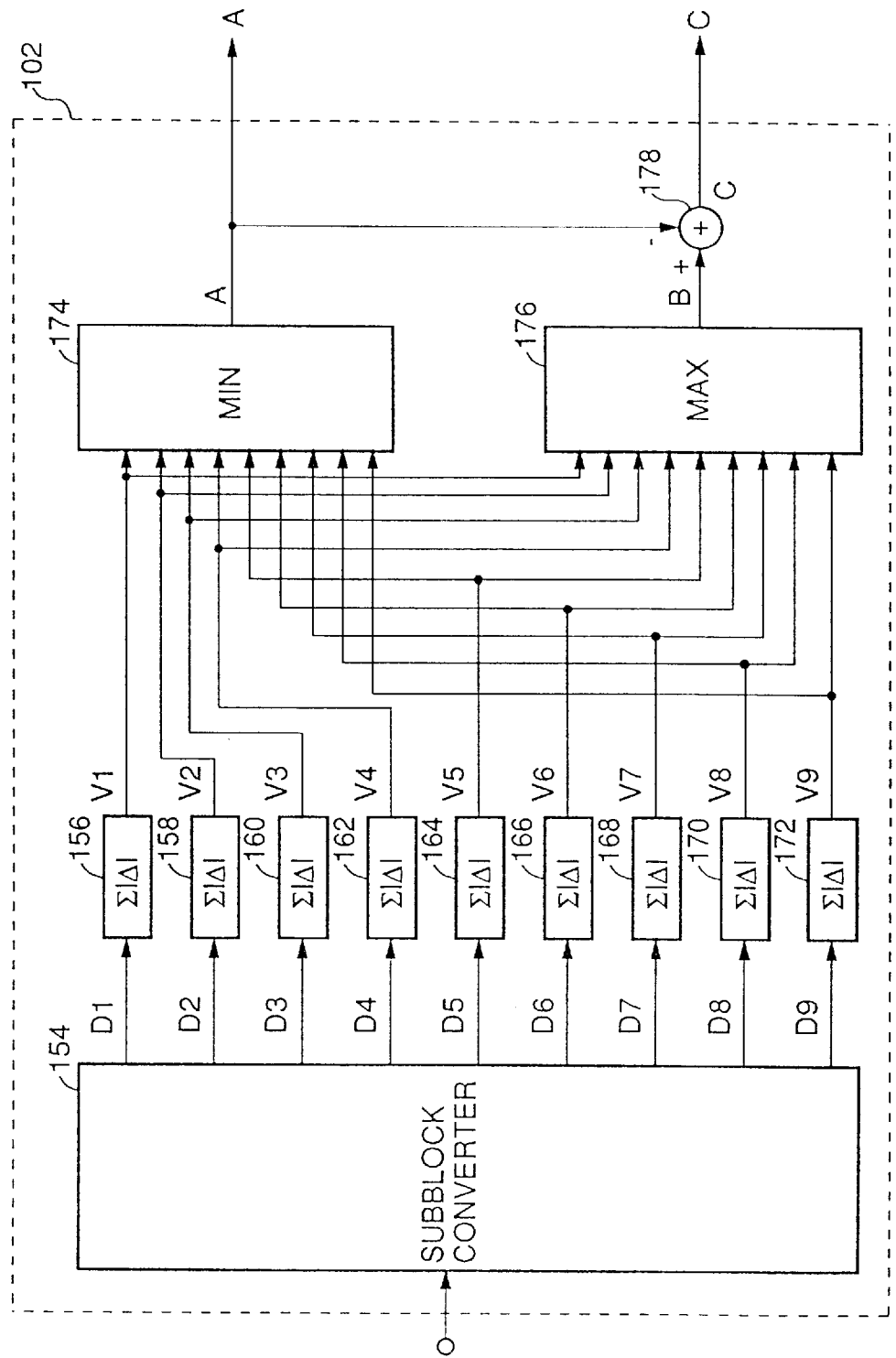
FIG. 46 illustrates a low-band signal processor for the tenth embodiment.

FIG. 46 illustrates the low-band signal processor 102 for this subblock decomposition. For a block in the low frequency subband, the subblock converter 154 generates nine subblocks of values. Nine subblock processors 156, 158, 160, 162, 164, 166, 168, 170, and 172 compute sums of absolute differences of vertically adjacent pixel values within each subblock to generate nine sums V1, ..., V9. The minimum selector 174 determines the minimum A of these nine sums. The maximum selector 176 determines their maximum B. The subtractor 178 computes C=B−A.

Figure 47:
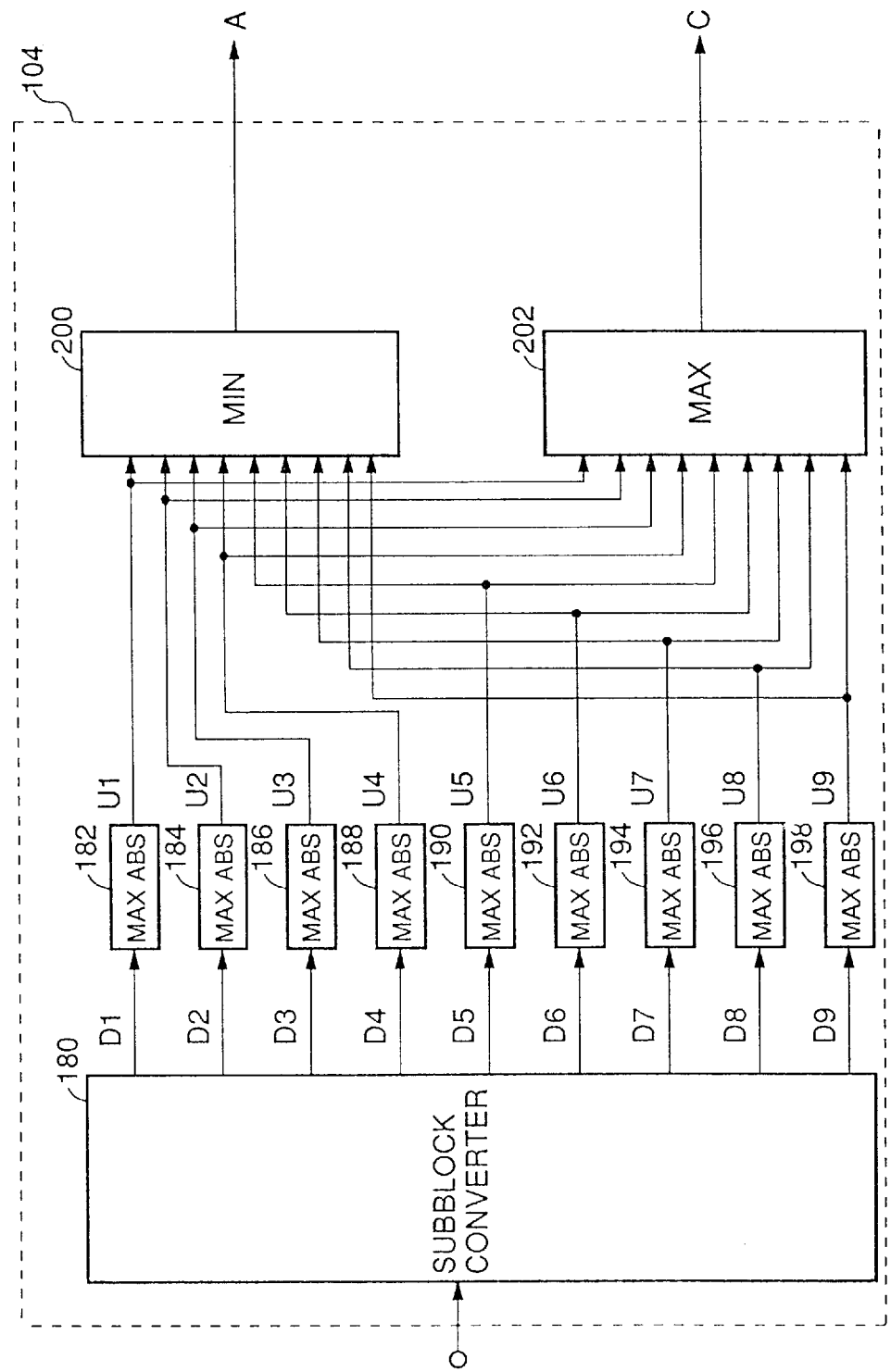
FIG. 47 illustrates a high-band signal processor for the tenth embodiment.

FIG. 47 illustrates the high-band signal processor 104 for this subblock decomposition. The subblock converter 180 generates nine subblocks of values for a block in the high frequency subband. Nine maximum-absolute-value processors 182, 184, 186, 188, 190, 192, 194, 196, and 198 compute the maximum absolute value in each subblock, thereby producing nine output values U1, ..., U9. The minimum selector 200 determines the determines the minimum D of these nine values. The maximum selector 176 determines their maximum E.

Aside from the different subblock decomposition, this embodiment operates like the ninth embodiment, so further description will be omitted.

The overlapping subblock decomposition shown in FIG. 45 is of course not the only possible overlapping subblock decomposition. Other decompositions, which may have more or fewer than nine overlapping subblocks, can be used.

11th Embodiment

Figure 48:
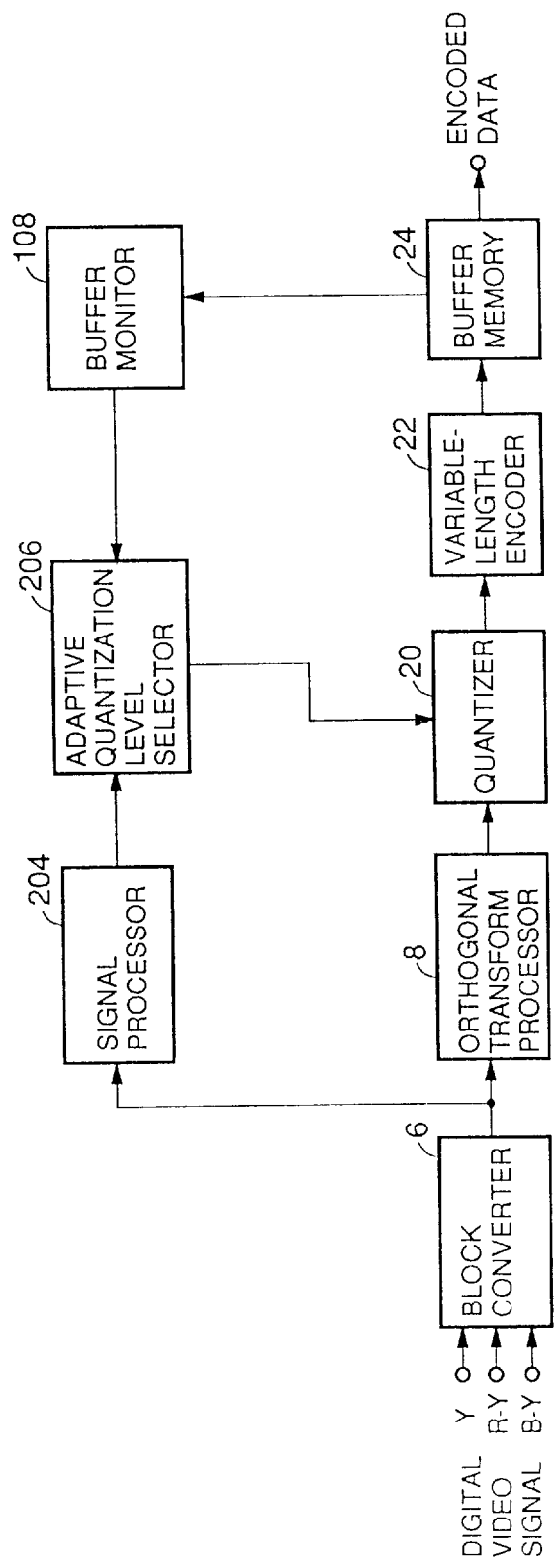
FIG. 48 is a block diagram illustrating an eleventh embodiment of the invention.

The eleventh embodiment uses the overlapping subblock decomposition of FIG. 45 without subband separation. Referring to FIG. 48, this embodiment comprises a block converter 6, an orthogonal transform processor 8, a quantizer 20, a variable-length encoder 22, a buffer memory 24, a signal processor 204, an adaptive quantization level selector 206, and a buffer monitor 108. The block converter 6 formats the luminance and chrominance components of the input digital video signal into eight-by-eight blocks, which it provides to the orthogonal transform processor 8 and the signal processor 204. The orthogonal transform processor 8, quantizer 20, variable-length encoder 22, buffer memory 24, and buffer monitor 108 are as described previously. The adaptive quantization level selector 206 selects quantization levels for the quantizer 20 on the basis of information received from the signal processor 204 and buffer monitor 108.

Figure 49:
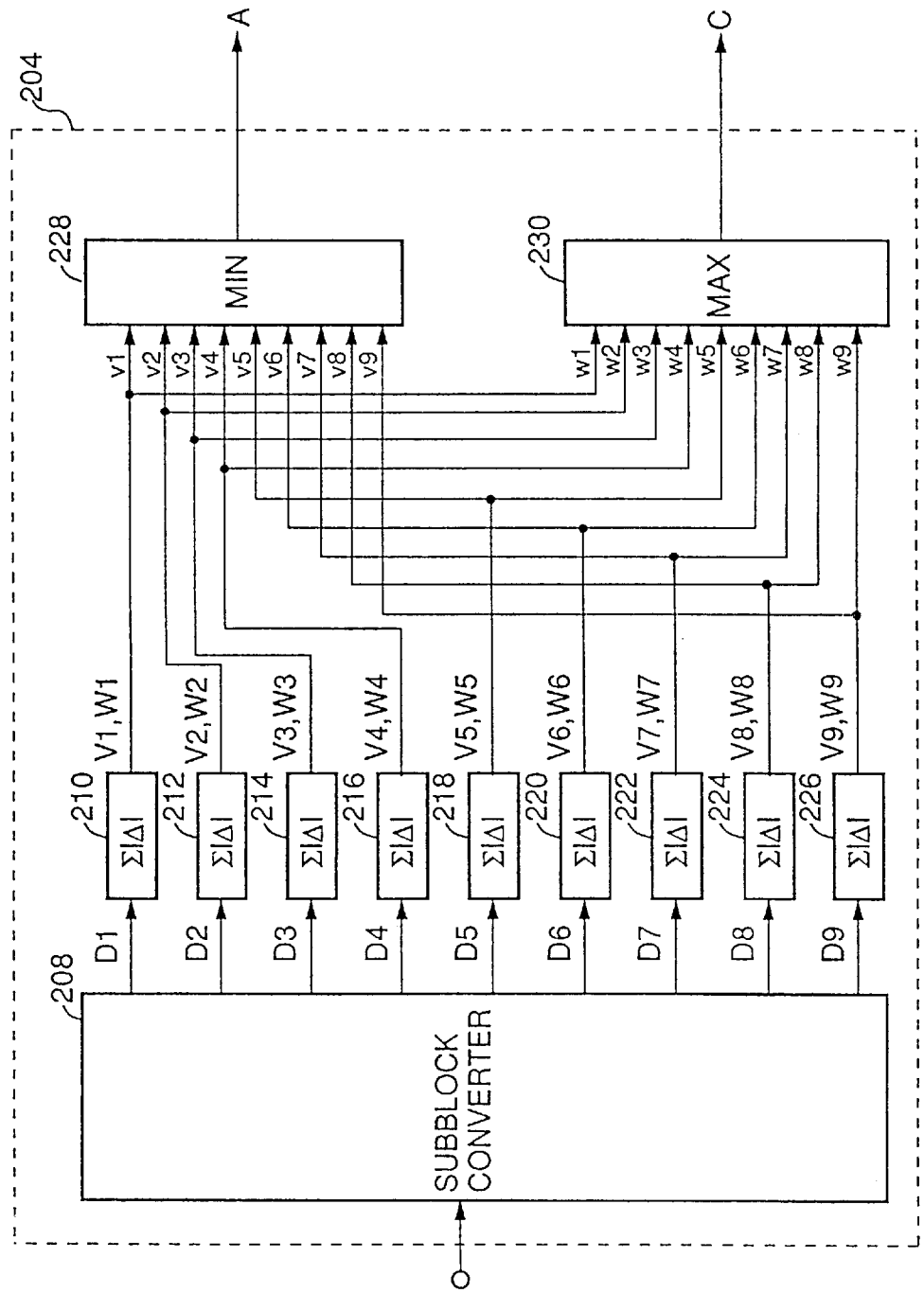
FIG. 49 is a block diagram illustrating the signal processor in FIG. 48.

Referring to FIG. 49, the signal processor 204 comprises a subblock converter 208 that generates nine subblocks as illustrated in FIG. 45, and nine subblock processors 210, 212, 214, 216, 218, 220, 222, 224, and 226 that compute a pair of values Vk and Wk for each subblock Dk (k=1, 2, ..., 9). The Vk are sums of absolute values of differences between the values of horizontally adjacent pixels. Note that this differs from all of the preceding embodiments. The Wk are sums of absolute values of differences between values of both vertically and horizontally adjacent pixels. Letting L(i, j) represent the pixel values, in the first subblock D1:

$$V1 = \sum_{i=1}^{3} \sum_{j=1}^{4} |L(i,j) - L(i+1,j)|$$

$$W1 = \sum_{i=1}^{3} \sum_{j=1}^{4} |L(i,j) - L(i+1,j)| + \sum_{i=1}^{4} \sum_{j=1}^{3} |L(i,j) - L(i,j+1)|$$

The values of Vk and Wk in other subblocks are computed by similar formulas with different ranges of i and j.

The minimum selector 228 finds the minimum value A among the Vk.

A=minimum{V1, V2, V3, V4, V5, V6, V7, V8, V9}

The maximum-minus-minimum processor 230 computes the maximum NUM1 and minimum NUM2 of the Wk and the difference C between the maximum and minimum.

NUM1 = maximum {W1, W2, W3, W4, W5, W6, W7, W8, W9}
NUM2 = minimum {W1, W2, W3, W4, W5, W6, W7, W8, W9}
C = NUM1 − NUM2

The signal processor 204 supplies the values of A and C to the adaptive quantization level selector 206. The adaptive quantization level selector 206 then selects a quantization level by a selection rule similar to those in the preceding two embodiments.

Figure 50:
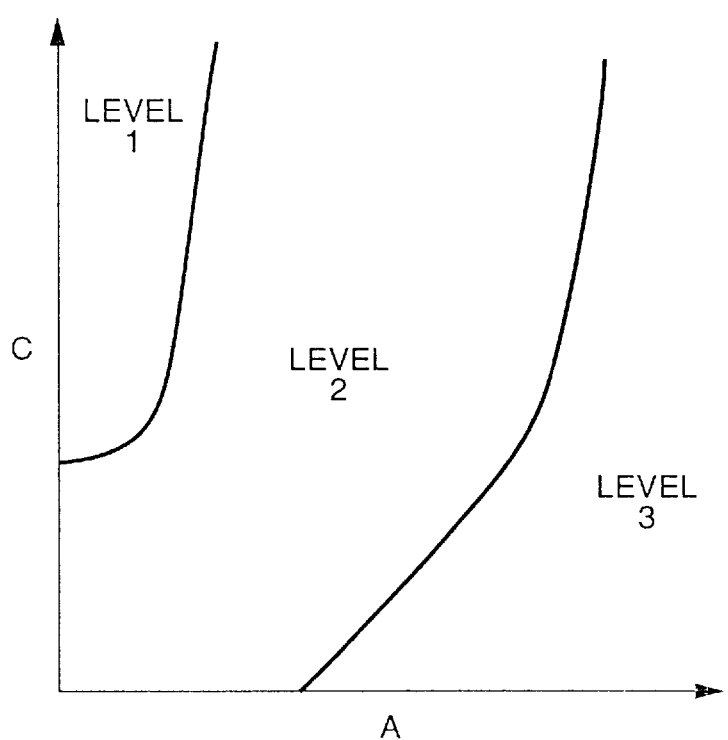
FIG. 50 illustrates a quantization level selection rule.

FIG. 50 shows the general form of the selection rule: the coarsest quantization level (level three) is selected for large values of A, and the finest level (level one) for small values of A combined with large values of C. Small values of A identify blocks with flat regions, while large values of C identify blocks with high-contrast elements such as edges. The locations of the curves dividing levels one, two, and three in FIG. 50 are adjusted according to a control parameter output by the buffer monitor 108, as in the ninth embodiment, so as to avoid buffer overflow.

This embodiment can be modified by using a different overlapping subblock decomposition from the one shown in FIG. 45. The subblock decomposition can be selected according to the block size. Moreover, instead of using the parameter A to identify blocks with flat areas, the parameter NUM2 can be used for the same purpose. That is, flat areas can, be identified by testing pixel differences in both the horizontal and vertical directions, instead of just the horizontal direction.

12th Embodiment

The preceding embodiments avoid buffer overflow by controlling the quantization level. Next an additional method of avoiding buffer overflow, without reference to the quantization level, will be described. This method is applicable to any segment length, and can be used to fine-tune the amount of encoded data.

Figure 51:
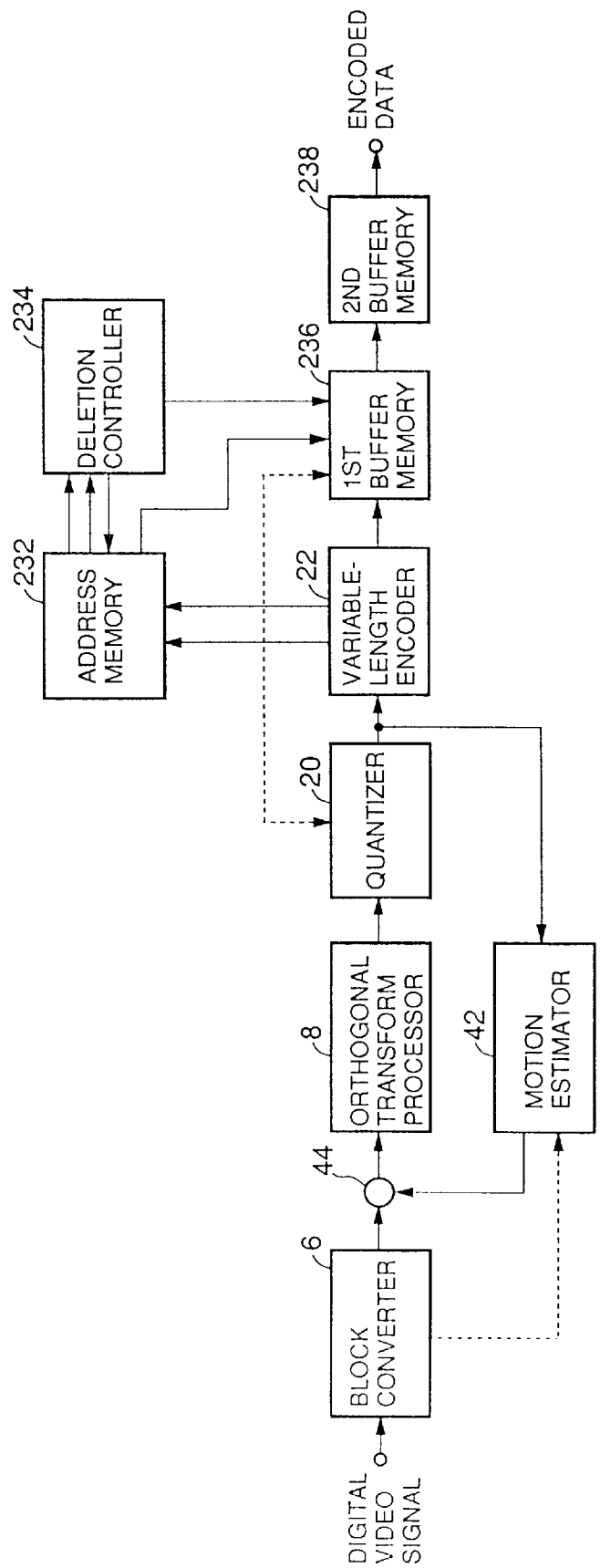
FIG. 51 is a block diagram illustrating a twelfth embodiment of the invention.

Apparatus for this method is shown in FIG. 51, comprising a block converter 6, a switch 44, an orthogonal transform processor 8, a quantizer 20, a variable-length encoder 22, a motion estimator 42, an address memory 232, a deletion controller 234, a first buffer memory 236, and a second buffer memory 238. The block converter 6, orthogonal transform processor 8, quantizer 20, variable-length encoder 22, and motion estimator 42 are as already described. In this embodiment the bit rate is partly controlled by buffer monitoring, by varying the quantization level in response to the rate at which the first buffer memory 236 is filling up, as indicated by the dotted arrow from the first buffer memory 236 to the quantizer 20.

The encoded data output by the variable-length encoder 22 are stored in the first buffer memory 236. The encoded data for each block end with an end-of-block (EOB) codeword. When the variable-length encoder 22 writes the data for each block in the first buffer memory 236, it also writes the address and length of the codeword immediately preceding the end-of-block codeword in the address memory 232. After all the encoded data for one segment have been stored in the first buffer memory 236, they are copied from the first buffer memory 236 to the second buffer memory 238 under control of the deletion controller 234. If the amount of encoded data stored in the first buffer memory 236 exceeds the nominal amount, the deletion controller 234 uses the information stored in the address memory 232 to delete certain codewords, so that the amount of data copied to the second buffer memory 238 is substantially equal to the nominal amount. From the second buffer memory 238, the data are output to a recording or transmitting device.

Figures 52, 53:
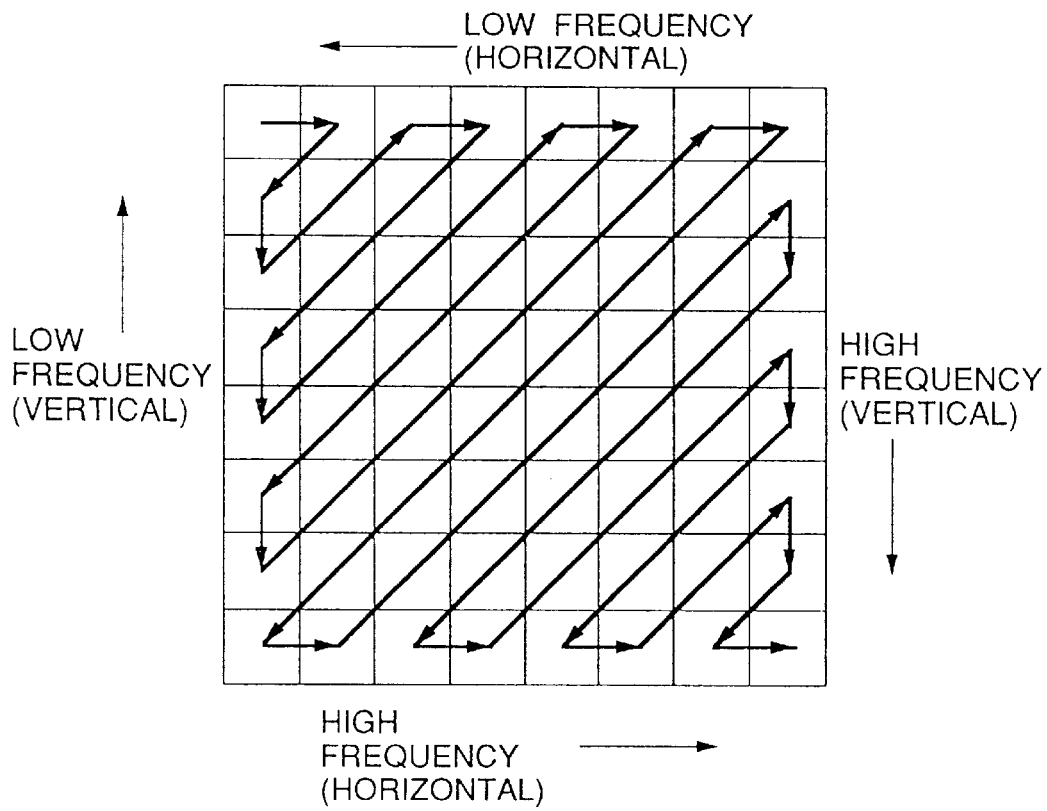
FIG. 52 illustrates zigzag scanning of a block of quantized coefficients.
FIG. 53 illustrates run-length encoding.

This embodiment employs a run-length method of encoding, which will be explained briefly next. Referring to FIG. 52, for each eight-by-eight block of pixel values, the output of the quantizer 20 comprises an eight-by-eight array of quantized coefficients which represent increasing horizontal spatial frequencies from left to right, and increasing vertical spatial frequencies from top to bottom. Usually, many of these coefficients are zero, especially at higher spatial frequencies. The variable-length encoder 22 scans this array in a zigzag pattern starting from the coefficient representing the lowest spatial frequency (the DC coefficient in the top left corner).

Referring to FIG. 53, taking advantage of the large number of zeros in the quantized coefficient data, the variable-length encoder 22 compresses the data by encoding, for each non-zero coefficient, the value of that coefficient and the length of the preceding run of zero coefficients. The data shown in FIG. 53 correspond to the following sequence of coefficients:

1 0 1 2 0 0 1 0 0 0 1 3 0 0 0 0 0 0 0 0 0 0

The first non-zero coefficient (the DC coefficient) is one, and there are no preceding zero coefficients; this information encodes (by an entropy encoding method) to a two-bit codeword (10). The next non-zero coefficient is also one, and it has one preceding zero; this encodes to a three-bit codeword (110). The last non-zero coefficient in this block is three, and it has no preceding zeros; this encodes to a four-bit codeword (0100). The rest of the block consists entirely of zeros, so an end-of-block code (11101) is generated. In this way the entire block of sixty-four coefficients is compressed to seven codewords comprising a total of only twenty-five bits.

Figures 54, 55:
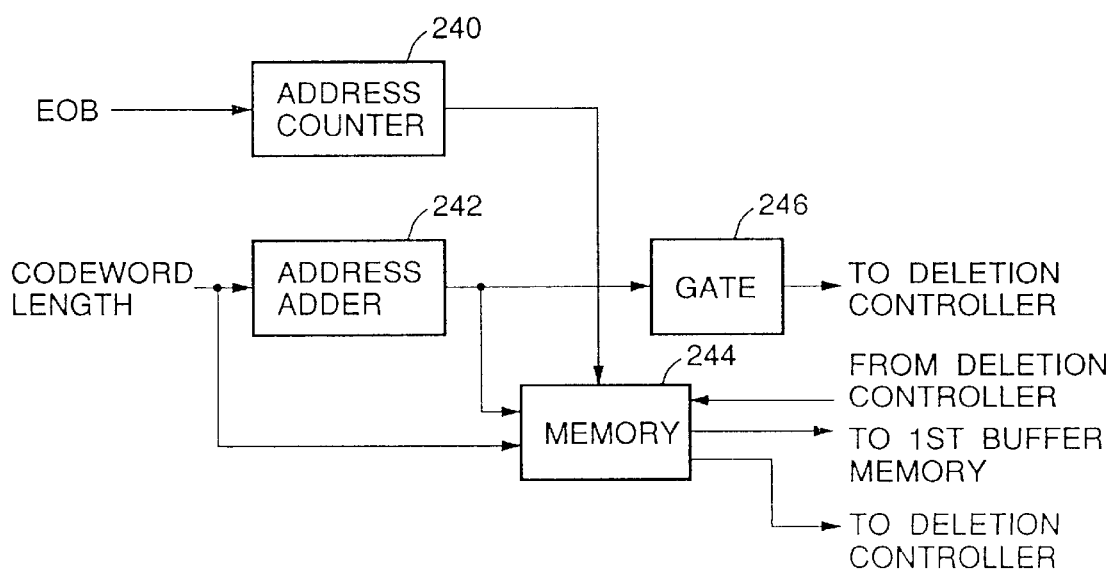
FIG. 54 illustrates a block of quantized coefficients.
FIG. 55 is a block diagram illustrating the address memory in FIG. 51.

FIG. 54 shows another hypothetical block of quantized coefficients, this one containing more non-zero coefficients. As can be verified by referring to the scanning sequence in FIG. 52, the last non-zero coefficient value is one, and it is preceded by one zero coefficient, so like the second non-zero coefficient in FIG. 53, it encodes to a three-bit codeword (110). When the variable-length encoder 22 stores this codeword in the first buffer memory 236, the address memory 232 stores the codeword length (three bits) and the address at which the codeword is stored in the first buffer memory 236.

FIG. 55 shows one possible implementation of the address memory 232, comprising an address counter 240, an address adder 242, a memory 244, and a gate 246. In this case the information provided from the variable-length encoder 22 to the address memory 232 comprises the length of each codeword stored in the first buffer memory 236, and an EOB signal indicating when an end-of-block codeword occurs.

The address counter 240 receives the EOB signal and generates addresses at which information is written in the memory 244. The address counter 240 is incremented by a suitable amount at each EOB signal, and is not incremented at other times.

The address adder 242 operates as an accumulator to which the length of each successive codeword is added, thus determining the address at which each codeword is stored in the first buffer memory 236. This address and the codeword length are stored in the memory 244 at the address designated by the address counter 240.

Since the address counter 240 is incremented only at each EOB signal, codeword length and address information are written at the same address in the memory 244, overwriting and erasing information for previous codewords, until an end-of-block codeword occurs. Then the address counter 240 is incremented to a new address in the memory 244, at which the length and address of the end-of-block codeword are written, leaving the length and address of the immediately preceding codeword unerased in the memory 244.

When an entire segment of encoded data has been stored in the first buffer memory 236, the memory 244 contains the lengths and addresses of all the codewords that immediately precede end-of-block codewords. At this point the gate 246 opens and the address of the last end-of-block codeword is sent to the deletion controller 234. In this way the deletion controller 234 learns the total amount of encoded data stored in the first buffer memory 236.

Figures 56, 57:
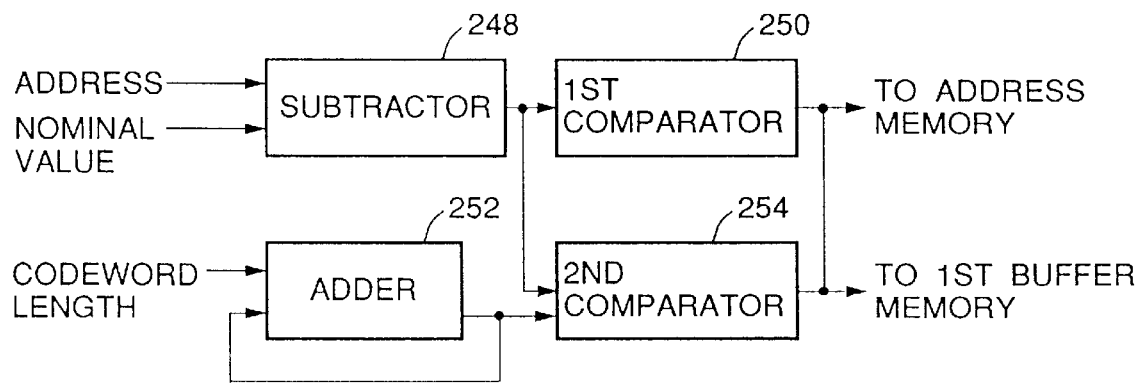
FIG. 56 is a block diagram illustrating the deletion controller in FIG. 51.
FIG. 57 illustrates the block of quantized coefficients in FIG. 54 with one non-zero coefficient deleted.

FIG. 56 shows one possible implementation of the deletion controller 234, comprising a subtractor 248, a first comparator 250, an adder 252, and a second comparator 254.

The subtractor 248 receives the address of the last end-of-block codeword from the gate 246 in the address memory 232 and subtracts the nominal segment length (more specifically, the address at which the last end-of-block codeword would be located if the segment contained exactly the nominal amount of encoded data). If the difference is positive, then the difference is equal to the amount of buffer overflow (the amount of actual encoded data in excess of the nominal amount). If the difference is zero or negative, there is no overflow.

From the sign of the output of the subtractor 248, the first comparator 250 determines whether buffer overflow has occurred. If there is no buffer overflow, the first comparator 250 directs the first buffer memory 236 to transfer all encoded data for the segment to the second buffer memory 238. If an overflow has occurred, the first comparator 250 directs the address memory 232 to output the address and length of the codeword preceding the first end-of-block codeword to the first buffer memory 236 and to output the length of this codeword to the adder 252, and directs the first buffer memory 236 to transfer encoded data up to the address reported by the address memory 232 to the second buffer memory 238 but not to transfer the codeword stored at this address, thereby deleting this codeword from the encoded data.

The adder 252 operates as an accumulator that adds codeword lengths reported from the address memory 232. The sum output by the adder 252 indicates the cumulative length of the codewords that have so far been deleted (by not being transferred from the first buffer memory 236 to the second buffer memory 238).

Each time the adder 252 outputs a new sum, the second comparator 254 compares this sum with the difference output by the subtractor 248. If the sum is equal to or greater than the difference, the overflow condition has been removed; if the sum is less than the difference, the overflow condition still persists. The second comparator 254 issues essentially the same instructions to the address memory 232 and first buffer memory 236 as did the first comparator 250. If the overflow condition has been removed, the second comparator 254 directs the first buffer memory 236 to transfer all the rest of its encoded data to the second buffer memory 238. If the overflow condition still persists, the first comparator 250 directs the address memory 232 to output the address and length of the codeword preceding the next end-of-block codeword to the first buffer memory 236 and to output the length of this codeword to the adder 252, and directs the first buffer memory 236 to transfer encoded data up to the address reported by the address memory 232 to the second buffer memory 238 but not to transfer the codeword stored at this address, thereby deleting this codeword from the encoded data.

FIG. 57 illustrates the effect of the above process when it becomes necessary to delete one coefficient from the block of coefficients shown in FIG. 54. A comparison of the two drawings shows that a single coefficient with a value of one has been changed to value of zero. This is the highest-frequency non-zero coefficient that was pointed out in FIG. 54, with a three-bit codeword (110). It can be removed with minimal impact on image quality.

The first buffer memory 236 has sufficient capacity to store all encoded data output by the variable-length encoder 22 for one segment, even if this amount overflows the nominal amount. When an overflow occurs, it is corrected by deleting a maximum of one coefficient per block, the deleted coefficient being among the highest-frequency non-zero coefficients in the block. Since the human eye is least sensitive to high spatial frequencies, this scheme corrects the overflow condition with comparatively little image degradation.

The amount of degradation can be further reduced by re-ordering the blocks as described next.

13th Embodiment

Figure 58:
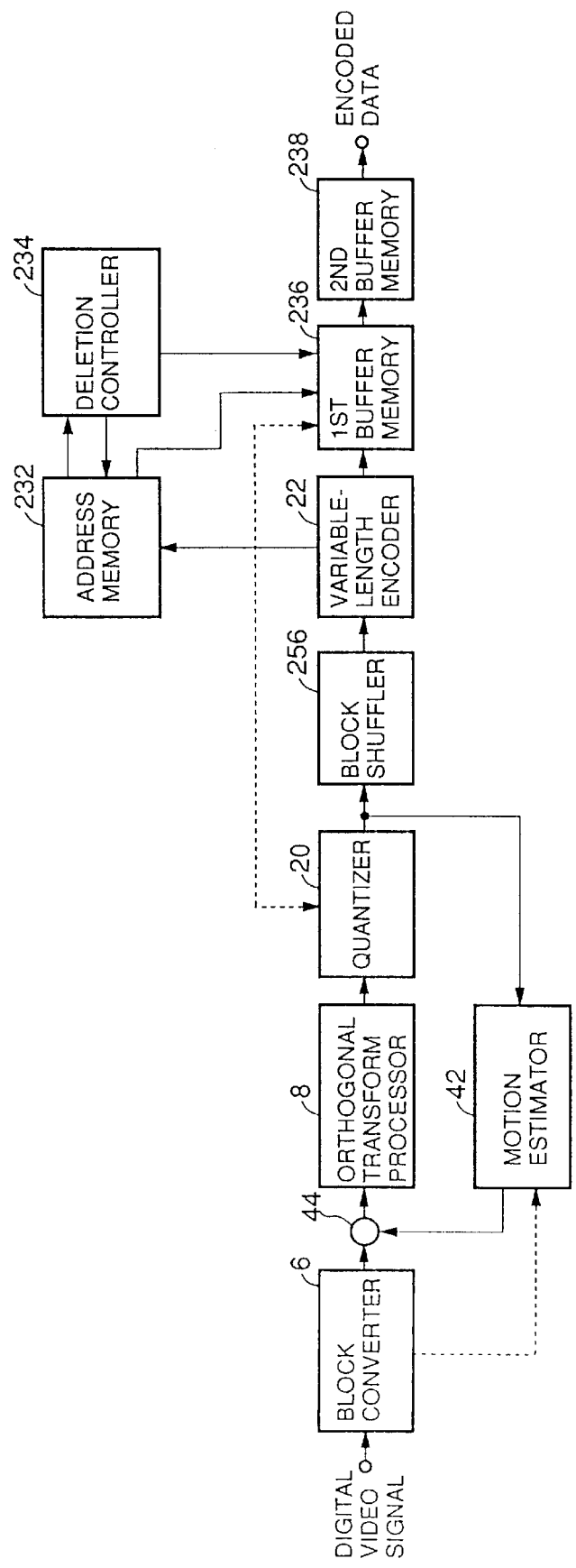
FIG. 58 is a block diagram illustrating a thirteenth embodiment of the invention.

FIG. 58 shows the same apparatus as in FIG. 51 with the addition of a block shuffler 256 between the quantizer 20 and the variable-length encoder 22. The block shuffler 256 re-orders the blocks so that blocks disposed at the periphery of the image are fed to the variable-length encoder 22 before blocks disposed in the center of the image.

Figure 59:
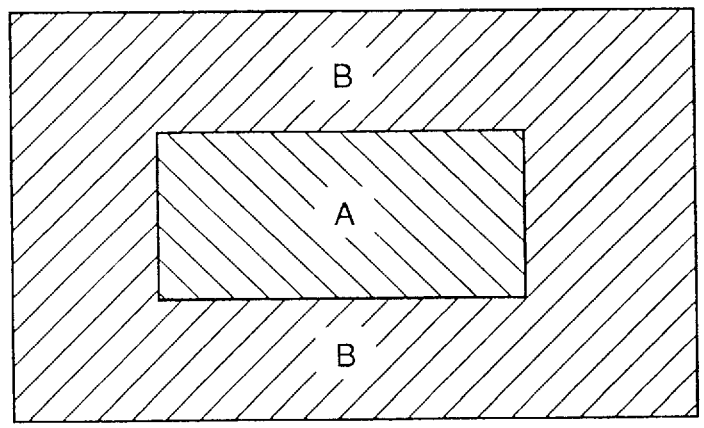
FIG. 59 illustrates an image divided into central and peripheral areas.
Figure 60:
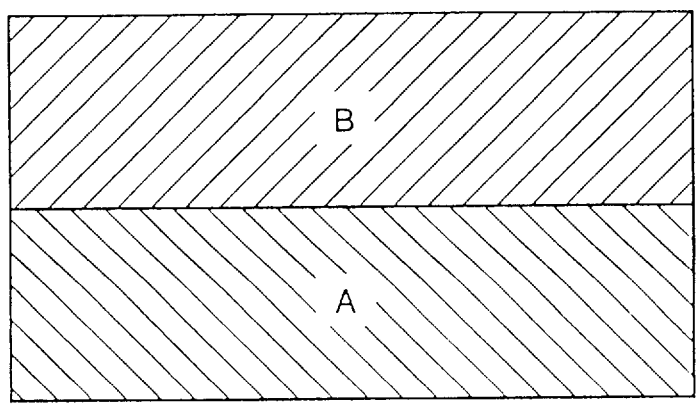
FIG. 60 illustrates a re-ordering of the image data in FIG. 59.

FIG. 59 shows how the block shuffler 256 divides an image into two parts: a central part A and a peripheral part B. FIG. 60 shows how the quantized coefficients for these two parts are supplied to the variable-length encoder 22: the variable-length encoder 22 first receives the coefficients for the peripheral part B, then receives the coefficients for the central part A. As a result, if coefficients must be deleted to correct an overflow condition, the first coefficients to be deleted are from blocks in the peripheral part, where image degradation is less noticeable than in the center.

In addition to (or instead of) the re-ordering scheme depicted in FIGS. 59 and 60, the block shuffler 256 can re-order the blocks of coefficients so that chrominance blocks are encoded before luminance blocks. Then when codewords are deleted, chrominance codewords will be deleted in preference to luminance codewords, taking advantage of the fact that the eye is less sensitive to chrominance information than to luminance levels.

Further modifications in the methods and apparatus depicted in FIGS. 51 to 60 are also possible. For example, the address memory 232 can be adapted to store the addresses and lengths of N codewords per block so that, if necessary, up to N codewords can be deleted per block, where N is an integer greater than one. Preferably, this scheme starts by deleting the highest-frequency non-zero coefficient from each of the blocks. After the highest-frequency non-zero coefficients have been deleted from all blocks, if the overflow condition still persists, then the next-highest-frequency non-zero coefficients are deleted, and so on.

14th Embodiment

The preceding embodiments have addressed the problems of quantization and buffer overflow. Finally, it is necessary to address the problem of encoding itself, more specifically, the problem caused by the different sampling rates of luminance and chrominance components in the motion estimation method of data compression.

Figure 61:
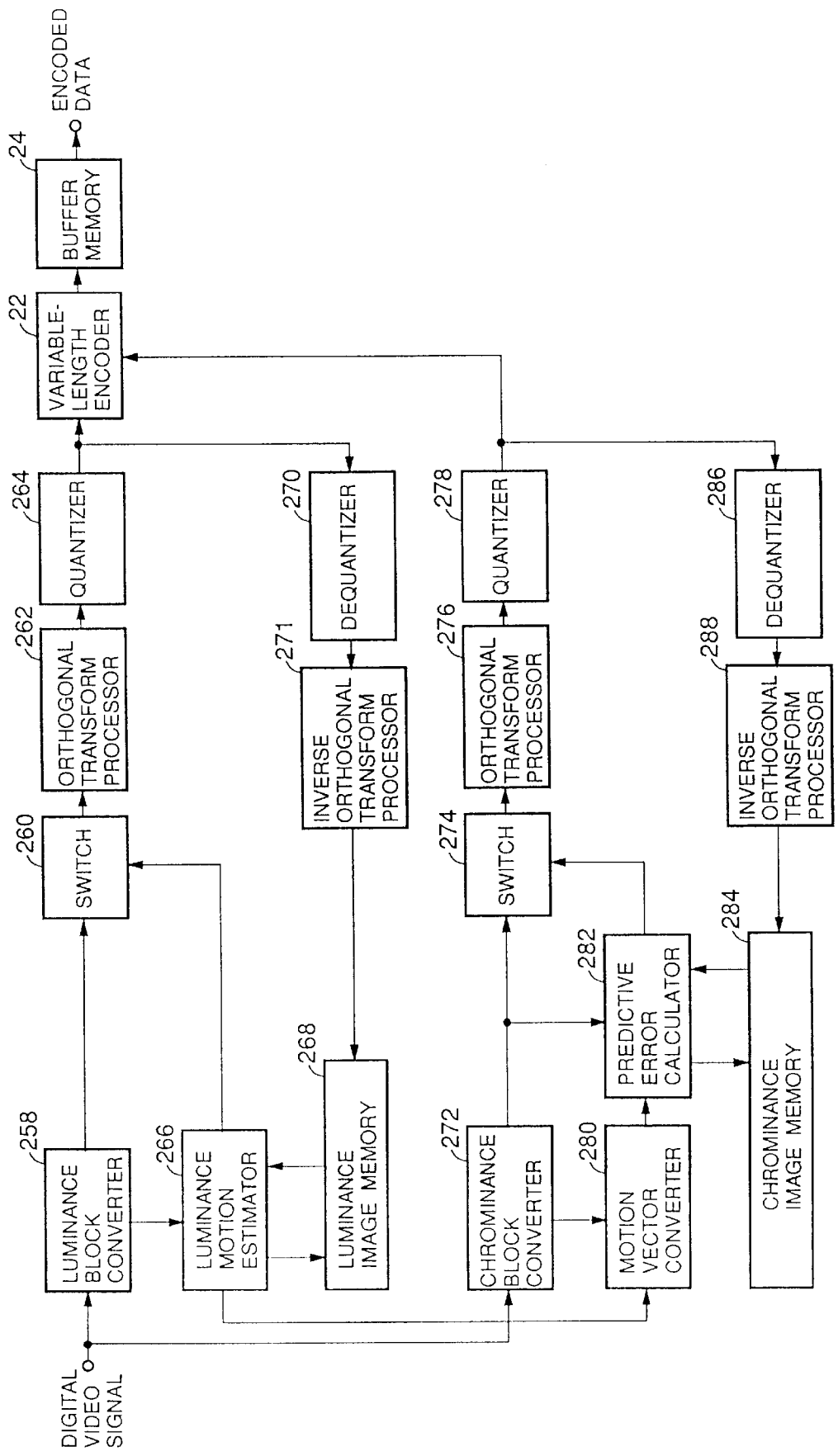
FIG. 61 is a block diagram illustrating a fourteenth embodiment of the invention.

Motion estimation apparatus with novel features is illustrated in FIG. 61. The luminance component of the digital video signal is input to a luminance block converter 258 and formatted into eight-by-eight blocks of pixel luminance values, which are fed to a switch 260. The output of the switch 260 is supplied to an orthogonal transform processor 262 which executes, for example, a discrete cosine transform to generate coefficients that are quantized by a quantizer 264, then encoded by a variable-length encoder 22 and stored in a buffer memory 24. The orthogonal transform processor 262, quantizer 264, variable-length encoder 22, and buffer memory 24 operate as already described, except that the orthogonal transform processor 262 and quantizer 264 operate only on luminance values. Circuits for controlling the quantization level and bit rate are omitted from the drawing for the sake of simplicity.

The luminance blocks generated by the luminance block converter 258 are also supplied to a luminance motion estimator 266 which, by comparing each luminance block with other image data stored in a luminance image memory 268, generates a corresponding luminance motion vector and luminance error values and supplies these to the switch 260. To generate the image data stored in the luminance image memory 268, the output of the quantizer 264 is supplied to a dequantizer 270, then to an inverse orthogonal transform processor 271, which carry out processes inverse to those performed by the quantizer 264 and orthogonal transform processor 262.

The two chrominance components (B–Y and R–Y) of the digital video signal are supplied to a chrominance block converter 272, which formats them into respective eight-by-eight blocks of pixel chrominance values. These are fed through a switch 274 to an orthogonal transform processor 276, then to a quantizer 278. The switch 274, orthogonal transform processor 276, and quantizer 278 are similar to the switch 260, orthogonal transform processor 262, and quantizer 264. The output of the quantizer 278 is supplied to the variable-length encoder 22.

The luminance motion vectors generated by the luminance motion estimator 266 are supplied to a motion vector converter 280, which uses them to calculate chrominance motion vectors. These chrominance motion vectors and the chrominance blocks output from the chrominance block converter 272 are provided to a predictive error calculator 282, which references a chrominance image memory 284, generates chrominance error values, and furnishes these to the switch 274 together with the chrominance motion vectors. To generate the image data stored in the chrominance image memory 284, the output of the quantizer 278 is supplied to a dequantizer 286 and inverse orthogonal transform processor 288, which are similar to the dequantizer 270 and inverse orthogonal transform processor 271.

Figure 62A:
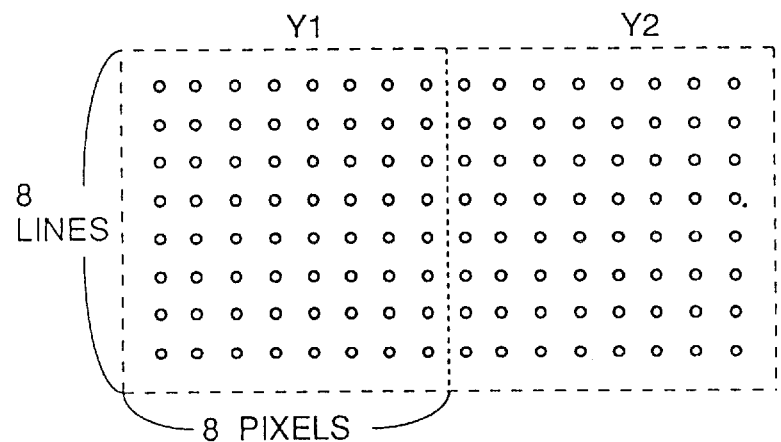
FIGS. 62(a)–(b) illustrate a spatial relationship between luminance and chrominance blocks.
Figure 62B:
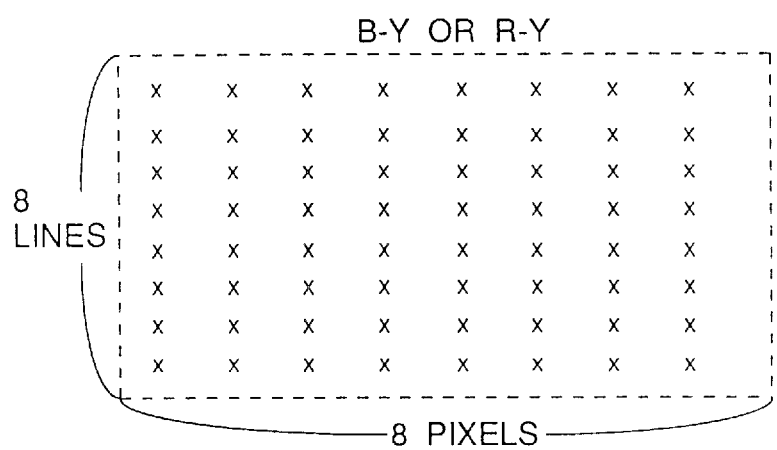

The formatting process carried out by the luminance block converter 258 and chrominance block converter 272 is illustrated in FIG. 62. Points at which the luminance component is sampled are indicated by small circles; points at which the chrominance components are sampled are indicated by small crosses. The sampling density for the luminance component is twice the sampling density for the chrominance components. A rectangular image area comprising eight scanning lines in the vertical direction and sixteen luminance sampling points in the horizontal direction has only eight chrominance sampling points in the horizontal direction.

The luminance block converter 258 divides this rectangular image area into two eight-by-eight luminance blocks $Y_1$ and $Y_2$. From the same rectangular image area the chrominance block converter 272 produces a single B-Y block and a single R-Y block.

This blocking scheme is suitable for a 4:2:2 digital video signal, but the invention is not limited to this scheme. Blocks of sizes other than eight-by-eight can be used, and in general the luminance sampling rate can be N times the chrominance sampling rate, where N is any integer greater than one.

Next the operation will be described.

The motion estimation scheme of this embodiment encodes every fourth field of the digital video signal as an intrafield, without reference to other fields. The three fields between each pair of intrafields are encoded as interfields, that is, as difference values, using motion estimation to make the difference values as small as possible. Of course the invention can also be practiced with more or fewer than three interfields.

Figure 63:
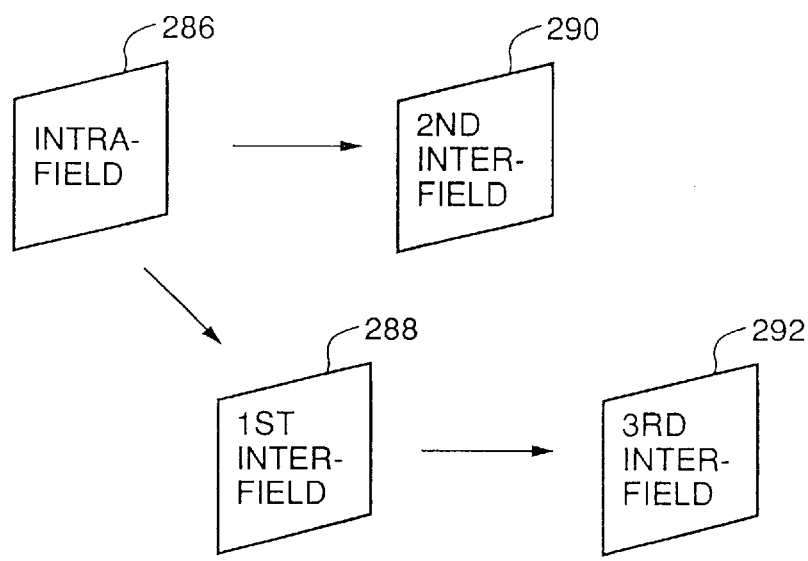
FIG. 63 illustrates a motion estimation relationship among four consecutive images.

FIG. 63 illustrates a set of four fields comprising an intrafield 286 followed by three interfields: a first interfield 288, a second interfield 290, and a third interfield 292. The first interfield 288 and second interfield 290 are encoded as difference values from the intrafield 286, with motion estimation applied separately to each. The third interfield 292 is encoded as difference values from the first interfield 288, again with its own motion estimation vectors.

Referring again to FIG. 61, the encoded luminance data for all blocks in the intrafield 286 are generated by the luminance block converter 258, orthogonal transform processor 262, quantizer 264, and variable-length encoder 22 and stored in compressed form in the buffer memory 24. In addition, this intrafield 286 is dequantized by the dequantizer 270 and an inverse transformation is executed by the inverse orthogonal transform processor 271 to generate the decompressed data that will be be produced by the receiving or reproducing apparatus after the signal is transmitted or recorded. The decompressed data are stored in the luminance image memory 268.

Chrominance data for the intrafield 286 are similarly processed by the chrominance block converter 272, orthogonal transform processor 276, quantizer 278, dequantizer 286, inverse orthogonal transform processor 288, and variable-length encoder 22. The buffer memory 24 stores the resulting compressed chrominance data; the chrominance image memory 284 stores the chrominance data in decompressed form.

Next, when each eight-by-eight block of the first interfield 288 is output from the luminance block converter 258, it is processed by the luminance motion estimator 266 as follows. From the luminance image memory 268, the luminance motion estimator 266 fetches a corresponding sixteen-by-sixteen block of pixel luminance values in the intrafield 286 such that the image area of the eight-by-eight block of the first interfield 288 is disposed in the center of the image area of the sixteen-by-sixteen block of the intrafield 286. The luminance motion estimator 266 then moves the eight-by-eight block around to different positions in the sixteen-by-sixteen block and calculates the predictive error for each position. The predictive error is the sum of the absolute values of the differences of the luminance values of the pixels in the block. If $L_1(i, j)$ and $L_2(i, j)$ are the luminance values of pixels in the intrafield 286 and first interfield 288, respectively, then for values of x and y ranging from minus four to plus four, the luminance motion estimator 266 calculates the predictive error E(x, y) as follows:

$$E(x,y) = \sum_{i=1}^{8} \sum_{j=1}^{8} |L_2(i,j) - L_1(i+x, j+y)|$$

In the range $-4 \leq x \leq 4$ and $-4 \leq y \leq 4$, the pair of values $(x_0, y_0)$ that yields the smallest predictive error $E(x_0, y_0)$ is identified as the motion vector of that block. Error values $L_E(i, j)$ are then calculated as follows:

$$L_E(i, j) = L_2(i, j) - L_1(i+x_0, j+y_0) (i, j=1, \ldots, 8)$$

The motion vector $(x_0, y_0)$ and the above error values $L_E(i, j)$ are provided to the switch 260, which sends them to the orthogonal transform processor 262 to be transformed, quantized, and encoded. Typically, most of the error values will be zero or close to zero, so they can be compressed to a very small amount of encoded data. The quantized data are dequantized by the dequantizer 270, an inverse transformation is carried out by the inverse orthogonal transform processor 271, and the resulting data are stored in the luminance image memory 268.

This process is carried out for each block of the luminance component. Referring to FIG. 62., this yields one motion vector $(x_1, y_1)$ for luminance block $Y_1$, and another motion vector $(x_2, y_2)$ for luminance block $Y_2$. The luminance motion estimator 266 compares the predictive errors $E(x_1, y_1)$ and $E(x_2, y_2)$ associated with these two motion vectors, decides which is smaller, and sends the corresponding motion vector to the motion vector converter 280.

Suppose, for example, that $E(x_1, y_1)$ is smaller, so the motion vector converter 280 receives motion vector $(x_1, y_1)$. To compute the corresponding motion vector for the chrominance block shown in FIG. 62, the motion vector converter 280 divides the horizontal coordinate $x_1$ by two because the horizontal coordinates are spaced twice as far apart in the chrominance components as in the luminance component. Fractions occurring when the horizontal coordinate is divided by two can be ignored.

The motion vector converter 280 supplies the chrominance motion vector $(x_1/2, y_1)$ to the predictive error calculator 282, which computes a block of error values by a process analogous to the above. That is, if $C_1(i, j)$ are chrominance values (B-Y values, for example) in the intrafield 286 and $C_2(i, j)$ are chrominance values in the first interfield 288, the predictive error calculator 282 computes:

$$C_E(i, j) = C_2(i, j) - C_1(i+x_1/2, j+y_1)$$

These error values are supplied to the switch 274, which furnishes them to the orthogonal transform processor 276 to be transformed, quantized by the quantizer 278, and encoded by the variable-length encoder 22. The quantized values are also dequantized by the dequantizer 286, an inverse transformation is carried out by the inverse orthogonal transform processor 288, and the resulting values are stored in the chrominance image memory 284. The above process is carried out for all blocks of the B-Y component and all blocks of the R-Y component in the first interfield 288.

The second interfield 290 is encoded in the same way as the first interfield 288, by obtaining motion vectors and error values with reference to the intrafield 286. It is not necessary to store data in the luminance and chrominance image memories 268 and 284 for the second interfield 290, however, so the dequantizing and inverse orthogonal transform steps can be omitted.

The third interfield 292 is encoded in a similar manner, but with reference to the first interfield data stored in the luminance image memory 268 and chrominance image memory 284. This entails an additional step of adding the first interfield error values to the intrafield pixel data to obtain pixel data for the first interfield 288, but a thorough description of this step will be omitted to avoid obscuring the invention with irrelevant detail.

The step of searching for the motion vector that gives minimum predictive error involves considerable calculation (over ten thousand addition, subtraction, and comparison operations per block for the case described above). The advantage of the invention is that this computation only has to be carried out for luminance blocks; it does not have to be carried out for chrominance blocks.

In the preceding description one chrominance block corresponded to two luminance blocks, but the invention is not restricted to this case. In general one chrominance block may correspond to N luminance blocks, where N is any integer equal to or greater than two. N is also the ratio of the luminance sampling rate to the chrominance sampling rate, given that the luminance and chrominance components have the same block size (the same number of samples per block). This is desirable because it enables the orthogonal transform to have the same accuracy for both components. Two of the many possible examples will be illustratively shown next.

Figure 64A:
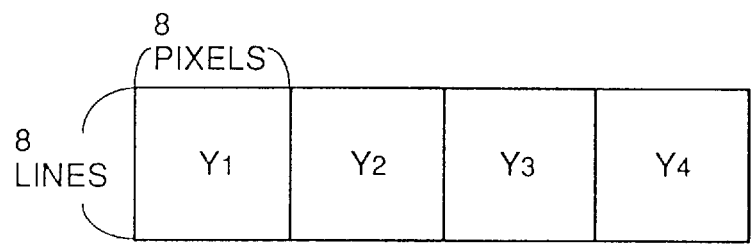
FIGS. 64(a)–(b) illustrate another spatial relationship between luminance and chrominance blocks.
Figure 64B:
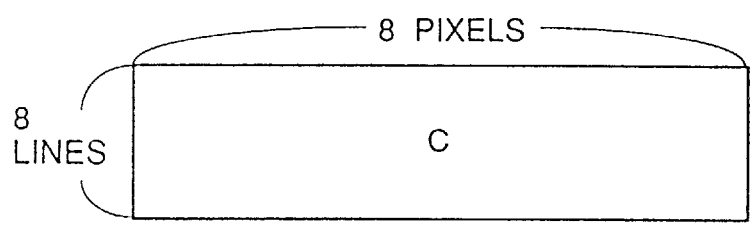

FIG. 64 shows an example in which one chrominance block corresponds to four luminance blocks disposed side-by-side in the horizontal direction. In this case the luminance motion estimator 266 finds luminance motion vectors for the four luminance blocks, determines which of these four luminance motion vectors gives the least predictive error, and sends that luminance motion vector to the motion vector converter 280. The motion vector converter 280 divides the horizontal coordinate by four to derive the corresponding chrominance motion vector. The luminance motion vectors $(x_1, y_1)$ and chrominance motion vectors $(x_c, y_c)$ are related as follows:

$$(x_c, y_c) = (x_1/4, y_1)$$

Figure 65A:
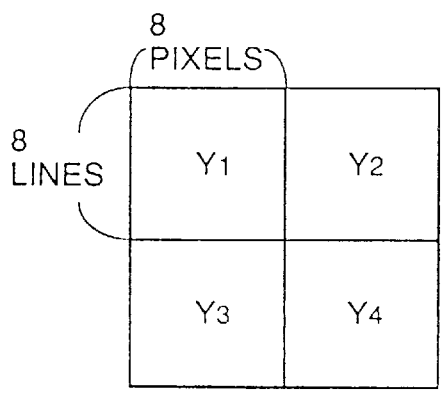
FIGS. 65(a)–(b) illustrate yet another spatial relationship between luminance and chrominance blocks.
Figure 65B:
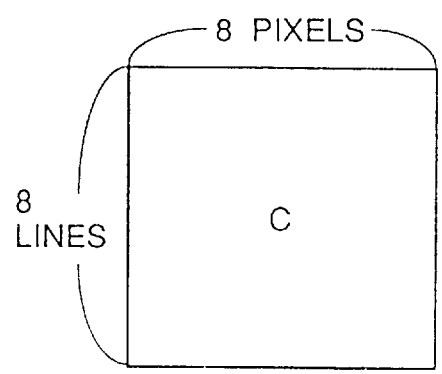

FIG. 65 shows an example in which one chrominance block corresponds to four luminance blocks disposed side-by-side in a square arrangement. Here again the luminance motion estimator 266 determines which of the four luminance motion vectors gives the least predictive error, and sends that motion vector to the motion vector converter 280. The motion vector converter 280 divides the horizontal coordinate by two and divides the vertical coordinate by two to derive the corresponding chrominance motion vector. The luminance motion vectors $(x_1, y_1)$ and chrominance motion vectors $(x_c, y_c)$ are related as follows:

$$(x_c, y_c) = (x_1/2, y_1/2)$$

Instead of having the luminance motion estimator 266 select the motion vector with least predictive error and send only that motion vector to the motion vector converter 280, it is possible to have the luminance motion estimator 266 send all calculated luminance motion vectors to the motion vector converter 280 and let the motion vector converter 280 select among them. In this case, using the same notation as before, for each luminance motion vector $(x_1, y_1)$ received from the luminance motion estimator 266, the motion vector converter 280 generates the corresponding chrominance motion vector $(x_c, y_c)$ then calculates a predictive chrominance error value Ec as follows:

$$Ec = \sum_{i=1}^{8} \sum_{j=1}^{8} |C_2(i,j) - C_1(i + x_c, j + y_c)|$$

For the blocking scheme shown in FIG. 62, the motion vector converter 280 performs this calculation twice per chrominance block, and determines which of the two chrominance motion vectors gives the least predictive chrominance error Ec. The predictive error calculator 282 uses that chrominance motion vector to generate error values for the block. For the blocking scheme shown in FIG. 64 or FIG. 65, the motion vector converter 280 performs the above calculation four times to select among four motion vectors. In either case, the amount of calculation is much less than if chrominance motion vectors had to be found by following the same procedure as for luminance blocks, by testing eighty-one possible vectors per block.

Yet another possibility is for the luminance motion estimator 266 to send all calculated luminance motion vectors to the motion vector converter 280 and for the motion vector converter 280 to calculate their average vector and derive the chrominance motion vector from the average vector. Referring again to FIG. 62, if $(x_1, y_1)$ and $(x_2, y_2)$ are the motion vectors of luminance blocks $Y_1$ and $Y_2$, then the average vector $(x_a, y_a)$ and chrominance motion vector $(x_c, y_c)$ are calculated as follows:

$$x_a = (x_1 + x_2)/2 \quad x_c = x_a/2$$
$$y_a = (y_1 + y_2)/2 \quad y_c = y_a$$

In this case, since the receiving or reproducing apparatus can also derive the chrominance motion vectors from the luminance motion vectors, it is not necessary to transmit or record chrominance motion vectors.

The fourteenth embodiment is not restricted to eight-by-eight blocks. It is applicable to J-by-K blocks where J and K are any positive integers. Similarly, the size of the search range need not be sixteen-by-sixteen but can be L-by-M where L and M are integers such that $L \geq J$ and $M \geq K$. The inventive concept of deriving chrominance motion vectors from luminance motion vectors can also be applied to motion estimation methods that only test part of the search range, or differ in other ways from the preceding description.

Those skilled in the art will notice various other modifications that can be made in this and the preceding embodiments without departing from the spirit and scope of the invention as set forth in the following claims.

What is claimed is:

1. A method of compressively encoding a segment of a digital video signal to obtain a nominal amount of encoded data, comprising the steps of:

formatting the segment into a plurality of rectangular image area blocks;

encoding each block by a variable-length encoding method to generate a plurality of codewords;

storing, for all blocks in the segment, said codewords in a first buffer memory;

storing, for each block, length and address information for at least one of the codewords of that block in an address memory;

determining a total amount of encoded data stored in said first buffer memory, and comparing said total amount with said nominal amount of encoded data;

deleting, if said total amount exceeds said nominal amount of encoded data, codewords according to information stored in said address memory until said total amount does not exceed said nominal amount of encoded data; and transferring the codewords stored in said first buffer memory and not deleted to a second buffer memory.

2. The method of claim 1, wherein for each block, one of the codewords stored in said first buffer memory is an end-of-block codeword, and wherein said step of storing length and address information includes storing length and address information for a codeword immediately preceding said end-of-block codeword in said address memory.

3. The method of claim 2, wherein said codeword immediately preceding said end-of-block codeword represents the highest spatial frequencies present in said block.

4. The method of claim 2, wherein said step of storing length and address information comprises the further steps of:

generating an address-memory address designating a location in said address memory;

writing length and address information for each codeword at said address-memory address; and incrementing said address-memory address before writing length and address information for an end-of-block codeword, but not before writing length and address information for code words that are not end-of-block codewords.

5. The method of claim 1, wherein said codewords comprise chrominance codewords and luminance codewords, and chrominance codewords are deleted from said first buffer memory before luminance codewords are deleted from said first buffer memory.

6. The method of claim 1, wherein said blocks include central blocks corresponding to central image areas and peripheral blocks corresponding to peripheral image areas, and codewords for said peripheral blocks are deleted from said first buffer memory before codewords for said central blocks.

7. The method of claim 6, comprising the further step of re-ordering said blocks so that said peripheral blocks are encoded before said central blocks.

8. A compressive encoder for encoding a segment of a digital video signal to obtain a nominal amount of encoded data, comprising:

a block converter for converting said segment to rectangular image area blocks;

an orthogonal transform processor coupled to said block converter, for executing an orthogonal transform on each of said blocks, thereby generating coefficients;

a quantizer coupled to said orthogonal transform processor, for quantizing said coefficients to generate quantized coefficients;

a variable-length encoder coupled to said quantizer, for encoding said quantized coefficients to generate encoded data comprising, for each of said blocks, a plurality of variable-length codewords;

a first buffer memory coupled to said variable-length encoder, for storing said encoded data;

an address memory coupled to said variable-length encoder, for storing address and length information about at least one codeword per block;

a deletion controller coupled to said first buffer memory, for deleting codewords from said first buffer memory according to information in said address memory until the encoded data stored in said first buffer memory and not deleted is within said nominal amount of encoded data; and a second buffer memory for storing encoded data not deleted from said first buffer memory.

9. The encoder of claim 8, wherein said segment comprises luminance blocks and chrominance blocks, further comprising a block shuffler for re-ordering said blocks so that said deletion controller deletes chrominance blocks in preference to luminance blocks.

10. The encoder of claim 8, wherein encoded data for each block comprises an end-of-block codeword, and said address memory comprises:

an address adder that adds lengths of said codewords to determine addresses at which said codewords are stored in said first buffer memory;

a memory coupled to said address adder, for storing information comprising lengths of said codewords and addresses determined by said address adder;

an address counter that is incremented once per end-of-block codeword to generate addresses at which said information is stored in said memory, thereby causing information about codewords not immediately preceding end-of-block codewords to be overwritten; and a gate coupled to said address adder, for passing an address of a last end-of-block codeword in said segment from said address adder to said deletion controller.

11. The encoder of claim 10, wherein said deletion controller comprises:

a subtractor for receiving an address from said gate and determining a difference between an amount of encoded data stored in said first buffer memory and said nominal amount of encoded data;

a first comparator coupled to said subtractor, for instructing said first buffer memory to delete a codeword immediately preceding an end-of-block codeword if said amount of encoded data exceeds said nominal amount of encoded data;

an adder for determining a total length of codewords deleted from said first buffer memory; and a second comparator coupled to said adder and said subtractor, for comparing the total length determined by said adder with the difference determined by said subtractor and instructing said first buffer memory to delete additional codewords immediately preceding end-of-block codewords if said total length is less than said difference determined by said subtractor.

12. The encoder of claim 8, further comprising a block shuffler for re-ordering said blocks so that said deletion controller deletes blocks corresponding to peripheral image areas in preference to blocks corresponding to central image areas.

* * * * *